United States Patent [19]

Hirose et al.

[11] Patent Number: 5,238,794
[45] Date of Patent: Aug. 24, 1993

[54] SILVER HALIDE COLOR PHOTOGRAPHIC MATERIAL

[75] Inventors: Takeshi Hirose; Koji Takahashi, both of Kanagawa, Japan

[73] Assignee: Fuji Photo Film Co., Ltd., Kanagawa, Japan

[21] Appl. No.: 729,951

[22] Filed: Jul. 15, 1991

[30] Foreign Application Priority Data

Jul. 16, 1990 [JP] Japan .................. 2-187799

[51] Int. Cl.$^5$ .................................. G03C 1/00
[52] U.S. Cl. .................................. 430/496; 430/379;
430/140; 430/504; 430/507; 430/933; 428/692; 428/694 R
[58] Field of Search ............... 430/496, 379, 140, 504, 430/507, 933; 428/692, 694

[56] References Cited

U.S. PATENT DOCUMENTS

| | | | |
|---|---|---|---|
| 3,782,947 | 1/1974 | Krall | 430/132 |
| 4,279,945 | 7/1981 | Audran et al. | 430/140 |
| 4,302,523 | 11/1981 | Audran et al. | 430/140 |
| 4,729,943 | 3/1988 | Pfaff et al. | 430/379 |
| 4,860,037 | 8/1989 | Harvey | 354/21 |
| 5,032,496 | 7/1991 | Hattori et al. | 430/504 |
| 5,079,132 | 1/1992 | Mitsui et al. | 430/379 |

FOREIGN PATENT DOCUMENTS 9004205 4/1990 European Pat. Off. .
0406815 1/1991 European Pat. Off. .

*Primary Examiner*—Charles L. Bowers, Jr.
*Assistant Examiner*—Thomas R. Neville
*Attorney, Agent, or Firm*—Sughrue, Mion, Zinn, Macpeak & Seas

[57] ABSTRACT

A silver halide color reversal light-sensitive material comprising on a transparent support having a red-sensitive silver halide emulsion layer containing a cyan coupler, a green-sensitive silver halide emulsion layer containing a magenta coupler, and a blue-sensitive silver halide emulsion layer containing a yellow coupler is disclosed, wherein the light-sensitive material has a magnetic recording layer containing from $4 \times 10^{-3}$ to 3 g/m$^2$ of a ferromagnetic powder, and the minimum density area of the light-sensitive material after development processing has a chromaticity having an a* value of from −5 to 5, a b* value of from −5 to 5, and an L* value of not less than 80 as calculated from tristimulus values in CIE 1964 $X_{10}Y_{10}Z_{10}$ Colorimetric System under an illuminant C as specified in JIS Z8720 according to the method of JIS Z8729. The photographic material exhibits improved color reproducibility. The present invention further concerns with a light-shut film unit having the silver halide color reversal light-sensitive material packed in a cartridge, the material having a film leader which is inside of the cartridge.

12 Claims, 1 Drawing Sheet

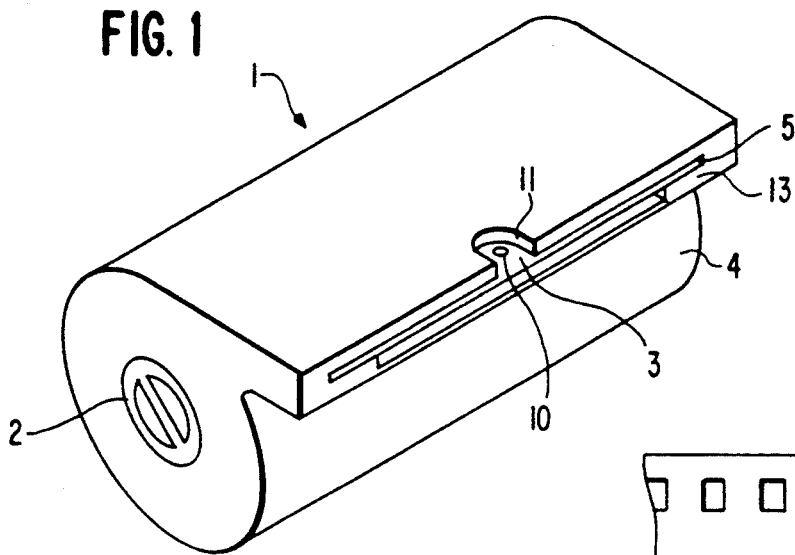
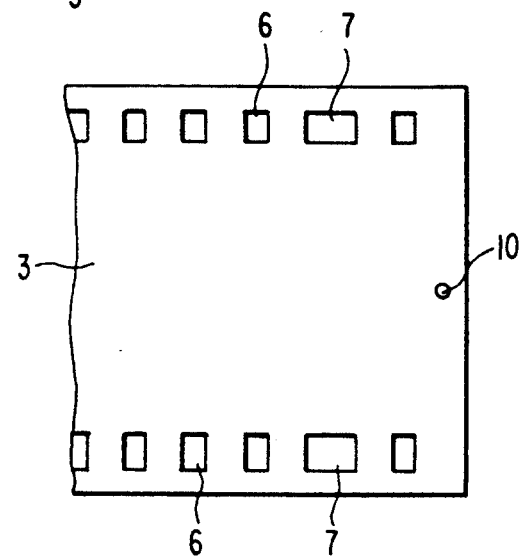
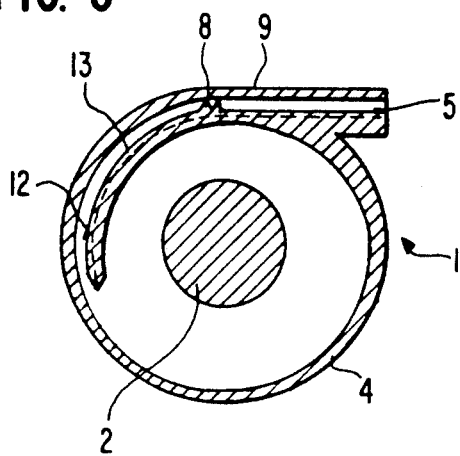
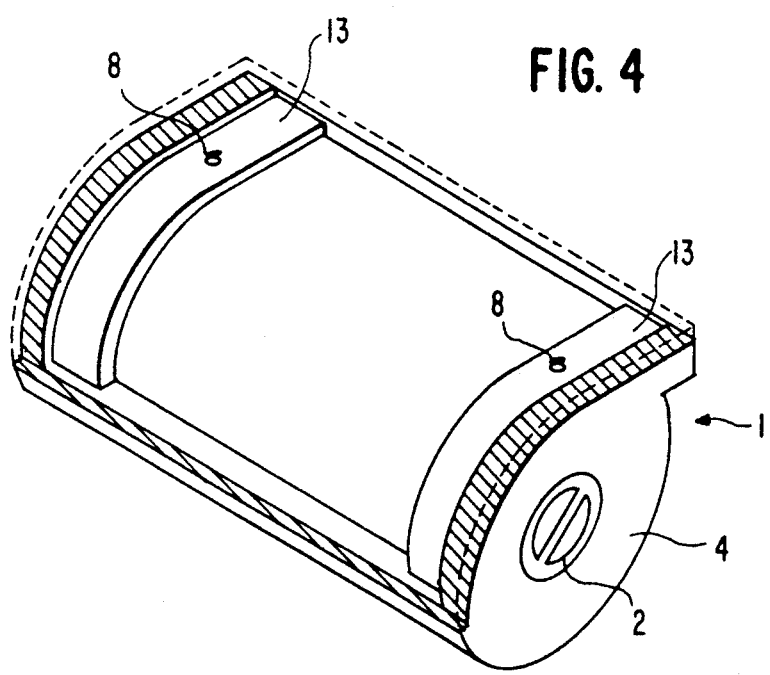

SILVER HALIDE COLOR PHOTOGRAPHIC MATERIAL

FIELD OF THE INVENTION

The present invention relates to a silver halide color photographic material having a substantially transparent magnetic recording layer. More particularly, the present invention relates to a silver halide color reversal light-sensitive material which forms an image with an improved hue.

BACKGROUND OF THE INVENTION

Photographic materials having a magnetic recording layer are known for use as sound recording film or for recording and reproducing various types of information. JP-B-42-4539 (the term "JP-B" as used herein means an "examined published Japanese patent application") discloses the use of a magnetic recording layer which transmits infrared light but does not transmit visible light in combination with an optical sound track. JP-B-57-6576 and JP-A-53-109604 (the term "JP-A" as used herein means an "unexamined published Japanese patent application") discloses the use of a magnetic recording layer which transmits visible light.

A magnetic recording layer that transmits visible light is of great benefit when used with photographic materials because it can be superposed on the image-forming area to increase recording capacity and to improve precision. For example, this type of magnetic recording layer makes it possible to record and reproduce information such as the time, weather, and lighting conditions during photographing, the enlargement or reduction ratio for printing, the number of re-prints, the name of the orderer, and other various messages useful in handling.

Further, the magnetic recording layer may be utilized as a means for inputting or outputting images for a TV or VTR. Systems for signal input into such a transparent magnetic recording layer are described in WO 90-42056 and WO 90-4212. However, these publications furnish no clear description about superposing a transparent magnetic recording layer on the image-forming area of a color reversal light-sensitive material, and disclose even less about the deterioration of color reproduction which is associated with such superposition.

In an attempt to superpose a transparent magnetic recording layer on an image-forming area of a color reversal light-sensitive material, the inventors noted a deterioration in color reproducibility in the image area after photographic processing, and particularly in the highlight area. This is considered attributed chiefly to coloration of the highlight area due to the yellow tinge of magnetic powders which are incorporated into the magnetic recording layer in an amount sufficient to assure a signal level required for magnetic recording. Such coloration is extremely unfavorable for color reversal materials that are desired to have high fidelity in color reproduction.

SUMMARY OF THE INVENTION

An object of the present invention is to provide a color reversal light-sensitive material having a magnetic recording layer on the image area thereof while retaining excellent color reproducibility.

Another object of the present invention is to provide a color reversal light-sensitive material unit having a magnetic recording layer on the image area thereof while retaining excellent sharpness as well as excellent color reproducibility.

The inventors have confirmed that the presence of magnetic particles in a magnetic recording layer in an amount sufficient to assure a signal level necessary for magnetic recording causes unfavorable coloration in a color reversal material even if transparency is increased. As a result of extensive efforts to solve this problem, it has now been found that a color reversal light-sensitive material which has a magnetic recording layer having a sufficient magnetic density necessary for assuring a signal level and so having its own color and which still exhibits satisfactory color reproducibility can be obtained by controlling within a specific range the chromaticity of the minimum density area after development processing.

That is, the above objects of the present invention are accomplished by a silver halide color reversal light-sensitive material comprising on a transparent support a red-sensitive silver halide emulsion layer containing a cyan coupler, a green-sensitive silver halide emulsion layer containing a magenta coupler, and a blue-sensitive silver halide emulsion layer containing a yellow coupler, wherein the light-sensitive material further has a layer containing from $4 \times 10^{-3}$ to 3 g/m$^2$ of a ferromagnetic powder, and the minimum density area of the light-sensitive material after development processing has a chromaticity having an a* value of from $-5$ to 5, a b* value of from $-5$ to 5, and an L* value of not less than 80 as determined from tristimulus values in CIE 1964 $X_{10}Y_{10}Z_{10}$ Colorimetric System under an illuminant C as specified in JIS Z8720 according to the method of JIS Z8729.

In a preferred embodiment of the present invention, a silver halide color reversal light-sensitive material as described above is provided wherein the light-sensitive material contains a non-imagewise nondiffusible dye which is not decolored during development processing.

In another aspect of the present invention, a light-shut film unit is provided in which a silver halide color reversal light-sensitive material as described above is packed in a cartridge with its film leader not being on the outside.

BRIEF DESCRIPTION OF THE DRAWINGS

FIG. 1 is a perspective view of one embodiment of a film unit according to the present invention.

FIG. 2 is a plane view of the leading end of a film in the film unit shown in FIG. 1.

FIG. 3 is a cross-sectional view of the film unit of FIG. 1.

FIG. 4 is a cutaway view showing the inside of the film unit of FIG. 1.

DETAILED DESCRIPTION OF THE INVENTION

Ferromagnetic powders which can be used in the present invention include ferromagnetic iron oxide fine powders, Co-modified ferromagnetic iron oxide fine powders, ferromagnetic chromium dioxide fine powders, ferromagnetic metallic powders, ferromagnetic alloy powders, and barium ferrite fine powders.

Specific examples of the ferromagnetic metal or alloy powders include powders having a metallic content of at least 75% by weight, at least 80% by weight of the metal present comprises at least one ferromagnetic metal or alloy, e.g., Fe, Co, Ni, Fe-Co, Fe-Ni, Co-Ni, and Co-Fe-Ni, and less than 20% by weight of the metal present comprises other components, e.g., Al, Si, S, Sc, Ti, V, Cr, Mn, Cu, Zn, Y, Mo, Rh, Pd, Ag, Sn, Sb, B, Ba, Ta, W, Re, Au, Hg, Pb, P, La, Ce, Pr, Nd, Te, and Bi. The ferromagnetic metal content may contain small proportions of water, hydroxides, or oxides.

Processes for preparing these ferromagnetic powders are known, and any of the known processes can be applied to the ferromagnetic powders to be used in the present invention.

The ferromagnetic powders to be used are not particularly limited in shape or size. For example, the powders may have a needle-like shape, a grain shape, a spherical shape, a cubic shape, or a plate-like shape. To obtain electromagnetic conversion characteristics, needle-like powders and plate-like powders are preferred.

While not being limited, the powders preferably have a crystallite size of not more than 400 Å and a specific surface area ($S_{BET}$) of not less than 20 m$^2$/g, and particularly not less than 30 m$^2$/g. The pH of the powders is not particularly limited and is preferably between 5 and 10.

Surface treatments applicable to the powders are also not particularly limited. For example, the powders may be treated with a substance containing titanium, silicon, aluminum, etc. or with an organic compound such as carboxylic acids, sulfonic acids, sulfuric esters, phosphonic acids, phosphoric esters, and adsorptive compounds having a nitrogen-containing heterocyclic ring (e.g., benzotriazole). In using ferromagnetic iron oxide fine powders, the iron (II) to iron (III) ratio is not particularly limited.

The ferromagnetic fine powders are used in an amount of from $4 \times 10^{-3}$ to 3 g, preferably from $10^{-2}$ to 1 g, and more preferably from $4 \times 10^{-2}$ to $4 \times 10^{-1}$ g, per m$^2$ of a transparent support.

Binders which can be used in the magnetic recording layer include thermoplastic resins, thermosetting resins, radiation-curable resins, reactive resins, and mixtures thereof which are conventionally employed as binders for magnetic recording media.

The binder resins have a glass transition temperature of from $-40°$ to 150° C. and a weight average molecular weight of from 10,000 to 300,000, and preferably from 10,000 to 100,000.

Examples of thermoplastic resins suitable as binders include vinyl copolymers, e.g., a vinyl chloride-vinyl acetate copolymer, a vinyl chloride-vinyl acetate-vinyl alcohol, maleic acid and/or acrylic acid copolymer, a vinyl chloride-vinylidene chloride copolymer, a vinyl chloride-acrylonitrile copolymer, and an ethylene-vinyl acetate copolymer; cellulose derivatives, e.g., nitrocellulose, cellulose acetate propionate, and cellulose acetate butyrate; acrylic resins, polyvinyl acetal resins, polyvinyl butyral resins, polyester polyurethane resins, polyether polyurethane resins, polycarbonate polyurethane resins, polyester resins, polyether resins, polyamide resins, amino resins; rubbery resins, e.g., styrenebutadiene resins and butadiene-acrylonitrile resins; silicone resins, fluorine-containing resins, and the like. Of these, vinyl chloride resins are preferred because of their high capability of dispersing ferromagnetic powders.

The thermosetting resins or reactive resins which can be used as binder resins are resins whose molecular weight increases significantly on heating and include, for example, phenol resins, phenoxy resins, epoxy resins, curable polyurethane resins, urea resins, melamine resins, alkyd resins, silicone resins, acrylic reactive resins, epoxy-polyamide resins, nitrocellulose melamine resins, mixtures of a high-molecular polyester resin and an isocyanate prepolymer, urea-formaldehyde resins, mixtures of a low-molecular glycol, high-molecular diol, and a polyisocyanate, polyamine resins, and mixtures thereof.

The radiation-curable resins which can be used as binder resins include those obtained by bonding a group containing a carbon-carbon unsaturated bond to the above-mentioned thermoplastic resins as a radiation-curing functional group. Preferred functional groups include an acryloyl group and a methacryloyl group.

The above-illustrated binder resins to which a polar group. (e.g., epoxy, $CO_2M$, OH, $NR_2$, $NR_3X$, $SO_3M$, $OSO_3M$, $PO_3M_2$, and $OPO_3M_2$, wherein M, which may be the same or different per group, is a hydrogen atom, an alkali metal or ammonium; R is a hydrogen atom or a $C_{1-4}$ alkyl group; and X is a halogen) is introduced are preferred in view of the dispersibility and durability of the magnetic powders therein. The polar group content ranges from $10^{-7}$ to $10^{-3}$ equivalent, and preferably from $10^{-6}$ to $10^{-4}$ equivalent, per gram of the polymer.

The above-mentioned high-molecular weight binders may be used either individually or in combination of two or more. These binders may be cured in the presence of a known isocyanate type crosslinking agent and/or a radiation-curing vinyl monomer.

The isocyanate type crosslinking agents are polyisocyanate compounds having two or more isocyanate groups per molecule, e.g., tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane diisocyanate; reaction products between these diisocyanate compounds and polyalcohols; and polyisocyanate compounds obtained by condensation of these diisocyanate compounds. These polyisocyanate compounds are commercially available under the trademarks of Collonate L, Collonate HL, Collonate H, Collonate EH, Collonate 2014, Collonate 2030, Collonate 2031, Collonate 2036, Collonate 3015, Collonate 3040, Collonate 3041, Millionate MR, Millionate MTL, Daltsec 1305, Daltsec 2170, and Daltsec 2280 (all of the above are products of Nippon Polyurethane Industry Co., Ltd.); Takenate D102, Takenate D110N, Takenate D200, and Takenate D202 (products of Takeda Chemical Industries, Ltd.); Sumidur N75 (product of Sumitomo Bayer Co., Ltd.); Desmodur L, Desmodur IL, Desmodur N, and Desmodur HL (products of Bayer A.G.); and Burnock D850 and Burnock D802 (products of Dai-Nippon Ink & Chemicals, Inc.).

The radiation-curable vinyl monomers are compounds which are polymerizable by irradiation, and include those having at least one carbon-carbon unsaturated bond per molecule thereof. Examples of such vinyl monomers are (meth)acrylic esters, (meth)acrylamides, allyl compounds, vinyl ethers, vinyl esters, vinyl heterocyclic compounds, N-vinyl compounds, styrene, (meth)acrylic acid, crotonic acid, itaconic acid, and olefins. Preferred are those having two or more (meth)acryloyl groups, such as polyethylene glycol (meta)acrylates (e.g., diethylene glycol di(meth)acrylate and triethylene glycol di(meth)acrylate), trimethylolpropane tri(meth)acrylate, pentaerythritol tetra(meth)acrylate, dipentaerythritol penta(meth)acrylate, dipentaerythritol hexa(meth)acrylate, and reaction products between polyisocyanates and hydroxy(meth)acrylates.

These crosslinking agents are preferably added in an amount of from .5 to 45% by weight based on the total binder containing the crosslinking agents.

Hydrophilic binders may also be used in the magnetic recording layer. Suitable hydrophilic binders include water-soluble polymers, cellulose esters, latex polymers, and water-soluble polyesters as illustrated in *Research Disclosure*, No. 17643, p. 26 and Ibid., No. 18716, p. 651. Examples of the water-soluble polymers are gelatin, gelatin derivatives, casein, agar, sodium alginate, starch, polyvinyl alcohol, polyacrylic acid copolymers, and maleic anhydride copolymers. Examples of the cellulose esters are carboxymethyl cellulose and hydroxyethyl cellulose. Examples of the latex polymers are vinyl chloride copolymers, vinylidene chloride copolymers, acrylic ester copolymers, vinyl acetate copolymers, and butadiene copolymers. The most preferred of the hydrophilic binders is gelatin.

Any available gelatin species can be used, including alkali-(or lime-)processed gelatin prepared by alkali bath immersion before extraction, acid-processed gelatin prepared by acid bath immersion before extraction, alkali- and acid-processed gelatin, and enzyme-processed gelatin. If desired, part of the gelatin may be replaced with colloidal albumin, casein, cellulose derivatives (e.g., carboxymethyl cellulose, hydroxyethyl cellulose), sugar derivatives (e.g., agar, sodium alginate, starch derivatives, dextran), synthetic hydrophilic colloids (e.g., polyvinyl alcohol, poly-N-vinylpyrrolidone, polyacrylic acid copolymers, polyacrylamide, or derivatives or partial hydrolysis products thereof), gelatin derivatives, and so on.

The gelatin-containing magnetic recording layer is preferably hardened with a gelatin hardening agent. Examples of suitable hardening agents include aldehyde compounds, e.g., formaldehyde and glutaraldehyde; ketone compounds, e.g., diacetyl and cyclopentanedione; bis(2-chloroethylurea), 2-hydroxy-4,6-dichloro-1,3,5-triazine; compounds containing a reactive halogen atom described in U.S. Pat. Nos. 3,288,775 and 2,732,303 and British Patents 974,723 and 1,167,207; divinyl sulfone, 5-acetyl-1,3-diacryloylhexahydro-1,3,5-triazine; compounds containing a reactive olefin as described in U.S. Pat. Nos. 3,635,718 and 3,232,763 and British Patent 994,869; N-hydroxymethylphthalimide; N-methylol compounds described in U.S. Pat. Nos. 2,732,316 and 2,586,168; isocyanate compounds described in U.S. Pat. No. 3,103,437; aziridine compounds described in U.S. Pat. Nos. 3,017,280 and 2,983,611; acid derivatives described in U.S. Pat. Nos. 2,725,294 and 2,725,295; epoxy compounds described in U.S. Pat. No. 3,091,537; and halogencarboxyaldehydes, e.g., mucochloric acid. In addition, inorganic hardening agents, such as chromium alum, zirconium sulfate, and carboxylactivated hardening agents disclosed in JP-B-56-12853, JP-B-58-32699, Belgian Patent 825,726, JP-A-60-225148, JP-A-51-126125, JP-B-58-50699, JP-A-52-54427, and U.S. Pat. No. 3,321,313, are also suitabe.

The hardening agent is typically used in an amount of from 0.01 to 30% by weight, and preferably from 0.05 to 20% by weight, based on the weight of dry gelatin.

The magnetic recording layer has a thickness of from 0.1 to 10 $\mu$m, preferably of from 0.2 to 5 $\mu$m, and more preferably of from 0.5 to 3 $\mu$m.

If desired, the magnetic recording layer may further contain antistatic agents, lubricants, matting agents, surface active agents, and the like.

Suitable lubricants include saturated or unsaturated fatty acids (e.g., myristic acid, stearic acid, oleic acid, and mixed fatty acids obtained by decomposing natural animal or vegetable oils, and if desired, followed by hydrogenation), metallic soaps, N-substituted or unsubstituted fatty acid amides, fatty acid esters (various monoesters as well as di- or higher esters with sorbitan, glycerin, etc., and polybasic acid ester compounds), ester compounds having an ether linkage, higher aliphatic alcohols, monoalkyl phosphates, dialkyl phosphates, trialkyl phosphates, paraffins, silicone oils, animal or vegetable oils, mineral oils, higher aliphatic amines; inorganic fine powders, e.g., graphite, silica, molybdenum disulfide, and tungsten disulfide; and resins, e.g., polyethylene, polypropylene, polyvinyl chloride, ethylene-vinyl chloride copolymers, and polytetrafluoroethylene.

Suitable antistatic agents include conductive fine powders, e.g., carbon black and carbon blackgrafted polymers. Suitable surface active agents include natural surface active agents, e.g., saponin; nonionic surface active agents, e.g., alkylene oxide type, glycerin type, and glycidol type; cationic surface active agents, e.g., higher alkylamines, quaternary ammonium salts, salts of heterocyclic compounds (e.g., pyridine), phosphonium salts, and sulfonium salts; anionic surface active agents containing an acid radical, e.g., a carboxyl group, a phospho group, a sulfuric ester group, and a phosphoric ester group; and amphoteric surface active agents, e.g., amino acids, aminosulfonic acids, and amino alcohol sulfuric or phosphoric esters.

In addition, fine particles of metal oxides, e.g., ZnO, $TiO_3$, $SnO_2$, $AlO_3$, $In_2O_3$, $SiO_2$, MgO, BaO, and $MoO_3$, are preferred antistatic agents.

The magnetic recording layer is preferably provided on the side of the support opposite the light-sensitive side. It can be formed by coating or printing a magnetic recording layer coating composition on the reverse of a transparent support. Alternatively, a polymer solution having dispersed therein magnetic particles and a polymer solution for forming a transparent support may be co-cast to prepare a support having a magnetic recording layer thereon. In this case, both solutions preferably have substantially the same polymer composition.

The magnetic recording layer may be designed so as to have other characteristics such as improvement in lubricity, control of curling, prevention of static charge, prevention of adhesion, and the like. These characteristics may be achieved by separately providing a particular functional layer. If desired, a protective layer may be provided on the magnetic recording layer to improve scratch resistance.

The S/N ratio of magnetic signals can be increased by smoothing the reverse of the transparent support on which the magnetic recording layer has been formed by calendering. In this case, it is preferable that the coating of light-sensitive layers be preceded by the calendering.

The L*a*b* colorimetric system is described in JIS Z8729 (1980) incorporated herein by reference, "Color specification according to an L*a*b* colorimetric system or an L*u*v* colorimetric system". (As used herein, "JIS" refers to "Japanese Industrial Standards".) The specific method of calculation is described in the specification of JIS Z 8729 incorporated herein by reference, p. 11.

The psychometric lightness L* shall be obtained by using Y of tristimulus values specified in JIS 8701 or JIS Z 8728 from the following formula:

$$L^* = 116(Y/Y_n)^{\frac{1}{3}} - 16 \quad Y/Y_n > 0.008\ 856 \quad (1)$$

where
- $Y$: value of tristimulus values in XYZ system
- $Y_n$: value of Y according to standard illuminant of perfect diffuser The psychometric chroma coordinates a*, b* of the CIE 1976 (L*a*b*) space shall be obtained by using tristimulus values in XYZ system, X, Y and Z from the following formulae:

$$a^* = 500[(X/X_n)^{\frac{1}{3}} - (Y/Y_n)^{\frac{1}{3}}] \quad X/X_n > 0.008\ 856 \quad (3)$$
$$b^* = 200[(Y/Y_n)^{\frac{1}{3}} - (Z/Z_n)^{\frac{1}{3}}] \quad Y/Y_n > 0.008\ 856$$
$$Z/Z_n > 0.008\ 856$$

where
- X, Y, Z: tristimulus values in X Y Z system
- $X_n, Y_n, Z_n$: tristimulus values in X Y Z system of perfect reflecting diffuser 1. If there is a value not more than 0.008 856 in X/Xn, Y/Yn, or Z/Zn, the calculation shall be carried out by substituting the item of cubic root corresponding to formulae (3) by 7.787 (X/Xn)+16/116, 7.787 (Y/Yn)+16/116 or 7.787 (Z/Zn)+16/116.

Determination of tristimulus values in CIE 1964 $X_{10}Y_{10}Z_{10}$ Colorimetric System is described in the specification of JIS Z8701 incorporated herein by reference.

The tristimulus values of a light source colour according to XYZ colour specification system can be obtained by the use of the following formulae:

$$\left. \begin{array}{l} X = k \int_{300}^{700} S(\lambda)\bar{x}(\lambda)d\lambda \\ Y = k \int_{300}^{700} S(\lambda)\bar{y}(\lambda)d\lambda \\ Z = k \int_{300}^{700} S(\lambda)\bar{z}(\lambda)d\lambda \end{array} \right\} \quad (1)$$

where
- $S(\lambda)$: relative spectral distribution of radiant quantity from light source
- $\bar{x}(\lambda), \bar{y}(\lambda)$ and $\bar{z}(\lambda)$: isochromatic functions for XYZ colour specification system
- k: proportional ratio; this shall be determined so that the value Y of tristimulus values may meet the illuminous quantity ($^1$).

Note ($^1$) In the case where the value S(λ) is an absolute value of spectral emission density in XYZ colour specification system, the value 683 lm·W$^{-1}$ shall be used as k for obtaining the absolute value of luminous quantity.

The tristimulus values $X_{10}, Y_{10}$ and $Z_{10}$ of a light source colour for $X_{10}, Y_{10}, Z_{10}$ colour specification system can be obtained by using isochromatic functions $\bar{x}_{10}(\lambda), \bar{y}_{10}(\lambda)$ and $\bar{z}_{10}(\lambda)$ for $X_{10}Y_{10}Z_{10}$ colour specification system in place of isochromatic functions $\bar{x}(\lambda), \bar{y}(\lambda)$ and $\bar{z}(\lambda)$ given in the formulae (1). The value k can be obtained by using an arbitrary constant.

The value $Y_{10}$ of tristimulus values for $X_{10} Y_{10} Z_{10}$ colour specification system does not correspond to the luminous quantity.

The tristimulus values X, Y nd Z of object colour produced by reflection which are to be presented by using XYZ colour specification system can be obtained by the use of the following formulae:

$$\left. \begin{array}{l} X = K \int_{300}^{700} S(\lambda)\bar{x}(\lambda)R(\lambda)d\lambda \\ Y = K \int_{300}^{700} S(\lambda)\bar{y}(\lambda)R(\lambda)d\lambda \\ Z = K \int_{300}^{700} S(\lambda)\bar{z}(\lambda)R(\lambda)d\lambda \end{array} \right\} \quad (2)$$

$$K = \frac{100}{\int_{300}^{700} S(\lambda)\bar{y}(\lambda)d\lambda}$$

where
- $S(\lambda)$: relative spectral distribution of standard light to be used for colour specification
- $\bar{x}(\lambda), \bar{y}(\lambda)$ and $\bar{z}(\lambda)$: isochromatic functions to be used for XYZ colour specification system
- $R(\lambda)$: spectral configuration luminous reflection factor The value Y of tristimulus values for XYZ colour specification system makes itself a value, presented in percentage, of luminous reflection factor.

The tristimulus values X, Y and Z of an object colour produced by transmission which are to be presented by using XYZ colour specification system can be obtained by the use of the following formula:

$$\left. \begin{array}{l} X = K \int_{300}^{700} S(\lambda)\bar{x}(\lambda)\tau(\lambda)d\lambda \\ Y = K \int_{300}^{700} S(\lambda)\bar{y}(\lambda)\tau(\lambda)d\lambda \\ Z = K \int_{300}^{700} S(\lambda)\bar{z}(\lambda)\tau(\lambda)d\lambda \end{array} \right\} \quad (3)$$

$$K = \frac{100}{\int_{300}^{700} S(\lambda)\bar{y}(\lambda)d\lambda}$$

where
- $S(\lambda)$: relative spectral distribution of standard light to be used for colour specification
- $\bar{x}(\lambda), \bar{y}(\lambda)$ and $\bar{z}(\lambda)$: isochromatic functions to be used for XYZ colour specification system
- $\tau(\lambda)$: spectral transmission factor The value Y of tristimulus values for XYZ colour specification system makes itself a value, presented in percentage, of luminous reflection factor $\tau_0$.

The tristimulus values $X_{10}, Y_{10}$ and $Z_{10}$ of an object colour produced by transmission which are to be presented by using $X_{10}Y_{10}Z_{10}$ colour specification system can be obtained by using the isochromatic functions $\bar{x}(\lambda), \bar{y}(\lambda)$ and $\bar{z}(\lambda)$ for $X_{10}Y_{10}Z_{10}$ colour specification system in place of the isochromatic functions $\bar{x}(\lambda), \bar{y}(\lambda)$ and $\bar{z}(\lambda)$ given in the formulae (3).

The chromaticity coordinates x, y and z for XYZ colour specification system can be obtained by the calculation using the following formulae:

$$x = \frac{X}{X+Y+Z}$$
$$y = \frac{Y}{X+Y+Z}$$
$$z = \frac{Z}{X+Y+Z} = 1 - x - y$$
(4)

where X, Y and Z: tristimulus values

The chromaticity coordinates $x_{10}$, $y_{10}$ and $z_{10}$ for $X_{10}$, $Y_{10}$ and $Z_{10}$ colour specification system can be obtained by replacing the tristimulus values X, Y and Z in formulae (4) with the tristimulus values $X_{10}$, $Y_{10}$ and $Z_{10}$ for $X_{10}Y_{10}Z_{10}$ colour specification system.

In the present invention, the minimum density area of an image area after development processing has a chromaticity defined by an a* value of from −5 to 5, a b* value of from −5 to 5, and an L* value of not less than 80 as obtained from tristimulus values in CIE 1964 $X_{10}Y_{10}Z_{10}$ Colorimetric System under an illuminant C as specified in JIS Z8720 (1983) incorporated herein by reference.

The standard illuminant C is the illuminant having spectral distribution specified in Attached Table 1 and shall be used where the non-luminous object to be illuminated by daylight is specified. However, the standard illuminant C shall not be used for specification of non-luminous object generating fluorescence by excitation of ultrasonic radiation.

The standard illuminant C closely resembles daylight of about 6774 K in correlated colour temperature and the relative value of spectral distribution at ultraviolet part in small in comparison with this daylight, and therefor there is a tendency to exchange it with standard illuminant $D_{65}$ gradually.

TABLE 1

| Values of Relative Spectral Power Distribution of Standard Illuminant C | |
|---|---|
| Wavelength nm | C |
| 300 | — |
| 305 | — |
| 310 | — |
| 315 | — |
| 320 | 0.01 |
| 325 | 0.20 |
| 330 | 0.40 |
| 335 | 1.55 |
| 340 | 2.70 |
| 345 | 4.85 |
| 350 | 7.00 |
| 355 | 9.95 |
| 360 | 12.90 |
| 365 | 17.20 |
| 370 | 21.40 |
| 375 | 27.50 |
| 380 | 33.00 |
| 385 | 39.92 |
| 390 | 47.40 |
| 395 | 55.17 |
| 400 | 63.30 |
| 405 | 71.81 |
| 410 | 80.60 |
| 415 | 89.53 |
| 420 | 98.10 |
| 425 | 105.80 |
| 430 | 112.40 |
| 435 | 117.75 |
| 440 | 121.50 |
| 445 | 123.45 |
| 450 | 124.00 |
| 455 | 123.60 |
| 460 | 123.10 |

TABLE 1-continued

| Values of Relative Spectral Power Distribution of Standard Illuminant C | |
|---|---|
| Wavelength nm | C |
| 465 | 123.30 |
| 470 | 123.80 |
| 475 | 124.09 |
| 480 | 123.90 |
| 485 | 122.92 |
| 490 | 120.70 |
| 495 | 116.90 |
| 500 | 112.10 |
| 505 | 106.98 |
| 510 | 102.30 |
| 515 | 98.81 |
| 520 | 96.90 |
| 525 | 96.78 |
| 530 | 98.00 |
| 535 | 99.94 |
| 540 | 102.10 |
| 545 | 103.95 |
| 550 | 105.20 |
| 555 | 105.67 |
| 560 | 105.30 |
| 565 | 104.11 |
| 570 | 102.30 |
| 575 | 100.15 |
| 580 | 97.80 |
| 585 | 95.43 |
| 590 | 93.20 |
| 595 | 91.22 |
| 600 | 89.70 |
| 605 | 88.83 |
| 610 | 88.40 |
| 615 | 88.19 |
| 620 | 88.10 |
| 625 | 88.06 |
| 630 | 88.00 |
| 635 | 87.86 |
| 640 | 87.80 |
| 645 | 87.99 |
| 650 | 88.20 |
| 655 | 88.20 |
| 660 | 87.90 |
| 665 | 87.22 |
| 670 | 86.30 |
| 675 | 85.30 |
| 680 | 84.00 |
| 685 | 82.21 |
| 690 | 80.20 |
| 695 | 78.24 |
| 700 | 76.30 |
| 705 | 74.36 |
| 710 | 72.40 |
| 715 | 70.40 |
| 720 | 68.30 |
| 725 | 66.30 |
| 730 | 64.40 |
| 735 | 62.80 |
| 740 | 61.50 |
| 745 | 60.20 |
| 750 | 59.20 |
| 755 | 58.50 |
| 760 | 58.10 |
| 765 | 58.00 |
| 770 | 58.20 |
| 775 | 58.50 |
| 780 | 59.10 |
| 785 | — |
| 790 | — |
| 795 | — |
| 800 | — |
| 805 | — |
| 810 | — |
| 815 | — |
| 820 | — |
| 825 | — |
| 830 | — |

Remark: On the place of — line, the spectral distribution is not specified.

In color reversal light-sensitive materials which are desired to have high fidelity in color and tone reproduction, coloration attributed to a magnetic recording layer is disadvantageous and is deemed to be a major problem particularly in the highlight area. It is quite an unexpected finding that the presence of a colored layer cannot interfere with color reproduction where the chromaticity of the minimum density area is controlled within the above-described specific range. It is theorized, although it has not been proven, that such an effect results from interactions between the adaptability of human eyes to darkness (color reversal films are seen under a closed condition such as slide projection) and the fact that the color of the magnetic recording layer has an absorption in a blue light region of relatively low luminosity.

The light-sensitive material according to the present invention comprises on a transparent support at least a red-sensitive silver halide emulsion layer containing a cyan coupler, a green-sensitive silver halide emulsion layer containing a magenta coupler, and a blue-sensitive silver halide emulsion layer containing a yellow coupler and having on the reverse thereof a magnetic recording layer.

The light-sensitive material may further have, on the side of the light-sensitive emulsion layers, subbing layers, antihalation layes, color mixing preventive layers, filter layers, protective layers, and other auxiliary layers. Each emulsion layer may be composed of two or more layers having the same color sensitivity. On the side of the magnetic recording layer, there may be further provided a subbing layer, a protective layer, and other auxiliary layers.

While the objects of the present invention are accomplished when the a*, b*, and L* values fall within the above-specified respective ranges, the a* and b* values each preferably are from −4 to 4, and more preferably from −3 to 3, and the L* value is preferably more than 80, and more preferably not less than 85.

There are various means for controlling the chromaticity of the minimum density area of the image area after development processing to a specific range, and the present invention is not restricted thereby. Illustrative examples of possible means are described below by the following Methods 1 to 3.

Method 1. A non-imagewise nondiffusible dye which is not decolored during development processing is added to any layer of a light-sensitive material.

Method 2. The minimum density of each of yellow, magenta, and cyan layers is adjusted.

Mehotd 3. A layer capable of uniformly developing a color during development processing is provided.

Method 1 is advantageous for the easy and stable achievement of the objects of the present invention. The dye is added to any one or more of a support, emulsion layers and auxiliary layers on the side of light-sensitive layers, and various layers on the side of the magnetic recording layer.

In a commonly employed film unit in which a roll of film is packed in a cartridge with its leader out, the dye may be added to the support so as to protect the film in the cartridge from undesired light exposure due to light-piping through the support of the leader. In cases where the dye is added to the light-sensitive side, it is advantageous to add a light-insensitive layer between emulsion layers and the support so as to produce an antihalation effect, or to add a light-insensitive layer beneath each emulsion layer so as to attain a sharpness improving effect.

When adding a light-insensitive layer beneath each emulsion layer, it is very advantageous to use a dye whose color is complementary to the spectral sensitivity region of the upper light-sensitive layer whereby the improvement in sharpness is efficiently effected and, at the same time, separation of color sensitivity can be improved.

However, where a film is used in the above-described usual cartridge system, sufficient prevention of light-piping requires addition of a dye to the support so as to absorb the whole wavelength region of outside light. Since the magnetic recording layer is provided on the reverse of the support as stated above, coloration of the magnetic recording layer has little effect on light-piping prevention. Accordingly, to obtain a desired light-piping preventive effect, it is necessary to additionally add a dye which absorbs light of the same wavelength as the magnetic recording layer to the support. As a result, the amount of the dyes added exceeds the minimum amount necessary for chromaticity control, which is not economical and also results in an increase in density of the image area more than necessary. Moreover, addition of the dye to the support means restricting the addition of dyes to the light-sensitive side, making it difficult to obtain the above-mentioned improvements in photographic performance.

In a light-shut film unit in which a film is packed in a cartridge with its film leader inside as disclosed in U.S. Pat. No. 4,423,943, the above-described light-piping can be prevented so that dye addition to the support is unnecessary. That is, addition of dyes in amounts more than necessary can be avoided, and dyes may be added to the image-forming layer side without any restriction to achieve sufficient improvements in sharpness and color separation.

Dyes which may be added to the image-forming layer in Method 1 include known dyes, such as anthraquinone dyes as described in British Patents 1,137,595 and 1,199,746, JP-A-64-56662, JP-A-54-37725, JP-B-47-8735, U.S. Pat. Nos. 2,611,772, 3,475,173, and 4,481,314; azo dyes as described in U.S. Pat. Nos. 2,622,026, 3,829,410, 4,264,495, and 4,271,071; azomethine dyes or indoaniline dyes as described in JP-A-60-186567 and U.S. Pat. Nos. 1,921,545 and 3,547,640; cyanine dyes as described in U.S. Pat. Nos. 2,895,955, 3,615,562, and 3,632,808; styryl dyes or merocyanine dyes as described in U.S. Pat. Nos. 1,845,404, 3,486,897, and 3,770,757; and dyes described in JP-A-55-93150.

Specific examples of these dyes are shown below for illustrative purposes only but not for limitation.

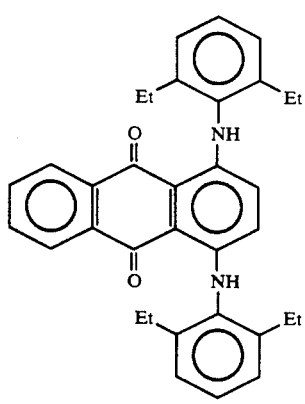 (Z-1)
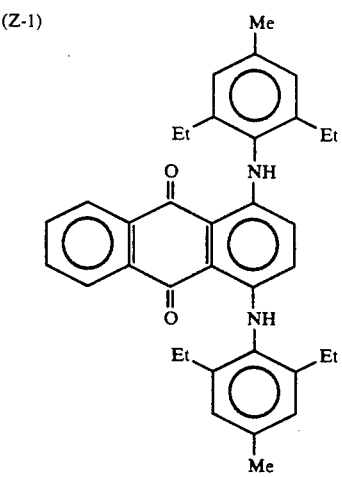 (Z-2)
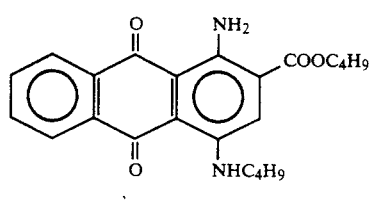 (Z-3)
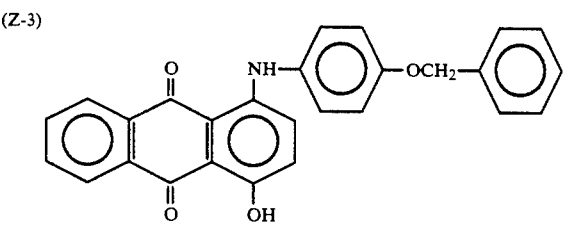 (Z-4)
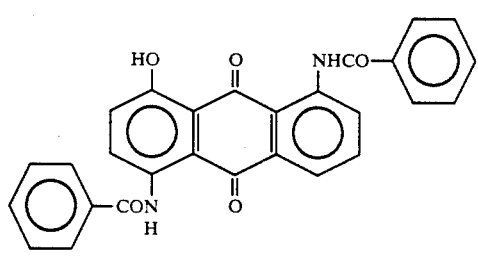 (Z-5)
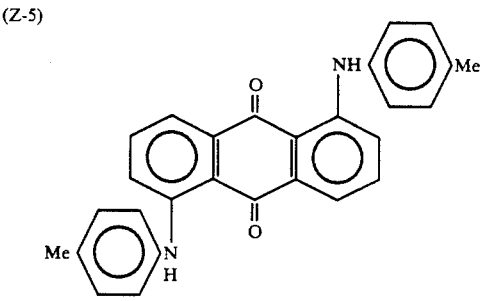 (Z-6)
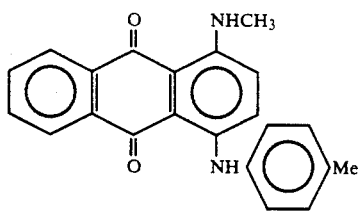 (Z-7)
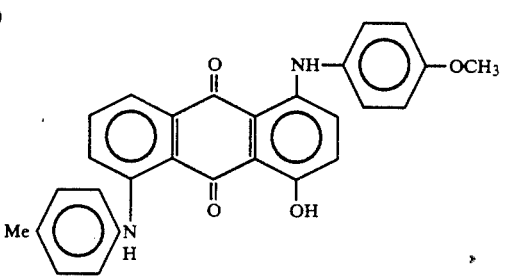 (Z-8)
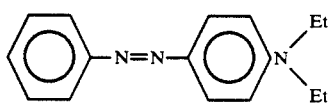 (Z-9)
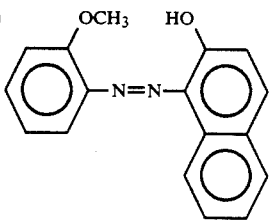 (Z-10)

-continued

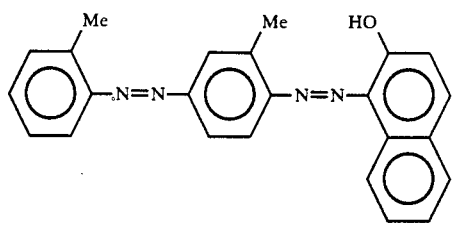 (Z-11)

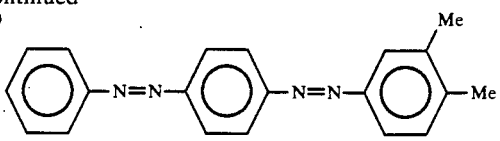 (Z-12)

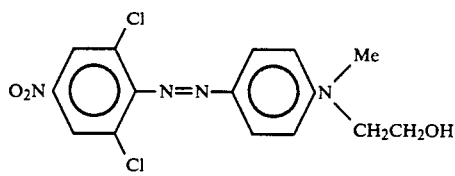 (Z-13)

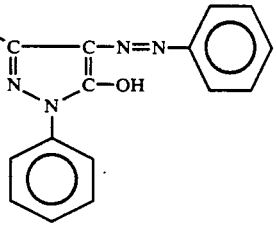 (Z-14)

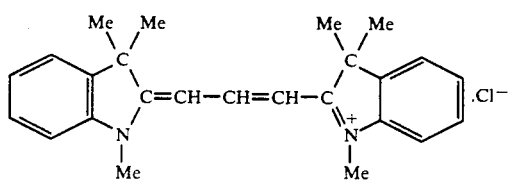 (Z-15)

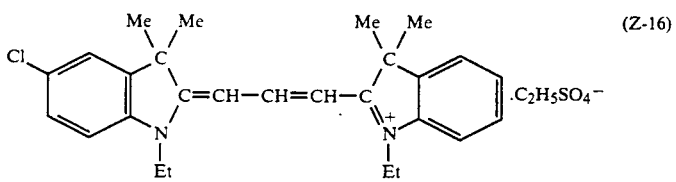 (Z-16)

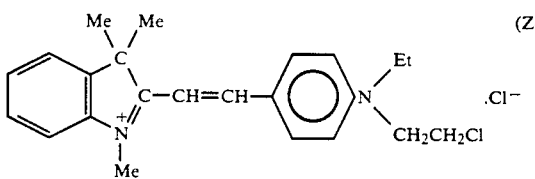 (Z-17)

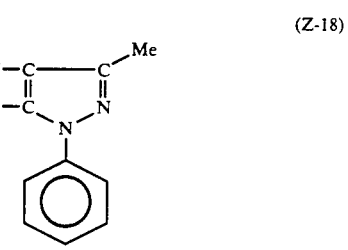 (Z-18)

Indanthrene Yellow GK (Z-19) Indigo (Z-20)
Phthalocyanine Blue (Z-21)

In particular, azomethine dyes and indoaniline dyes represented by formulae (I) to (VI) shown below are advantageously used in the present invention.

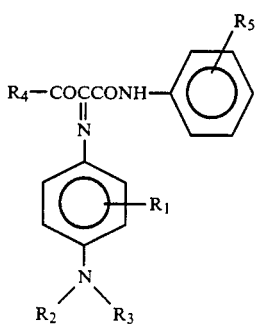 (I)

wherein $R_1$ represents one or more substituents, which may be the same or different, selected from a hydrogen atom, a halogen atom (e.g., F, Cl, Br, I), an alkyl group (e.g., methyl, ethyl, butyl), and an alkoxy group (e.g., methoxy, ethoxy, methoxyethoxy, butoxy, dodecyloxy); $R_2$ and $R_3$ each represent a hydrogen atom or an alkyl group (e.g., methyl, ethyl, amyl, $\beta$-methanesulfonamidoethyl, butyl, hydroxyethyl); $R_4$ represents an alkyl group (e.g., methyl, ethyl, t-butyl, cyclopentyl, t-pentyl, cyclohexyl, 2-ethylhexyl, 1,1,3,3-tetramethylbutyl, dodecyl, hexadecyl, allyl, 3-cyclohexenyl, oleyl, trifluoromethyl, hydroxymethyl, methoxyethyl, ethoxycarbonylmethyl, phenoxyethyl, benzyl, norbornyl) or an aryl group (e.g., phenyl, 1-naphthyl, 2,4,6-trichlorophenyl, 2,4-dichloro-5-methylphenyl, p-tolyl, o-tolyl, p-chloroethyl, 4-methoxyphenyl, 8-quinolyl, 4-hexadecyloxyphenyl, pentafluorophenyl, p-hydroxyphenyl, p-cyanophenyl, 3-pentadecylphenyl, 2,4-di-t-pentylphenyl, p-methanesulfonamidophenyl, 3,4-dichlorophenyl); and $R_5$ represents one or more substituents, which may be the same or different, selected from a hydrogen atom, an alkyl group (specific examples thereof are the same as for the alkyl group as $R_4$), an aryl group (specific examples thereof are the same as for the aryl group as $R_4$), a halogen atom (e.g., F, Cl, Br, I), an alkoxy group (e.g., methoxy, ethoxy, methoxyethoxy, butoxy, dodecyloxy), an aryloxy group (e.g., phenoxy, p-tolyloxy, p-methoxyphenoxy), an alkoxycarbonyl group (e.g., methoxycarbonyl, ethoxycarbonyl, α-(dodecyloxycarbonyl)ethyloxycarbonyl), an aryloxycarbonyl group (e.g., phenoxycarbonyl, 2,5-di-t-pentylphenoxycarbonyl), a carbonamido group (e.g., tetradecylamido, 2-hexyldecylamido, γ-(2,5-di-t-pentylphenoxy)butylamido, hexadecylsulfonylbutylamido), a sulfonamido group (e.g., dodecylsulfonamido, dodecyloxyphenylsulfonamido), a carbamoyl group (e.g., α-(2,5-di-pentylphenoxy)butylcarbamoyl), a sulfamoyl group (e.g., N,N-dibutylsulfamoyl, γ-(2,5-di-t-pentylphenoxy)butanesulfamoyl), an alkylsulfonyl group (e.g., dodecylsulfonyl, o-pentadecylphenoxymethanesulfonyl), an arylsulfonyl group (e.g., phenylsulfonyl, p-dodecylphenylsulfonyl), a nitro group, a heterocyclic group (e.g., 2-furyl, 2-pyridyl, 4-pyridyl, 1-pyrazolyl, 1-imidazolyl, 1-benzotriazolyl, 2-benzotriazolyl, succinimido, phthalimido, 1-benzyl-2,4-imidazolidinedion-3-yl), a cyano group, an acyl group (e.g., acetyl, pentadecenyl, 2,5-di-t-pentylbenzoyl), an acyloxy group (e.g., dodecylcarbonyloxy, benzoyloxy), an alkylsulfonyloxy group (e.g., dodecylsulfonyloxy), and an arylsulfonyloxy group (e.g., 2,5-di-t-pentylphenylsulfonyloxy).

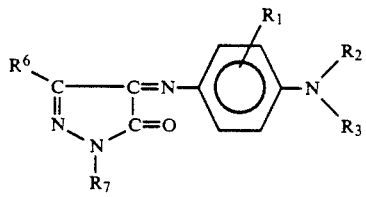
(II)

wherein $R_1$, $R_2$, and $R_3$ have the same meaning as in formula (I); $R_6$ represents a hydrogen atom, a halogen atom (e.g., F, Cl, Br, I), an alkyl group (e.g., methyl, ethyl, t-butyl, cyclopentyl, t-pentyl, cyclohexyl, 2-ethylhexyl, 1,1,3,3-tetramethylbutyl, dodecyl, hexadecyl, allyl, 3-cyclohexenyl, oleyl, trifluoromethyl, hydroxymethyl, methoxyethyl, ethoxycarbonylmethyl, phenoxyethyl, benzyl, norbornyl), an aryl group (e.g., phenyl, 1-naphthyl, p-tolyl, o-tolyl, p-chloroethyl, 4-methoxyphenyl, 8-quinolyl, 4-hexadecyloxyphenyl, pentafluorophenyl, p-hydroxyphenyl, p-cyanophenyl, 3-pentadecylphenyl, 2,4-di-t-pentylphenyl, p-methanesulfonamidophenyl, 3,4-dichlorophenyl), an alkoxy group (e.g., methoxy, ethoxy, methoxyethoxy, butoxy, dodecyloxy), an aryloxy group (e.g., phenoxy, p-tolyloxy, p-methoxyphenoxy), a heterocyclic group (e.g., 2-furyl, 2-thienyl, 2-pyrimidinyl, 2-benzothiazolyl), a cyano group, a hydroxyl group, a nitro group, a carboxyl group, an amino group, an acylamino group (e.g., acetamido, benzamido, tetradecaneamido, α-(2,4-di-t-amylphenoxybutane)amido, γ-(2,4-di-t-amylphenoxybutane)amido, α-(4-(4-hydroxyphenylsulfonyl)phenoxy)decaneamido), an alkylamino group (e.g., methylamino, butylamino, dodecylamino, diethylamino, methylbutylamino), an arylamino group (e.g., anilino, 2-chloroanilino, 2-chloro-5-tetradecaneanilino, 2-chloro-5-dodecyloxycarbonylanilino, N-acetylanilino, 2-chloro-5-(α-(3-t-butyl-4-hydroxyphenoxy)dodecaneamido)anilino), a ureido group (e.g., phenylureido, methylureido), a sulfamoylamino group (e.g., N,N-dipropylsulfamoylamino, N-methyl-N-decylsulfamoylamino), an alkylthio group (e.g., methylthio, octylthio, tetradecylthio, 2-phenoxyethylthio, 3-phenoxyethylthio, 3-(4-t-butylphenoxy)propylthio), an arylthio group (e.g., phenylthio, 2-butoxy-5-t-octylphenylthio, 3-pentadecylphenylthio, 2-carboxyphenylthio, 4-tetradecaneamidophenylthio), an alkoxycarbonylamino group (e.g., methoxycarbonylamino, tetradecyloxycarbonylamino), a sulfonamido group (e.g., methanesulfonamido, hexadecanesulfonamido, benzenesulfonamido, p-toluenesulfonamido, octadecanesulfonamido, 2-methyloxy-5-t-butylbenzenesulfonamido), a carbamoyl group (e.g., N-ethylcarbamoyl, N,N-dibutylcarbamoyl, N-(2-dodecyloxyethyl)carbamoyl), a sulfamoyl group (e.g., N-ethylsulfamoyl, N,N-dipropylsulfamoyl, N-(2-dodecyloxyethyl)sulfamoyl, N-ethyl-N-dodecylsulfamoyl, N,N-diethylsulfamoyl), a sulfonyl group (e.g., methanesulfonyl, octanesulfonyl, benzenesulfonyl, toluenesulfonyl), an alkoxycarbonyl group (e.g., methoxycarbonyl, butoxycarbonyl, dodecyloxycarbonyl), a heterocyclic oxy group (e.g., 1-phenyltetrazol-5-oxy, 2-tetrahydropyranyloxy), an azo group (e.g., phenylazo, 4-methoxyphenylazo, 4-pivaloylaminophenylazo), an acyloxy group (e.g., acetoxy), a carbamoyloxy group (e.g., N-methylcarbamoyloxy, N-phenylcarbamoyloxy), a silyloxy group (e.g., trimethylsilyloxy, dibutylbutylsilyloxy), an aryloxycarbonylamino group (e.g., phenoxycarbonylamino), an imido group (e.g., N-succinimido, 3-octadecenylsuccinimido), a heterocyclic thio group (e.g., 2-benzothiazolylthio, 2,4-di-phenoxy-1,3,5-triazole-6-thio, 2-pyridylthio), a sulfinyl group (e.g., dodecanesulfinyl, 3-phenoxypropylsulfinyl), a phosphonyl group (e.g., phenoxyphosphonyl, octyloxyphosphonyl, phenylphosphonyl), an aryloxycarbonyl group (e.g., phenoxycarbonyl), an acyl group (e.g., acetyl, 3-phenylpropanoyl, benzoyl, 4-dodecyloxybenzoyl), an azolyl group (e.g., imidazolyl, pyrazolyl, 3-chloropyrazol-1-yl, triazolyl), a carboxylic ester group (e.g., carbopropoxy, carbobutoxy, carboethoxy), an alkylamino group (e.g., dodecylamino), or a ureido group (e.g., dodecylureido, phenylureido); and $R_7$ has the same meaning as $R_6$.

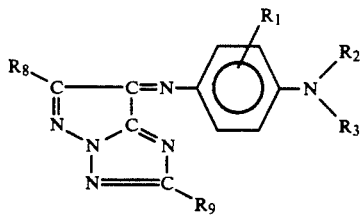
(III)

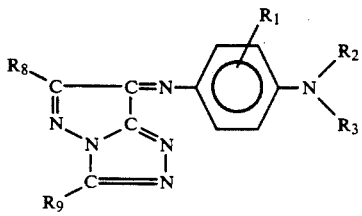
(IV)

In formulae (III) and (IV), $R_1$, $R_2$, and $R_3$ each have the same meaning as in formula (I); and $R_8$ and $R_9$ each have the same meaning as $R_6$ of formula (II).

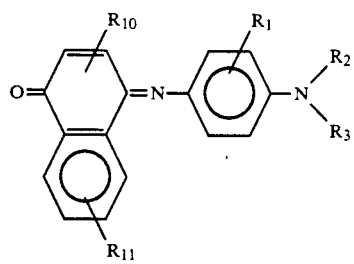
(V)

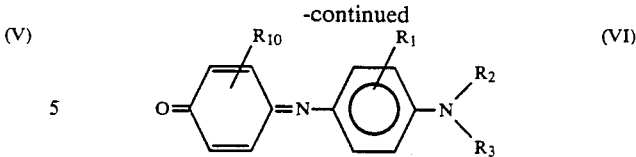

In formulae (V) and (VI), $R_1$, $R_2$, and $R_3$ each have the same meaning as in formula (I); and $R_{10}$ and $R_{11}$ each represent one or more Substituents, which may be the same or different, selected from the same groups as $R_5$ in formula (I).

Specific examples of the azomethine dyes and indoaniline dyes represented by formulae (I) to (VI) are shown below for illustration but not for limitation.

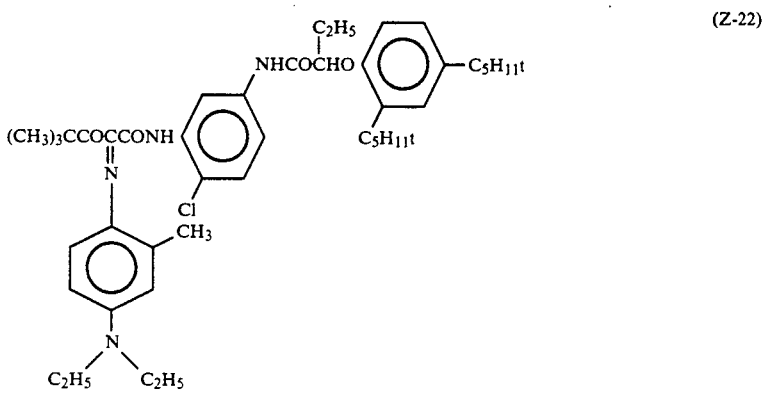

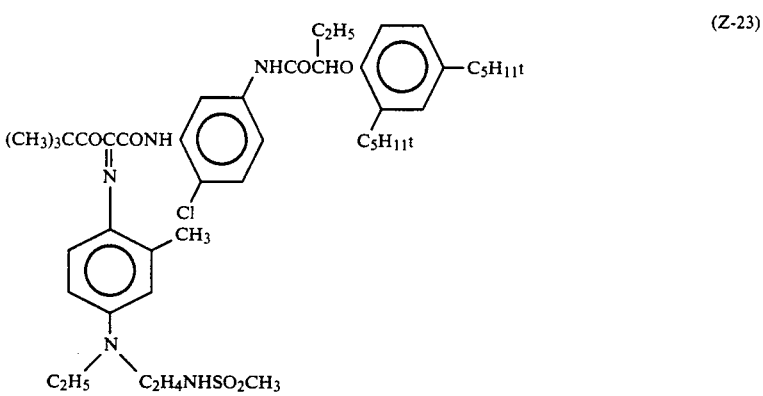

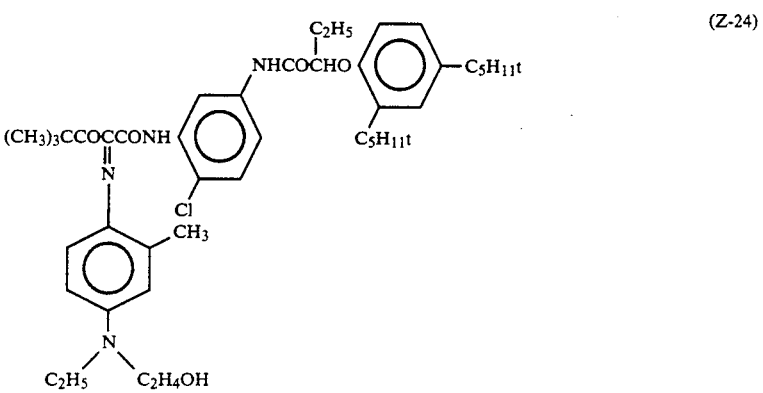

-continued
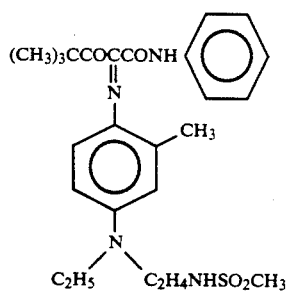 (Z-25)
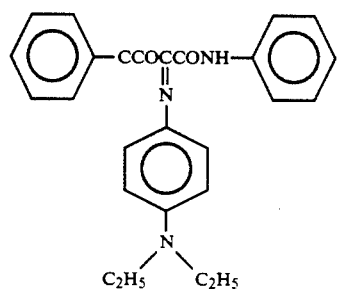 (Z-26)
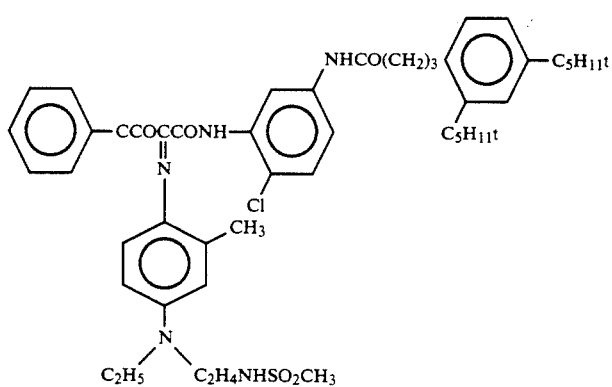 (Z-27)
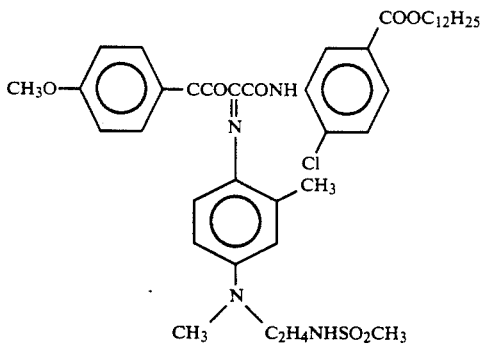 (Z-28)
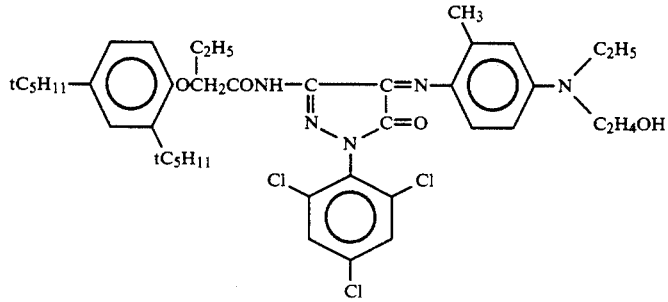 (Z-29)

-continued
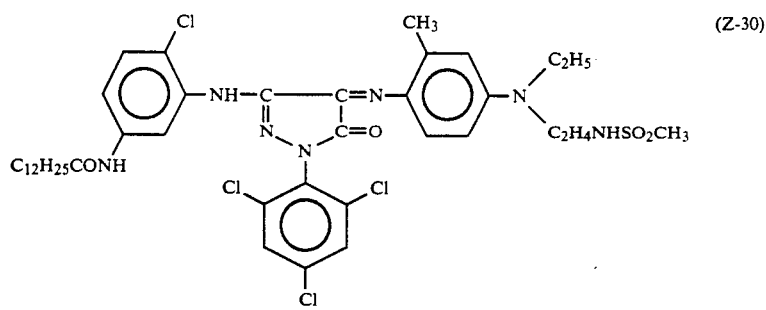 (Z-30)
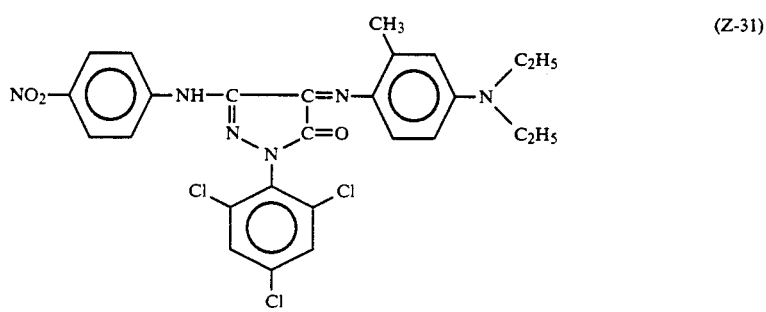 (Z-31)
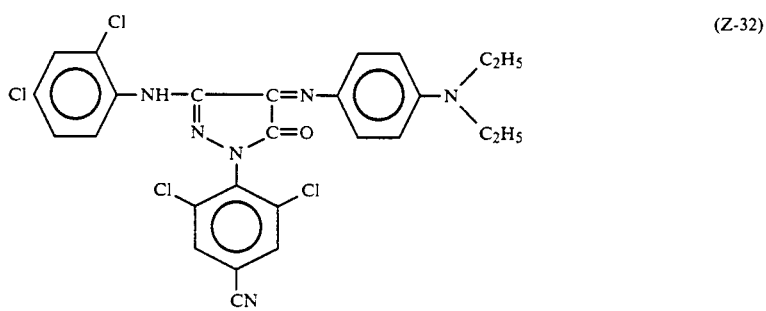 (Z-32)
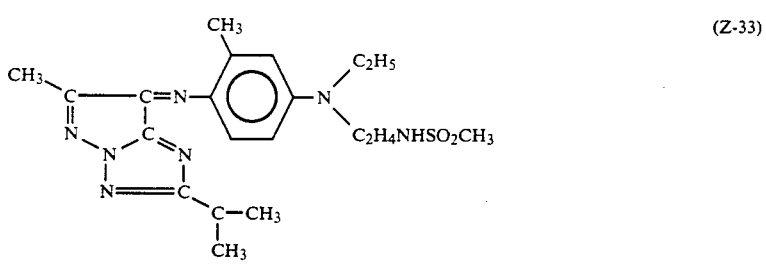 (Z-33)
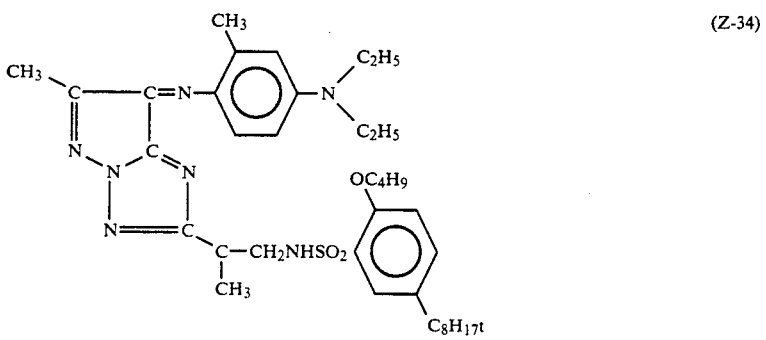 (Z-34)

-continued
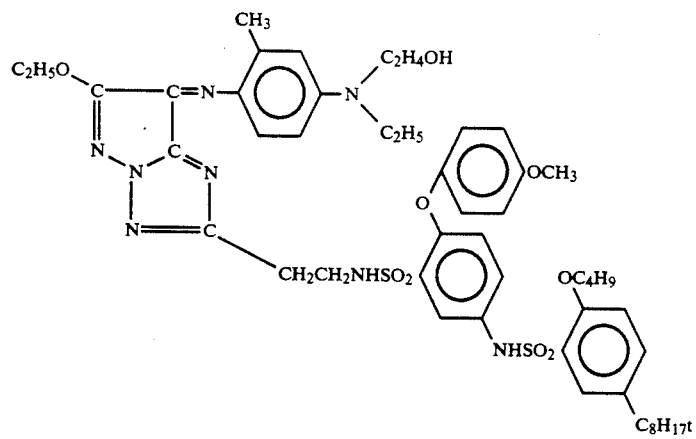
(Z-35)
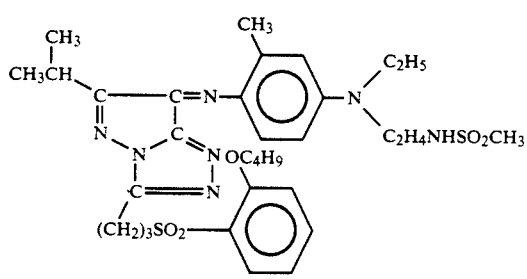
(Z-36)
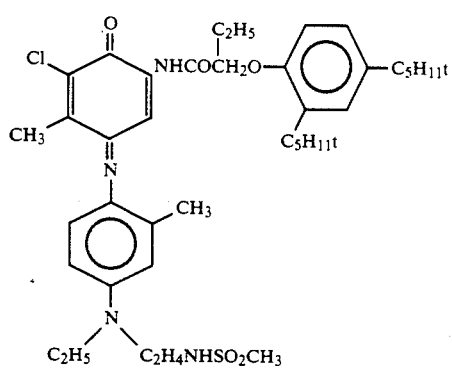
(Z-37)
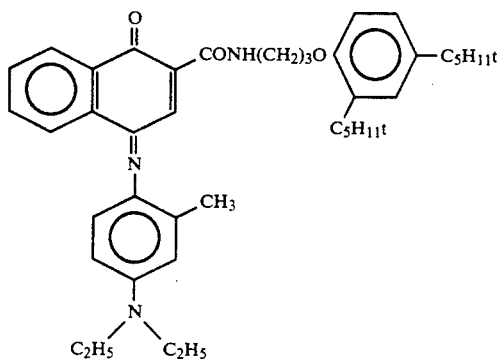
(Z-38)

-continued

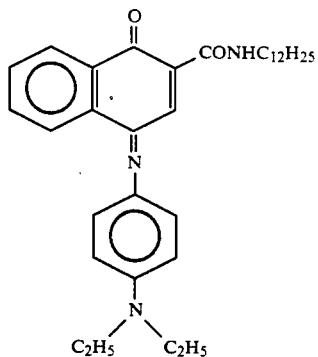 (Z-39)

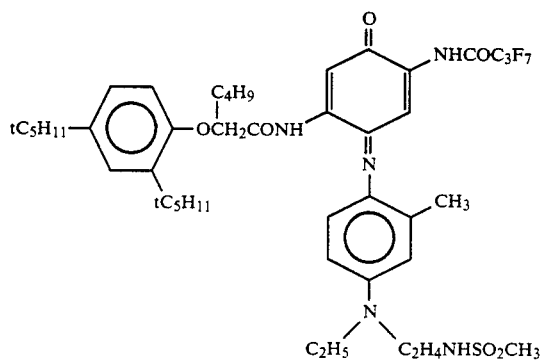 (Z-40)

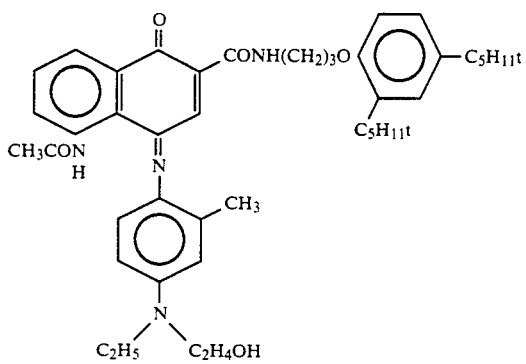 (Z-41)

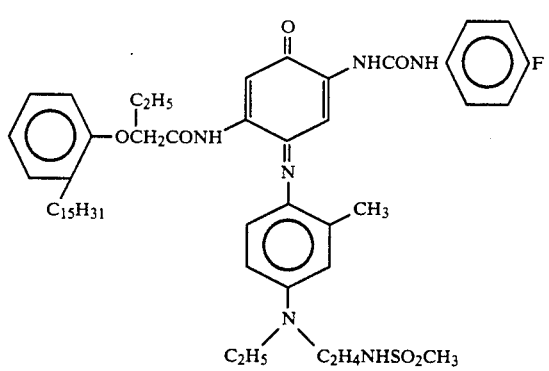 (Z-42)

Where the above-described dye is incorporated into any of the layers on the light-sensitive side, it is added to a coating composition in an appropriate form selected according to the properties of the dye, such as a solution, a micelle dispersion, a finely divided powder, a pigment paste dispersion, and an emulsion in a gelatin solution. Where it is incorporated into a support, it is added to a casting dope in the form of a solution, a finely divided powder or a pigment paste dispersion.

Incorporation into a magnetic recording layer or a backing layer can be carried out in the same manner as for incorporation into a layer on the light-sensitive side if the layer uses a hydrophilic binder, or in the same manner as for incorporation into a support if the layer uses a non-hydrophilic binder.

When Method 2 is followed for chromaticity control, the minimum density can be adjusted by appropriately selecting characteristics of the silver halide emulsion or couplers, etc. for each light-sensitive layer. It should be noted that Method 2 is a secondary means used in the present invention since the chromaticity characteristics mostly depend on other factors. It is more practical to control chromaticity predominantly by Method 1 or 3 while using Method 2 to set the minimum density of each light-sensitive layer as low as possible.

Method 3 can be carried out by, for example, forming a layer containing a light-insensitive emulsion and a colorless coupler capable of developing a desired color so as to cause uniform (i.e., non-imagewise) coloration during fogging and color development in color reversal processing. Method 3 is more complicated and hence generally less advantageous than Method 1. However, Method 3 is useful for obtaining a highly sensitive photographic material taking advantage of colorlessness before processing.

In the present invention, a light-sensitive material preferably has a roll form so that signals may be sent to the magnetic recording layer at the time when the film is advanced in a camera or a printer. The roll of film may have a currently widespread 135 format, but it is preferable that each frame has an image area of from 350 mm$^2$ to 1200 mm$^2$ and a magnetic recording area of 15% or more of the image area per frame. More specifically, the number of perforations per frame is preferably less than that of the 135 format, and more preferably 4 or less per frame. Recording information on the magnetic recording area may be optically carried out by means of a light emitter, e.g., an LED. Magnetic information and optical information may be recorded one upon another on the magnetic recording area. The magnetic recording format is preferably in accordance with that disclosed in WO 90-04205.

General roll film units have a 135 format with the leader thereof out of the cartridge. However, for the reasons previously stated, light-shut film units in which a light-sensitive material is packed in a cartridge with its film leader inside the cartridge are preferred in the present invention. Such film units are described in JP-A-U-58-67329 (the term "JP-A-U" as used herein means an "unexamined published Japanese utility model publication"), JP-A-58-181035, JP-A-58-182634, JP-A-U-58-195236, U.S. Pat. Nos. 4,221,479 and 4,423,943, JP-A-01-231045, JP-A-02-170156, JP-A-02-205843, JP-A-02-210346, JP-A-02-199451, JP-A-02-201441, JP-A-02-214853, JP-A-02-211443, JP-A-02-264248, JP-A-03-37646, JP-A-03-37645, JP-A-02-124564, Japanese Patent Application Nos. Sho-63-183344 and Hei-01-21862, and U.S. Pat. Nos. 4,846,418, 4,848,693, and 4,832,275. Cartridges equipped with a means for controlling cartridge position as described in Japanese Patent Application No. Hei-1-214895 are particularly preferred.

In production of the photographic materials of the present invention, photographic emulsion layers or other layers are coated on a plastic film support generally employed in photographic materials. Useful flexible supports include films of semi-synthetic or synthetic polymers, such as cellulose esters (especially cellulose triacetate, cellulose diacetate, cellulose propionate, cellulose acetate propionate, cellulose butyrate, cellulose acetate butyrate), polyamides, polycarbonates, polyesters (especially polyethylene terephthalate, poly-1,4-cyclohexanedimethylene terephthalate, polyethylene 1,2-diphenoxyethane-4,4'-dicarboxylate, polybutylene terephthalate, polyethylene naphthalate), polystyrene, polyarylates, aromatic polyetherimide, aromatic polyamide, and aromatic polyamide-imide.

The support is sometimes endowed with softness by adding a plasticizer. In particular, supports made of cellulose esters usually contain a plasticizer, e.g., triphenyl phosphate, biphenyldiphenyl phosphate, dimethylethyl phosphate, etc.

The thickness of the support, though depending on the kind of the polymer used, ranges widely from about 20 μm to about 1 mm, and a proper thickness is selected according to the use. A commonly employed thickness is from 50 to 300 μm.

While varying depending on the end use, the support usually has a break strength of at least 4 kg/mm$^2$, an initial modulus of elasticity of at least 150 kg/mm$^2$, and a flexural modulus of at least 150 kg/mm$^2$.

Polymers having a molecular weight of more than 10,000 are suitable as a support. Usually, those having a molecular weight of from 20,000 to 800,000 are used.

Since a support made of these polymers has a hydrophobic surface on both sides thereof, it is very difficult to firmly adhere photographic layers (e.g., light-sensitive silver halide emulsion layers, intermediate layers, filter layers, the transparent magnetic recording layer of the present invention, and conductive layers) on such a support. Such difficulty can be overcome by a method in which the support surface is activated by surface treatment, such as chemical treatment, corona discharge treatment, flame treatment, ultraviolet treatment, high-frequency treatment, glow discharge treatment, active plasma treatment, laser treatment, mixed acid treatment, and ozone treatment, and then photographic layers are coated directly thereon, or a method in which a subbing layer is provided on the surface either untreated or surface-treated as described above and then photographic layers are coated thereon.

Methods for forming a subbing layer have received much study. With respect to a method for forming a double-layered subbing layer, studies have been conducted on characteristics of materials for use in a first subbing layer including copolymers of monomers selected from vinyl chloride, vinylidene chloride, butadiene, methacrylic acid, acrylic acid, itaconic acid, maleic anhydride, etc. or many other polymers, e.g., polyethyleneimine, epoxy resins, grafted gelatin, and nitrocellulose, and characteristics of other materials, predominantly gelatin, for use as a second subbing layer.

In most methods for forming a single subbing layer, a support and a subbing layer-forming polymer are interfacially mixed to achieve satisfactory adhesion. A single subbing layer is often used on supports made of cellulose derivatives.

The above-described surface treatments produce little effect on supports made of cellulose derivatives. The most frequently employed method for improving adhesion of these supports comprises coating a gelatin dispersion in a mixed organic solvent of methylene chloride/ketone/alcohol on the support to form a single subbing layer while taking advantage of interfacial mixing due to support swelling and gelatin diffusion.

Gelatin hardening agents which can be used in the subbing layer include chromium salts (e.g., chromium alum), aldehydes (e.g., formaldehyde, glutaraldehyde), isocyanates, active halogen compounds (e.g., 2,4-dichloro-6-hydroxy-s-triazine), and epichlorohydrin resins.

If desired, the coating composition of the subbing layer may contain various additives, such as surface active agents, antistatic agents, dyes for antihalation, pigments, coating aids, and antifoggants. In using the subbing layer composition, the composition may further contain etching agents, such as resorcin, hydrated chloral, and chlorophenol.

The subbing layer according to the present invention may further contain inorganic fine particles, e.g., $SiO_2$ and $TiO_2$, or polymethyl methacrylate copolymer fine particles (diameter: 1 to 10 $\mu$m) as a matting agent.

The subbing layer can be coated on a support by any well-known coating technique, such as dip coating, air knife coating, curtain coating, roller coating, wire bar coating, gravure coating, and extrusion coating by the use of a hopper as disclosed in U.S. Pat. No. 2,681,294. If desired, two or more subbing layers can be coated simultaneously by the methods disclosed in U.S. Pat. Nos. 2,761,791, 3,508,947, 2,941,898, and 3,526,528, and Harasaki Yuji, *Coating Engineering*, p. 253, Asakura Shoten (1973).

The cartridge which can be used in the film unit according to the present invention is made mainly of synthetic resins containing, if desired, a plasticizer, e.g., trioctyl phosphate, tributyl phosphate, dibutyl phthalate, diethyl sebacate, diethyl sebacate, methyl amyl ketone, nitrobenzene, $\gamma$-valerolactone, di-n-octyl succinate, bromonaphthalene, and butyl palmitate.

Specific but non-limiting examples of suitable synthetic resins are polystyrene, polyethylene, polypropylene, polyvinylidene chloride, polyvinyl chloride, vinyl chloridevinyl acetate copolymers, ABS resins, methacrylic resins, polyvinyl formal, polyvinyl butyral, polyethylene terephthalate, Teflon, nylon, phenol resins, and melamine resins. Of these, polystyrene, polyethylene, and polypropylene are preferred.

The resins for cartridges may contain various antistatic agents, such as carbon black, metal oxide particles, nonionic, anionic, cationic or betaine type surface active agents, and nonionic, cationic, anionic or betaine type polymers. Cartridges containing these antistatic agents are described in JP-A-1-312537 and JP-A-1-321538.

Synthetic resins for cartridges are generally mixed with carbon black, pigments, etc. for lightscreening properties.

Cartridges may have the current spread size (diameter: 25 mm) or may have a reduced size of 22 mm or less, preferably 20 mm or less, and more preferably 14 mm or less, for use in small-sized cameras. Current spread cartridges have a projection at one end of a spool at which the cartridge is engaged with a film feeder of a camera. Since such a projection has been a bar to size reduction of cameras, it is preferably removed so that the volume of the current cartridge (about 35 cm$^3$) may be reduced. The cartridge volume is preferably not more than 30 cm$^3$, more preferably not more than 25 cm$^3$, and most preferably not more than 20 cm$^3$ The total weight of the synthetic resin constituting the cartridge and the cartridge case is from 1 to 25, and preferably from 5 to 15 g.

The ratio of the inner volume of the cartridge case and the weight of the synthetic resin used for the cartridge and the cartridge case is from 4 to 0.7 cm$^3$/g, and preferably from 3 to 1 cm$^3$/g.

In the case of the cartridge containing a 135 film according to the present invention, the total weight of the synthetic resin used in the cartridge and the cartridge case is usually from 1 to 25 g, and preferably from 5 to 15 g.

The film unit (cartridge) of the invention is not particularly limited in form, but preferably has a form that fits into commercially available cameras. As a matter of course, a cartridge of any form may be used in a new camera provided that it is designed to fit such a form. One specific example of a possible cartridge is shown in FIG. 1, the details of which are shown in FIGS. 2 to 4.

FIG. 1 illustrates a cartridge 1 containing a spool 2 and a film 3 therein. A cartridge case 4 houses film 3. The film contains a leading edge 5 and a hole 10 which is exposed through a cutout 11. The cartridge case also has a platform 13.

FIG. 2 is a plan view of the leading edge of film 3 showing perforations 6, 7 and hole 10.

FIG. 3 is a cross sectional view of the film unit of FIG. 1 showing a projection 8 and a peak 9. Film 3 is wound around a spool 2 and exits cartridge case 4 through a film passageway 12.

FIG. 4 is a cut away view of the inside of the film unit which shows a platform 13 containing projection 8.

The light-sensitive material according to the present invention comprises a support having provided thereon at least one each of a blue-sensitive silver halide emulsion layer, a green-sensitive silver halide emulsion layer, and a red-sensitive silver halide emulsion layer. There is no particular limitation in the number and order of silver halide emulsion layers and light-insensitive layers.

A typical example is a silver halide light-sensitive material comprising a support having thereon light-sensitive layers comprising two or more silver halide emulsion layers each having the same color sensitivity to any of blue light, green light, and infrared light and differing in light sensitivity (such a set of light-sensitive layers will hereinafter be referred to as a light-sensitive layer unit). In the case of multi-layer silver halide light-sensitive materials comprising two or more light-sensitive layer units, a red-sensitive layer unit, a green-sensitive layer unit, and a blue-sensitive layer unit are usually provided on a support in this order. Depending on the use, the order of these layer units may be reversed, or a layer unit may have between its constituting layers a light-sensitive layer having different color sensitivity.

The light-sensitive material may have various types of light-insensitive layers (e.g., intermediate layers) between silver halide light-sensitive layers or as a top or bottom layer.

The intermediate layers may contain couplers, DIR compounds, etc. as described in JP-A-61-43748, JP-A-59-113438, JP-A-59-113440, JP-A-61-20037, and JP-A-61-20038, and may also contain color mixing inhibitors typically employed in such intermediate layers.

Each light-sensitive layer unit preferably has a two-layer structure composed of a high sensitivity emulsion layer and a low sensitivity emulsion layer as described in West German Patent 1,121,470 or British Patent 923,045. Preferably, these two layers are arranged so that sensitivity decreases toward the support. A light-insensitive layer may be provided between silver halide emulsion layers. It is also possible to provide a low sensitivity emulsion layer in the side furthest from the support and a high sensitivity emulsion layer in the side closest to the support as described in JP-A-57-112751, JP-A-62-200350, JP-A-62-206541, and JP-A-62-206543.

Specific examples of practical layer orders include an order of low sensitivity blue-sensitive layer (BL)/high sensitivity blue-sensitive layer (BH)/high sensitivity green-sensitive layer (GH)/low sensitivity green-sensitive layer (GL)/high sensitivity red-sensitive layer (RH)/low sensitivity red-sensitive layer (RL)/support; an order of BH/BL/GL/GH/RH/RL/support; and an order of BH/BL/GH/GL/RL/RH/support.

A layer order of blue-sensitive layer/GH/RH/GL/RL/support described in JP-B-55-34932 and a layer order of blue-sensitive layer/GL/RL/GH/RH/support described in JP-A-56-25738 and JP-A-62-63936 are also employable.

Further, a light-sensitive layer unit may be composed of three layers whose photosensitivity differs in a descending order toward the support, i.e., the highest sensitivity silver halide emulsion layer as the upper layer, a middle sensitivity silver halide emulsion layer as an intermediate layer, and the lowest sensitivity silver halide emulsion layer as the lower layer, as proposed in JP-B-49-15495. Three layers of different sensitivity in each layer unit may be arranged in the order of middle sensitivity emulsion layer/high sensitivity emulsion layer/low sensitivity emulsion layer from the side farther from the support as described in JP-A-59-202464, in the order of high sensitivity emulsion layer/low sensitivity emulsion layer/middle sensitivity emulsion layer, or in the order to low sensitivity emulsion layer/middle sensitivity emulsion layer/high sensitivity emulsion layer. In cases where a layer unit is composed of 4 or more layers, various layer arrangements can be adopted as described above.

As mentioned above, a layer structure or arrangement can be appropriately chosen according to the end use of the light-sensitive material.

Types of silver halide which can be preferably used in the photographic emulsion layers of the color light-sensitive material according to the present invention include silver iodobromide, silver iodochloride, and silver iodochlorobromide each containing not more than about 30 mol % of silver iodide, and more preferably silver iodobromide and silver iodochlorobromide each having a silver iodide content of from about 2 mol % to about 10 mol %.

Silver halide grains of the photographic emulsions may have a regular crystal form, such as a cubic form, an octahedral form, and a tetradecahedral form; an irregular crystal form, such as a spherical form and a plate (tabular) form; a crystal form having a crystal defect, such as a twinning plane; or a composite crystal form thereof.

Silver halide grains may have a wide range of grain size, including from fine grains having a projected area diameter of about 0.2 $\mu$m or smaller to large grains having a projected area diameter reaching about 10 $\mu$m. The silver halide emulsion may be either a mono-dispersed emulsion or a poly-dispersed emulsion.

Silver halide photographic emulsions which are used in the present invention can be prepared by the processes described, e.g., in Research Disclosure (hereinafter abbreviated as RD), No. 17643 (December, 1978), pp 22–23, "I. Emulsion Preparation and Types", Ibid., No. 18716, p. 648 (November, 1979), Ibid., No. 307105 (November, 1989), pp. 863–865 P. Glafkides, Chemic et Phisique Photographique, Paul Montel (1967), G. F. Duffin, Photographic Emulsion Chemistry, Focal Press (1966), and V. L. Zelikman et al., Making and Coating Photographic Emulsion, Focal Press (1964).

Mono-dispersed emulsions described in U.S. Pat. Nos. 3,574,628 and 3,655,394 and British Patent 1,413,748 are preferably used as well.

Tabular grains having an aspect ratio (an average thickness to average diameter ratio) of about 3 or more are also useful. Such tabular grains can easily be prepared by the processes described, e.g., in Gutoff, Photographic Science and Engineering, Vol. 14, pp. 248–257 (1970), U.S. Pat. Nos. 4,434,226, 4,414,310, 4,433,048, and 4,439,520, and British Patent 2,112,157.

The silver halide grains may be homogeneous grains having a uniform crystal structure throughout the individual grains or heterogeneous grains including those in which the inside and the outer shell have different halogen compositions, those in which the halogen composition differs among layers, and those having fused thereto silver halide of different halogen composition through epitaxy. Silver halide grains fused with compounds other than silver halides, e.g., silver rhodanide or lead oxide may also be used. A mixture comprising grains of various crystal forms can also be used.

The photographic emulsions may be either a surface latent image type which forms a latent image predominantly on grain surfaces or an internal latent image type which forms a latent image predominantly inside the grains, but should be negatively working. Of the internal latent image type emulsions, core/shell type internal latent image type emulsions as described in JP-A-63-264740. The method for preparing such emulsions is described in JP-A-59-133542. The thickness of the shell of such emulsions preferably ranges from 3 to 40 nm, and more preferably from 5 to 20 nm, though somewhat varying depending on the development processing.

Silver halide emulsions are usually subjected to physical ripening, chemical ripening, and spectral sensitization. Additives which can be used in these steps are described in RD, Nos. 17643 (December, 1978), 18716 (November, 1979), and 307105 (November, 1989) as hereinafter listed.

In the photographic material of the present invention, two or more emulsions differring in at least one property of the grian size, the grain size distribution, the halogen composition, the grain shape, and the sensitivity, may be mixed in a same layer.

Surface-fogged silver halide grains as described in U.S. Pat. No. 4,082,553, inside-fogged silver halide grains as described in U.S. Pat. No. 4,626,498 and JP-A-59-214852, and colloidal silver can be preferably used in light-sensitive silver halide emulsion layers and/or substantially light-insensitive hydrophilic colloidal layers. The terminology "inside-fogged or surface-fogged silver halide grains" as used herein means silver halide grains which are evenly (non-imagewise) developable, exposed or unexposed, without distinction. Methods for preparing inside-fogged or surface-fogged silver halide grains are described in U.S. Pat. No. 4,626,498 and JP-A-59-214852.

In the inside-fogged core/shell type silver halide grains, the core and the outer shell may have either the same or different halogen composition.

The inside-fogged or surface-fogged silver halide grains may have any halogen composition selected from silver chloride, silver chlorobromide, silver iodobromide, and silver chloroiodobromide. While these fogged silver halide grains are not particularly limited in grain size, a preferred mean grain size is from 0.01 to 0.75 $\mu$m, and particularly from 0.05 to 0.6 $\mu$m. The fogged silver halide grains are not particularly limited in crystal form, either regular or irregular. A polydispersed emulsion can be used, but a mono-dispersed emulsion in which at least 95% of the total weight or number of silver halide grains have a grain size falling within ±40% of a mean grain size is preferred.

In the present invention, it is desirable to also use light-insensitive silver halide fine grains. The terminology "light-insensitive silver halide fine grains" as used herein means silver halide fine grains which are not sensitive to light by imagewise exposure for obtaining a color image and are therefore not substantially developed during development processing. It is preferable that the light-insensitive silver halide fine grains are not previously fogged.

The silver halide fine grains have a silver bromide content of from 0 to 100 mol % and may contain, if desired, silver chloride and/or silver iodide, and preferably have a silver iodide content of from 0.5 to 10 mol %.

The silver halide fine grains preferably have a mean grain size (an average circle-equivalent diameter of the projected area) of from 0.01 to 0.5 $\mu$m, and more preferably from 0.02 to 0.2 $\mu$m.

The silver halide fine grains can be prepared in the same manner as for general light-sensitive silver halide grains. The surface of the silver halide fine grains formed needs to be neither optically sensitized nor spectrally sensitized. It is desirable, however, to add a known stabilizer, such as triazole compounds, azaindene compounds, benzothiazolium compounds, mercapto compounds. and zinc compounds, before the silver halide fine grains are added to a coating composition. The layer containing the silver halide fine grains preferably contains colloidal silver.

The light-sensitive material of the present invention preferably has a silver coverage of not more than 6.0 g/m$^2$, and more preferably not more than 4.5 g/m$^2$.

Known photographic additives which can be used in the present invention are described in RD, Nos. 17643, 18716, and 30710 supra as tabulated below.

| Additive | RD17643 | RD18716 | RD307105 |
|---|---|---|---|
| 1. Chemical Sensitizer | p. 23 | p. 648, right column (RC) | p. 866 |
| 2. Sensitivity Increasing Agent | | p. 648, right column (RC) | |
| 3. Spectral Sensitizer, Supersensitizer | pp. 23-24 | p. 648, RC to p. 649, RC | pp. 866-868 |
| 4. Brightening Agent | p. 24 | p. 647, RC | p. 868 |
| 5. Antifoggant, Stabilizer | pp. 24-25 | p. 649, RC | pp. 868-870 |
| 6. Light Absorber, Filter Dye, Ultrasonic Absorber | pp. 25-26 | p. 649, RC to P. 650, left column (LC) | p. 873 |
| 7. Stain Inhibitor | p. 25, RC | P. 650, LC to RC | p. 872 |
| 8. Dye Image Stabilizer | p. 25 | p. 650, LC | p. 872 |
| 9. Hardening Agent | p. 26 | p. 651, LC | pp. 874-875 |
| 10. Binder | p. 26 | p. 651, LC | pp. 873-874 |
| 11. Plasticizer, Lubricant | p. 27 | P. 650, RC | p. 876 |
| 12. Coating Aid, Surface Active Agent | pp. 26-27 | p. 650, RC | pp. 875-876 |
| 13. Antistatic Agent | p. 27 | p. 650, RC | pp. 876-877 |
| 14. Matting Agent | | | pp. 878-879 |

In order to prevent deterioration in photographic performance due to the presence of formaldehyde gas, a compound capable of reacting with formaldehyde to fix it as described in U.S. Pat. Nos. 4,411,987 and 4,435,503 is preferably added to the light-sensitive materials.

The light-sensitive material of the present invention preferably contains a mercapto compound, such as described in U.S. Pat. Nos. 4,740,454 and 4,788,132, JP-A-62-18539, and JP-A-1-283551.

The light-sensitive material preferably contains a compound capable of releasing a fogging agent, a development accelerator, or a silver halide solvent, or a precursor thereof independent of the amount of developed silver produced by development processing, as described in JP-A-1-106052.

The light-sensitive material preferably contains a dye dispersed by the method described in WO 88/04794 and JP-A-1-502912 or the dye described in EP 317,308A, U.S. Pat. No. 4,420,555 and JP-A-1-259358.

Various color couplers can be used in the present invention. Specific examples of useful color couplers are described in patents cited in RD, No. 17643, VII-C to G and RD, No. 307105, VII-C to G.

Examples of suitable yellow couplers which can be used in the present invention are described, for example, in U.S. Pat. Nos. 3,933,501, 4,022,620, 4,326,024, 4,401,752, and 4,248,961, JP-B-58-10739, British Patents 1,425,020 and 1,476,760, U.S. Pat. Nos. 3,973,968, 4,314,023, and 4,511,649, and EP 249,473A.

Examples of suitable magenta couplers include 5-pyrazolone couplers and pyrazoloazole couplers. Examples of particularly preferred magenta couplers are described in U.S. Pat. Nos. 4,310,619 and 4,351,897, European Patent 73,636, U.S. Pat. Nos. 3,061,432 and 3,725,064, RD No. 24220 (June, 1984), JP-A-60-33552, RD No. 24230 (June, 1984), JP-A-60-43659, JP-A-61-72238, JP-A-60-35730, JP-A-55-118034, JP-A-60-185951, U.S. Pat. Nos. 4,500,630, 4,540,654, and 4,556,630, and WO 88/04795.

Cyan couplers which can be used include phenol couplers and naphthol couplers. Examples of suitable cyan couplers are described in U.S. Pat. Nos. 4,052,212, 4,146,396, 4,228,233, 4,296,200, 2,369,929, 2,801,171, 2,772,162, 2,895,826, 3,772,002, 3,758,308, 4,334,011, and 4,327,173, West German Patent Publication No. 3,329,729, EP 121,365A, EP 249,453A, U.S. Pat. Nos. 3,446,622, 4,333,999, 4,775,616, 4,451,559, 4,427,767, 4,690,889, 4,254,212, and 4,296,199, and JP-A-61-42658. Pyrazoloazole couplers as described in JP-A-64-553, JP-A-64-554, JP-A-64-555, and JP-A-64-556 and imidazole couplers as described in U.S. Pat. No. 4,818,672 are also useful.

Typical examples of polymerized dye-forming couplers are described in U.S. Pat. Nos. 3,451,820, 4,080,211, 4,367,282, 4,409,320, and 4,576,910, British Patent 2,102,173, and EP 341,188A.

Examples of suitable couplers which develop a dye having moderate diffusibility are described in U.S. Pat. No. 4,366,237, British Patent 2,125,570, European Patent 96,570, and West German Patent (OLS) No. 3,234,533.

Examples of suitable colored couplers which can be used for correcting unwanted absorption of a developed dye are those described in RD, No. 17643, VII-G, Ibid, No. 307105, VII-G, U.S. Pat. No. 4,163,670, JP-B-57-39413, U.S. Pat. Nos. 4,004,929 and 4,138,258 and British Patent 1,146,368. Further, couplers capable of releasing a fluorescent dye upon coupling with which unwanted absorption of a developed dye is corrected as described in U.S. Pat. No. 4,774,181 and couplers having a dye precursor group as a releasable group which is capable of reacting with a developing agent to form a dye as described in U.S. Pat. No. 4,777,120 are preferably used.

Couplers capable of releasing a photographically useful group on coupling are also advantageously used. Examples of suitable DIR couplers capable of releasing a development inhibitor are described in patents cited in RD, No. 17643, VII-F and Ibid, No. 307105, VII-F, JP-A-57-151944, JP-A-57-154234, JP-A-60-184248, JP-A-63-37346, JP-A-63-37350, and U.S. Pat. Nos. 4,248,962 and 4,782,012.

Couplers capable of imagewise releasing a nucleating agent or a development accelerator preferably include those described in British Patents 2,097,140 and 2,131,188, JP-A-59-157638, and JP-A-59-170840. Compounds capable of releasing a fogging agent, a development accelerator, a silver halide solvent, etc. upon an oxidation-reduction reaction with an oxidation product of a developing agent as described in JP-A-60-107029, JP-A-60-252340, JP-A-1-44940, and JP-A-1-45687 are also preferably used.

Additional examples of couplers which can be used in the light-sensitive material of the present invention include competing couplers as described in U.S. Pat. No. 4,130,427; polyequivalent couplers as described in U.S. Pat. Nos. 4,283,472, 4,338,393, and 4,310,618; couplers capable of releasing a DIR redox compound, couplers capable of releasing a DIR coupler, redox compounds capable of releasing a DIR coupler, or redox compounds capable of releasing a DIR redox compound as described in JP-A-60-185950 and JP-A-62-24252; couplers capable of releasing a dye which restores its color after release as described in EP 173,302A and EP 313,308A; couplers capable of releasing a bleaching accelerator as described in RD Nos. 11449 and 24241 and JP-A-61-201247; couplers capable of releasing a ligand as described in U.S. Pat. No. 4,553,477; couplers capable of releasing a leuco dye as described in JP-A-63-75747; and couplers capable of releasing a fluorescent dye as described in U.S. Pat. No. 4,774,181.

The dyes, couplers and other organic materials can be introduced into photographic materials by various known dispersion methods, such as an oil-in-water dispersion method or a later dispersion method.

High-boiling organic solvents which are useful in an oil-in-water dispersion method are described, e.g., in U.S. Pat. No. 2,322,027. Specific examples of high-boiling organic solvents having a boiling point of 175° C. or higher under atmospheric pressure which can be used in the oil-in-water dispersion method are phthalic esters (e.g., dibutyl phthalate, dicyclohexyl phthalate, di-2-ethylhexyl phthalate, decyl phthalate, bis(2,4-di-t-amylphenyl) phthalate, bis(2,4-di-t-amylphenyl)isophthalate, bis(1,1-diethylpropyl)phthalate), phosphoric or phosphonic esters (e.g., triphenyl phosphate, tricresyl phosphate, 2-ethylhexyldiphenyl phosphate, tricyclohexyl phosphate, tri-2-ethylhexyl phosphate, tridodecyl phosphate, tributoxyethyl phosphate, trichloropropyl phosphate, di-2-ethylhexylphenyl phosphonate), benzoic acid esters (e.g., 2-ethylhexyl benzoate, dodecyl benzoate, 2-ethylhexyl p-hydroxybenzoate), amides (e.g., N,N-diethyldodecanamide, N,N-diethyllaurylamide, N-tetradecylpyrrolidone), alcohols or phenols (e.g., isostearyl alcohol, 2,4-di-t-amylphenol), aliphatic carboxylic acid esters (e.g., bis(2-ethylhexyl) sebacate, dioctyl azelate, glycerol tributyrate, isostearyl lactate, trioctyl citrate), aniline derivatives (e.g., N,N-dibutyl-2-butoxy-5-t-octylaniline), and hydrocarbons (e.g., paraffin, dodecylbenzene, diisopropylnaphthalane). Organic solvents having a boiling point of not lower than about 30° C., and preferably from 50° C. to about 160° C. may be used in combination as an auxiliary solvent. Typical examples of such an auxiliary solvent are ethyl acetate, butyl acetate, ethyl propionate, methyl ethyl ketone, cyclohexanone, 2-ethoxyethyl acetate, and dimethylformamide.

With respect to a latex dispersion method, the steps involved, the effects, and specific examples of loadable latices are described in U.S. Pat. No. 4,199,363 and West German Patent (OLS) Nos. 2,541,274 and 2,541,230.

The color light-sensitive materials of the present invention preferably contain various antiseptics or antifungal agents, such as phenethyl alcohol; and 1,2-benzisothiazolin-3-one, n-butyl p-hydroxybenzoate, phenol, 4-chloro-3,5-dimethylphenol, 2-phenoxyethanol, 2-(4-thiazolyl)benzimidazole, etc. as described in JP-A-63-257747, JP-A-62-272248, and JP-A-1-80941.

In the color light-sensitive materials of the present invention, the hydrophilic colloidal layers on the side having emulsion layers preferably have a total film thickness of not more than 28 $\mu$m, preferably not more than 23 $\mu$m, more preferably not more than 18 $\mu$m, and particularly preferably not more than 16 $\mu$m, and a rate of swelling $T_{\frac{1}{2}}$ of not more than 30 seconds, and more preferably not more than 20 seconds. The terminology "total film thickness" as used herein means a film thickness as measured after conditioning at 25° C. and a relative humidity of 55% for 2 days. The terminology "rate of swelling $T_{\frac{1}{2}}$" means the time required for a color light-sensitive material to be swollen to $\frac{1}{2}$ the saturated swollen thickness, the saturated swollen thickness being defined as 90% of the maximum swollen thickness which is reached when the color light-sensitive material is swollen with a color developing solution at 30° C. for 3 minutes and 15 seconds. The rate of swelling can be determined by methods known in the art using, for example, a swellometer of the type described in A. Green, et al., Photographic Science and Engineering, Vol. 19, No. 2, pp. 124–129.

The rate of swelling $T_{\frac{1}{2}}$ can be controlled, for example, by adding an appropriate amount of a hardening agent for a gelatin binder or by varying aging conditions after coating.

Further, the light-sensitive material preferably has a degree of swelling of from 150 to 400%. The terminology "degree of swelling" as used herein means a value obtained from the maximum swollen film thickness as defined above according to the formula: degree of swelling = (maximum swollen film thickness − film thickness)/film thickness.

The light-sensitive material of the present invention preferably has a hydrophilic colloidal layer(s) called backing layer(s) having a total dry thickness of from 2 to 20 $\mu$m on the side opposite the emulsion layer side. The backing layers preferably contain the above-described additives, for example, light absorbents, filter dyes, ultraviolet absorbents, antistatic agents, hardening agents, binders, plasticizers, lubricants, coating aids, and surface active agents. The backing layers preferably have a degree of swelling of from 150 to 500%.

The magnetic recording layer is preferably provided on the support side opposite the emulsion layer side. In this case, the backing layer is provided on the magnetic recording layer in direct contact or via an intermediate layer.

The above-described color photographic materials can be development processed according to usual methods as described in RD, No. 17643, pp. 28–29, Ibid., No. 18716, p. 615, left to right columns, and Ibid., No. 307105, pp. 880–881.

A color developing solution for use in development is preferably an alkaline aqueous solution containing an aromatic primary amine color developing agent. Useful color developing agents include aminophenol compounds and preferably p-phenylenediamine compounds. Typical examples of p-phenylenediamine compounds are 3-methyl-4-amino-N,N-diethylaniline, 3-methyl-4-amino-N-ethyl-N-β-hydroxyethylaniline, 3-methyl-4-amino-N-ethyl-N-β-methanesulfonamidoethylaniline, 3-methyl-4-amino-N-ethyl-β-methoxyethylaniline, and salts thereof (e.g., sulfates, hydrochlorides, and p-toluenesulfonates), with 3-methyl-4-amino-N-ethyl-N-β-hydroxyethylaniline sulfate being particularly preferred. These developing agents may be used either individually or in combination of two or more according to the purpose.

The color developing solution usually contains pH buffering agents, e.g., carbonates, borates or phosphates of alkali metals, and development inhibitors or antifoggants, e.g., chlorides, bromides, iodides, benzimidazoles, benzothiazoles, and mercapto compounds. If desired, the color developing solution may further contain various preservatives, such as hydroxylamine, diethylhydroxylamine, sulfites, hydrazines (e.g., N,N-biscarboxymethylhydrazine), phenyl semicarbazides, triethanolamine, and catecholsulfonic acids; organic solvents, e.g., ethylene glycol and diethylene glycol; development accelerators, e.g., benzyl alcohol, polyethylene glycol, quaternary ammonium salts, and amines; dye-forming couplers; competing couplers; auxiliary developing agents (e.g., 1-phenyl-3-pyrazolidone); viscosity-imparting agents; and various chelating agents, such as aminopolycarboxylic acids, aminopolyphosphonic acids, alkylphosphonic acids, and phosphonocarboxylic acids (e.g., ethylenediaminetetraacetic acid, nitrilotriacetic acid, ethylenetriaminepentaacetic acid, cyclohexanediaminetetraacetic acid, hydroxyethyliminodiacetic acid, 1-hydroxyethylidene-1,1-diphosphonic acid, nitrilo-N,N,N-trimethylenephosphonic acid, ethylenediamine-N,N,N,N-tetramethylenephosphonic acid, ethylenediamine-di(o-hydroxyphenylacetic acid), and salts thereof).

When carrying out reversal processing, color development is generally preceded by black-and-white (hereinafter abbreviated as B/W) development. A B/W developing solution which can be used for B/W development contains one or more known B/W developing agents, such as dihydroxybenzenes (e.g., hydroquinone), 3-pyrazolidones (e.g., 1-phenyl-3-pyrazolidone), and aminophenols (e.g., N-methyl-p-aminophenol).

Color or B/W developing solutions generally have these developing solutions, though varying depending on the kind of color photographic material to be processed, is usually not more than 3 l per m² of a light-sensitive material. The rate of replenishment can be reduced to 500 ml/m² or less by reducing bromide ion concentration in the replenisher. When processing is carried out at a reduced rate of replenishment, it is desirable to prevent evaporation and aerial oxidation of a processing solution by minimizing the contact area with air of the processing solution.

The contact area between a photographic processing solution and air can be expressed in terms of the "opening ratio" calculated by dividing the contact area (cm²) of the processing solution with air by the volume (cm³) of the processing solution. The opening ratio as defined above is preferably not more than 0.1, and more preferably between 0.001 and 0.05.

The opening ratio of the processing tank can be adjusted by, for example, putting a barrier, such as a floating cover, on the liquid surface, using a movable cover as described in JP-A-1-82033, or utilizing slit development processing as described in JP-A-63-216050.

Reduction of the opening ratio is preferably applied to not only color development and B/W development but also all subsequent steps, such as bleaching, blixing, fixing, washing, and stabilization.

Reduction of the replenishment rate may also be achieved by using a means for suppressing accumulation of a bromide ion in the developing solution.

The processing time with the color developing solution is from 2 to 5 minutes. The processing time may be shortened by developing at an elevated temperature and an increased pH in an increased concentration of the color developing agent.

The photographic emulsion layers after color development are usually subjected to bleaching, and fixing to effect de-silvering. Bleaching and fixing may be carried out either simultaneously (blixing) or separately. For rapid processing, bleaching may be followed by blixing. Further, the mode of desilvering can be arbitrarily selected according to the end use. For example, blixing may be effected using two tanks connected, or fixing may be followed by blixing, or blixing may be followed by bleaching.

Bleaching agents which can be used include compounds of polyvalent metals, e.g., iron(III), peracids, quinones, and nitroso compounds. Typical bleaching agents include organic complex salts of iron(III), e.g., complex salts with aminopolycarboxylic acids (e.g., ethylenediaminetetraacetic acid, diethylenetriaminepentayaacetic acid, cyclohexanediaminetetraacetic acid, methyliminodiacetic acid, 1,3-diaminopropanoltetraacetic acid, glycol ether diaminetetraacetic acid), citric acid, tartaric acid, or malic acid. Preferred of these are aminopolycarboxylic acid iron(III) complexes, e.g., (ethylenediaminetetraacetato)iron(III) salts and (1,3-diaminopropanetetraacetato)iron(III) salts, for rapid processing and prevention of environmental pollution. Aminopolycarboxylic acid iron (III) complex salts are particularly useful either in a bleaching bath or in a blixing monobath. A bleaching bath or blixing bath containing these aminopolycarboxylic acid iron (III) complex salts usually has a pH between 4.0 and 8. A lower pH is also employed for rapid processing.

If desired, a fixing bath, a blixing bath, or a prebath thereof may contain known bleaching accelerators. Useful bleaching accelerators include compounds having a mercapto group or a disulfide group as described, for example, in U.S. Pat. No. 3,893,858, German Patents 1,290,812 and 2,059,988, JP-A-53-32736, JP-A-53-57831, JP-A-53-37418, JP-A-53-72623, JP-A-53-95630, JP-A-53-95631, JP-A-53-104232, JP-A-53-124424, JP-A-53-141623, JP-A-53-28426, and RD, No. 17129 (July, 1978); thiazolidine derivatives as described, for example, in JP-A-50-140129; thiourea derivatives as described, for example, in JP-B-45-8506, JP-A-52-20832, JP-A-53-32735, and U.S. Pat. No. 3,706,561; iodides as described for example, in West German Patent 1,127,715 and JP-A-58-16235; polyoxyethylene compounds as described, for example, in German Patents 966,410 and 2,748,430; polyamine compounds described in JP-B-45-8836; compounds described in JP-A-49-40943, JP-A-49-59644, JP-A-53-94927, JP-A-54-35727, JP-A-55-26506, and JP-A-58-163940; and a bromide ion.

Of these, compounds having a mercapto group or a disulfide group are preferred because of their high accelerating effect. The compounds disclosed in U.S. Pat. No. 3,893,858, West German Patent 1,290,812, and JP-A-53-95630 are particularly preferred. In addition, the compounds disclosed in U.S. Pat. No. 4,552,834 are also preferred. These bleaching accelerators may be incorporated into a light-sensitive material. The bleaching accelerators are particularly effective for blixing of color light-sensitive materials for photographing.

For the purpose of preventing bleach stain, the bleaching or blixing bath preferably contains organic acids. Particularly preferred organic acids used to this effect are those having an acid dissociation constant (pKa) of from 2 to 5, e.g., acetic acid and propionic acid.

Fixing agents which can be used in a fixing or blixing bath include thiosulfates, thiocyanates, thioether compounds, thioureas, and a large quantity of an iodide, with thiosulfates being commonly employed. In particular, ammonium thiosulfate is widely useful. The combined use of a thiosulfate and a thiocyanate, a thioether compound, a thiourea, etc. is also preferred. Preservatives for the fixing or blixing bath preferably include sulfites, bisulfites, carbonyl-bisulfite adducts, and sulfinic acid compounds described in EP 294769A.

The fixing or blixing bath preferably contains various aminopolycarboxylic acids or organophosphonic acids for stabilization.

Further, the fixing or blixing bath preferably contains 0.1 to 10 mol/l of compounds having a pKa of from 6.0 to 9.0 for pH adjustment, preferably imidazoles, e.g., imidazole, 1-methylimidazole, 1-ethylimidazole, and 2-methylimidazole.

The total time of desilvering is preferably as short as possible provided that insufficient desilvering does not result. A preferred desilvering time is from 1 to 3 minutes, and more preferably from 1 to 2 minutes. The desilvering temperature is from 25° to 50° C., and preferably from 35° to 45° C. In the preferred temperature range, the rate of desilvering is improved, and stain formation after processing is effectively prevented.

It is desirable that desilvering should be performed while reinforcing stirring as much as possible. Methods or means for achieving reinforced stirring include a method in which a jet stream of a processing solution is made to strike against the surface of the emulsion layer as described in JP-A-62-183460; a method of using a rotating means to enhance stirring effects as described in JP-A-62-183461; a method in which a light-sensitive material is moved with its emulsion surface being in contact with a wire blade placed in a processing solution to create turbulence; and a method of increasing total flow of a circulating processing solution. These stirring means are effective in any of a bleaching bath, a blixing bath and a fixing bath. Reinforced stirring appears to accelerate supply of a bleaching agent or a fixing agent to emulsion layers and, as a result, the rate of desilvering is increased.

The above-described means for reinforced stirring is more effective where a bleaching accelerator is used. Such reinforced stirring markedly enhances acceleration effects and eliminates the fixing inhibitory effect of the bleaching accelerator.

An automatic developing machine which can be used for processing the light-sensitive material preferably has a means for carrying a light-sensitive material as described in JP-A-60-191257, JP-A-60-191258, and JP-A-60-191259. As mentioned in JP-A-60-191257 supra, such a carrying means is highly effective to considerably reduce carry-over of a processing solution from a prebath into a succeeding bath to prevent reduction of processing capacity. This means is particularly effective for reduction of processing time or replenishment rate in each processing step.

The silver halide color light-sensitive material after desilvering is generally subjected to washing and/or stabilization.

The amount of washing water used in the washing step is selected from a broad range depending on the characteristics of the light-sensitive material (e.g., the kind of photographic materials such as couplers), the end use of the light-sensitive material, the temperature of washing water, the number of washing tanks (the number of stages), the replenishing system (e.g., counter-flow system or direct-flow system), and other various conditions. For example, a relation between the number of washing tanks and the quantity of water in a multi-stage counter-flow system can be obtained by the method described in *Journal of the Society of Motion Picture and Television Engineers*, Vol. 64, pp. 248–253 (May, 1955).

According to the disclosed multi-stage counterflow system, the requisite amount of water can be greatly reduced. On the other hand, bacteria tend to grow in the tank with an increase in water retention time, and suspended bacterial cells adhere to light-sensitive materials. Such a problem can be effectively treated by adopting a method of reducing calcium and magnesium ions in the washing water as described in JP-A-62-288838. It is also effective to use bactericides, such as isothiazolone compounds or thiabendazole compounds as described in JP-A-57-8542; chlorine type bactericides, e.g., chlorinated sodium isocyanurate; and other bactericides described in Horiguchi Hiroshi, *Bokin bobaizai no kagaku* ("Chemistry of Biocides and Fungicides"), Sankyo Shuppan (1986), Eisei Gijutsukai (ed.), *Biseibutsu no mekkin, sakkin, bobai qijutsu* ("Reduction of Micro-organisms, Biocidal and Fungicidal Techniques") Kogyo Gijutsukai (1982), and Nippon Bokin Bobai Gakkai (ed.), *Bokin bobaizai jiten* (Dictionary of Biocides and Fungicides") (1986), e.g., benzotriazole.

Washing water usually has a pH between 4 and 9, and preferably between 5 and 8. Washing conditions, though varying depending on the characteristics or the end use of the light-sensitive material and the like, are usually from 15° to 45° C. and from 20 seconds to 10 minutes, preferably from 25° to 40° C. and from 30 seconds to 5 minutes.

The washing step may be followed by or replaced with stabilization processing. Where stabilization is conducted in place of washing, any known stabilizing techniques described, e.g., in JP-A-57-8543, JP-A-58-14834, and JP-A-60-220345 can be utilized. Where washing is followed by stabilization, a stabilizing bath includes a solution containing a dye stabilizer and a surface active agent, which is used as a final bath for color light-sensitive materials for photographing. Suitable dye stabilizers include aldehydes, e.g., formalin and glutaraldehyde, N-methylol compounds, hexamethylenetetraamine, and an aldehyde-sulfite adduct. If desired, the stabilizing bath may also contain various chelating agents and antifungal agents.

An overflow accompanying replenishment for washing and/or stabilization may be reused in other processing steps, such as a desilvering step.

In cases where each processing solution is concentrated by vaporization during processing with an automatic developing machine, water is preferably supplied to the processing solution to correct concentration.

For the purpose of simplifying and speeding up processing, the silver halide color light-sensitive material may contain a color developing agent, preferably in the form of a precursor thereof. Examples of color developing agent precursors include indoaniline compounds described in U.S. Pat. No. 3,342,597, Schiff base compounds described in U.S. Pat. No. 3,342,599 and RD, Nos. 14850 and 15159, aldol compounds described in RD, No. 13924, metal complex salts described in U.S. Pat. No. 3,719,492, and urethane compounds described in JP-A-53-135628.

If desired, the silver halide color light-sensitive material may further contain various 1-phenyl-3-pyrazolidone compounds for the purpose of accelerating color development. Typical examples of these accelerators are described in JP-A-56-64339, JP-A-57-44547, and JP-A-58-115438.

Each of the above-described processing solutions is used at a temperature of from 10° to 50° C. and, in a standard manner, from 33° to 38° C. Higher processing temperatures may be employed for reducing processing time, or lower temperatures may be employed for improving image quality or stability of the processing solution.

The present invention is also applicable to heat-developable light-sensitive materials described in U.S. Pat. No. 4,500,626, JP-A-60-133449, JP-A-59-218443, JP-A-61-238056, and EP 210,660A2.

The present invention is now illustrated in greater detail by way of the following Examples, but it should be understood that the present invention is not limited thereto. All the percents and ratios are by weight unless otherwise indicated.

EXAMPLE 1

Preparation of Support A

A cellulose triacetate dope solution having the following composition was cast to form a 122 μm thick film, and 1st and 2nd backing layers having the compositions shown below were formed thereon to prepare support A.

| Dope Composition: | |
|---|---|
| Cellulose triacetate | 170 g |
| Triphenyl phosphate | 10 g |
| Methylene chloride | 800 g |
| Methanol | 160 g |
| 1st Backing Layer Composition: | |
| Cellulose triacetate | 0.10 g/m² |
| Ethylene glycol | 0.08 g/m² |
| 2nd Backing Layer Composition: | |
| Cellulose diacetate | 0.32 g/m² |
| Aerosil | 0.02 g/m² |

Preparation of Support B

A cellulose triacetate dope solution of the above-described composition and a cellulose triacetate dope solution of the same composition having dispersed therein $\gamma$-$Fe_2O_3$ particles (specific surface area: 43 m²/g; longer axis: 0.73; aspect ratio: 8/1) were cocast to prepare a 122 μm thick film having a 2 μm thick transparent magnetic recording layer containing 0.14 g/m² of $\gamma$-$Fe_2O_3$. The same backing layers as used in support A were formed on the magnetic recording layer to obtain support B. Support B had a coercive force of 4950 Oe and a square ratio of 0.74, which is capable of signal input as disclosed in WO 90-04205.

Preparation of Sample 101

Support A was subjected to a corona discharge treatment, and the following layers were coated thereon to prepare a multi-layer color light-sensitive material designated Sample 101. In the compositions shown below, the weight is per m². The function of additives used is not always limited to that described.

Preparation of Sample 102

Sample 102 was prepared in the same manner as Sample 101, except that support B was used in place of support A.

Preparation of Samples 103 to 116

Samples 103 to 106 were prepared in the same manner as Sample 102, except that the 2nd layer further contained the dyes shown in Table 1 below.

| 1st Layer (Antihalation Layer): | |
|---|---|
| Black colloidal silver | 0.25 g |
| Gelatin | 1.9 g |
| Ultraviolet absorbent U-1 | 0.04 g |
| Ultraviolet absorbent U-2 | 0.1 g |
| Ultraviolet absorbent U-3 | 0.1 g |
| Ultraviolet absorbent U-4 | 0.1 g |
| Ultraviolet absorbent U-6 | 0.1 g |
| High-boiling organic solvent Oil-1 | 0.1 g |
| 2nd Layer (Intermediate Layer): | |
| Gelatin | 0.40 g |
| Compound Cpd-D | 10 mg |
| High-boiling organic solvent Oil-3 | 0.1 g |
| 3rd Layer (Intermediate Layer): | |
| Surface- and inside-fogged silver iodobromide fine grain emulsion (mean grain size: 0.06 μm; coefficient of variation: 18%; AgI: 1 mol %) | 0.05 g-Ag |
| Gelatin | 0.4 g |
| 4th Layer (Low Sensitivity Red-Sensitive Emulsion Layer): | |
| Emulsion A | 0.2 g-Ag |
| Emulsion B | 0.3 g-Ag |
| Gelatin | 0.8 g |
| Coupler C-1 | 0.15 g |
| Coupler C-2 | 0.05 g |
| Coupler C-9 | 0.05 g |
| Compound Cpd-D | 10 mg |
| High boiling organic solvent Oil-2 | 0.1 g |
| 5th Layer (Middle Sensitivity Red-Sensitive Emulsion Layer): | |
| Emulsion B | 0.2 g-Ag |
| Emulsion C | 0.3 g-Ag |
| Gelatin | 0.8 g |
| Coupler C-1 | 0.2 g |
| Coupler C-2 | 0.05 g |
| Coupler C-3 | 0.2 g |
| High-boiling organic solvent Oil-2 | 0.1 g |
| 6th Layer (High Sensitivity Red-Sensitive Emulsion Layer): | |
| Emulsion D | 0.4 g-Ag |
| Gelatin | 1.1 g |
| Coupler C-1 | 0.3 g |
| Coupler C-3 | 0.7 g |
| Additive P-1 | 0.1 g |
| 7th Layer (Intermediate Layer): | |
| Gelatin | 0.6 g |
| Additive M-1 | 0.3 g |
| Color mixing inhibitor Cpd-K | 2.6 mg |
| Ultraviolet absorbent U-1 | 0.1 g |
| Ultraviolet absorbent U-6 | 0.1 g |
| Dye D-1 | 0.02 g |
| 8th Layer (Intermediate Layer): | |

| | |
|---|---|
| Surface- and inside-fogged silver iodobromide fine grain emulsion (mean grain size: 0.06 μm; coefficient of variation: 16%; AgI: 0.3 mol %) | 0.02 g-Ag |
| Gelatin | 1.0 g |
| Additive P-1 | 0.2 g |
| Color mixing inhibitor Cpd-J | 0.1 g |
| Color mixing inhibitor Cpd-A | 0.1 g |

9th Layer (Low Sensitivity Green-Sensitive Emulsion Layer):

| | |
|---|---|
| Emulsion E | 0.3 g-Ag |
| Emulsion F | 0.1 g-Ag |
| Emulsion G | 0.2 g-Ag |
| Gelatin | 0.5 g |
| Coupler C-7 | 0.05 g |
| Coupler C-8 | 0.20 g |
| Compound Cpd-B | 0.03 g |
| Compound Cpd-D | 10 mg |
| Compound Cpd-E | 0.02 g |
| Compound Cpd-F | 0.02 g |
| Compound Cpd-G | 0.02 g |
| Compound Cpd-H | 0.02 g |
| High-boiling organic solvent Oil-1 | 0.1 g |
| High-boiling organic solvent Oil-2 | 0.1 g |

10th Layer (Middle Sensitivity Green-Sensitive Emulsion Layer):

| | |
|---|---|
| Emulsion G | 0.3 g-Ag |
| Emulsion H | 0.1 g-Ag |
| Gelatin | 0.6 g |
| Coupler C-7 | 0.2 g |
| Coupler C-8 | 0.1 g |
| Compound Cpd-B | 0.03 g |
| Compound Cpd-E | 0.02 g |
| Compound Cpd-F | 0.02 g |
| Compound Cpd-G | 0.05 g |
| Compound Cpd-H | 0.05 g |
| High-boiling organic solvent Oil-2 | 0.01 g |

11th Layer (High Sensitivity Green-Sensitive Emulsion Layer):

| | |
|---|---|
| Emulsion I | 0.5 g-Ag |
| Gelatin | 1.0 g |
| Coupler C-4 | 0.3 g |
| Coupler C-8 | 0.1 g |
| Compound Cpd-B | 0.08 g |
| Compound Cpd-E | 0.02 g |
| Compound Cpd-F | 0.02 g |
| Compound Cpd-G | 0.02 g |
| Compound Cpd-H | 0.02 g |
| High-boiling organic solvent Oil-1 | 0.02 g |
| High-boiling organic solvent Oil-2 | 0.02 g |

12th Layer (Intermediate Layer):

| | |
|---|---|
| Gelatin | 0.6 g |
| Dye D-1 | 0.1 g |
| Dye D-2 | 0.05 g |
| Dye D-3 | 0.07 g |

13th Layer (Yellow Filter Layer):

| | |
|---|---|
| Yellow colloidal silver | 0.1 g-Ag |
| Gelatin | 1.1 g |
| Color mixing inhibitor Cpd-A | 0.01 g |
| High-boiling organic solvent Oil-1 | 0.01 g |

14th Layer (Intermediate Layer):

| | |
|---|---|
| Gelatin | 0.6 g |

15th Layer (Low Sensitivity Blue-Sensitive Emulsion Layer):

| | |
|---|---|
| Emulsion J | 0.4 g-Ag |
| Emulsion K | 0.1 g-Ag |
| Emulsion L | 0.1 g-Ag |
| Gelatin | 0.8 g |
| Coupler C-5 | 0.6 g |

16th Layer (Middle Sensitive Blue-Sensitive Emulsion Layer):

| | |
|---|---|
| Emulsion L | 0.1 g-Ag |
| Emulsion M | 0.4 g-Ag |
| Gelatin | 0.9 g |
| Coupler C-5 | 0.3 g |
| Coupler C-6 | 0.3 g |

17th Layer (High Sensitivity Blue-Sensitive Emulsion Layer):

| | |
|---|---|
| Emulsion N | 0.4 g-Ag |
| Gelatin | 1.2 g |
| Coupler C-6 | 0.7 g |

18th Layer (1st Protective Layer):

| | |
|---|---|
| Gelatin | 0.7 g |
| Ultraviolet absorbent U-1 | 0.04 g |
| Ultraviolet absorbent U-2 | 0.01 g |
| Ultraviolet absorbent U-3 | 0.03 g |
| Ultraviolet absorbent U-4 | 0.03 g |
| Ultraviolet absorbent U-5 | 0.05 g |
| Ultraviolet absorbent U-6 | 0.05 g |
| High boiling organic solvent Oil-1 | 0.02 g |
| Formalin scavenger: | |
| Cpd-C | 0.2 g |
| Cpd-I | 0.4 g |
| Dye D-3 | 0.05 g |

19th Layer (2nd Protective Layer):

| | |
|---|---|
| Colloidal silver | 0.1 mg-Ag |
| Silver iodobromide fine grain emulsion (mean grain size: 0.06 μm; AgI: 1 mol %) | 0.1 g-Ag |
| Gelatin | 0.4 g |

20th Layer (3rd Protective Layer):

| | |
|---|---|
| Gelatin | 0.4 g |
| Polymethyl methacrylate (average particle size: 1.5 μm) | 0.1 g |
| Methyl methacrylate-acrylic acid copolymer (4:6) (average particle size: 1.5 μm) | 0.1 g |
| Silicone oil | 0.03 g |
| Surface active agent W-1 | 3.0 mg |
| Surface active agent W-2 | 0.03 g |

All the emulsion layers further contained additives F-1, F-2, F-3, F-4, F-5, F-6, F-7, and F-8. All the constituting layers further contained a gelatin hardening agent H-1 and surface active agents W-3 and W-4 as coating aid or emulsification aid.

Silver iodobromide emulsions A to N used in Samples 101 to 116 are tabulated below.

| Emulsion No. | Grain Shape | Mean Grain Size (μm) | Coefficient of Variation (%) | AgI Content (mol %) |
|---|---|---|---|---|
| A | monodispersed tetra-decahedral grains | 0.25 | 16 | 3.7 |
| B | monodispersed internal latent image type cubic grains | 0.30 | 10 | 3.3 |
| C | monodispersed tetra-decahedral grains | 0.30 | 18 | 5.0 |
| D | polydispersed twinned grains | 0.60 | 25 | 2.0 |
| E | monodispersed cubic grains | 0.17 | 17 | 4.0 |
| F | monodispersed cubic grains | 0.20 | 16 | 4.0 |
| G | monodispersed internal latent image type cubic grains | 0.25 | 11 | 3.5 |
| H | monodispersed internal latent image type cubic grains | 0.30 | 9 | 3.5 |
| I | polydispersed tabular grains (average aspect ratio: 4.0) | 0.80 | 28 | 1.5 |
| J | monodispersed tetra-decahedral grains | 0.30 | 18 | 4.0 |
| K | monodispersed tetra-decahedral grains | 0.37 | 17 | 4.0 |
| L | monodispersed internal latent image type cubic grains | 0.46 | 14 | 3.5 |
| M | monodispersed cubic grains | 0.55 | 13 | 4.0 |
| N | polydispersed tabular | 1.00 | 33 | 1.3 |

-continued

| | grains (average aspect ratio: 7.0) | | |
|---|---|---|---|
| | Spectral Sensitization of Emulsions | | |
| | Sensitizing Dye Added | | |
| Emulsion No. | Kind | Amount (g/mol-AgX) | Time of Addition of Sensitizing Dye |
| A | S-1 | 0.025 | immediately after chemical sensitization |
| | S-2 | 0.25 | immediately after chemical sensitization |
| B | S-1 | 0.01 | immediately after completion of grain formation |
| | S-2 | 0.25 | immediately after completion of grain formation |
| C | S-1 | 0.02 | immediately after chemical sensitization |
| | S-2 | 0.25 | immediately after chemical sensitization |
| D | S-1 | 0.01 | immediately after chemical sensitization |
| | S-2 | 0.10 | immediately after chemical sensitization |
| | S-7 | 0.01 | immediately after chemical sensitization |
| E | S-3 | 0.5 | immediately after chemical sensitization |
| | S-4 | 0.1 | immediately after chemical sensitization |
| F | S-3 | 0.3 | immediately after chemical sensitization |
| | S-4 | 0.1 | immediately after chemical sensitization |
| G | S-3 | 0.25 | immediately after completion of grain formation |
| | S-4 | 0.08 | immediately after completion of grain formation |
| H | S-3 | 0.2 | during grain formation |
| | S-4 | 0.06 | " |
| I | S-3 | 0.3 | immediately before start of chemical sensitization |
| | S-4 | 0.07 | immediately before start of chemical sensitization |
| | S-8 | 0.1 | immediately before start of chemical sensitization |
| J | S-6 | 0.2 | during grain formation |
| | S-5 | 0.05 | " |
| K | S-6 | 0.2 | " |
| | S-5 | 0.05 | " |
| L | S-6 | 0.22 | immediate after completion of grain formation |
| | S-5 | 0.06 | immediate after completion of grain formation |
| M | S-6 | 0.15 | immediately after chemical sensitization |
| | S-5 | 0.04 | immediately after chemical sensitization |
| N | S-6 | 0.22 | immediately after completion of grain formation |
| | S-5 | 0.06 | immediately after completion of grain formation |

Chemical formulae or names of the compounds used in Samples 101 to 116 are shown below.

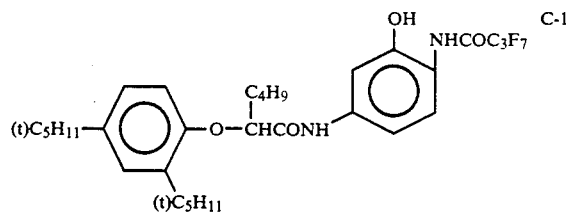
C-1

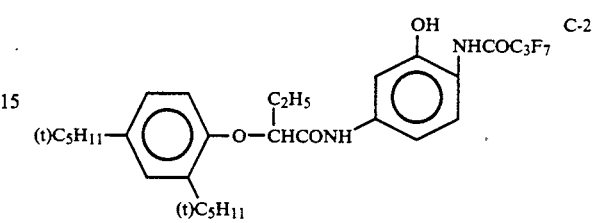
C-2

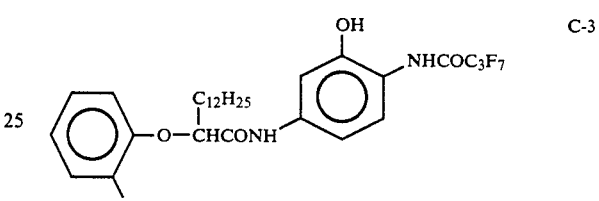
C-3

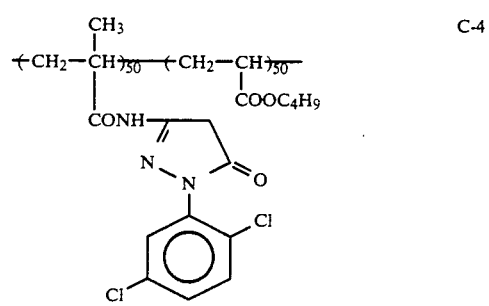
C-4

(copolymerization ratio: by weight)
(average mol. wt.: about 25,000)

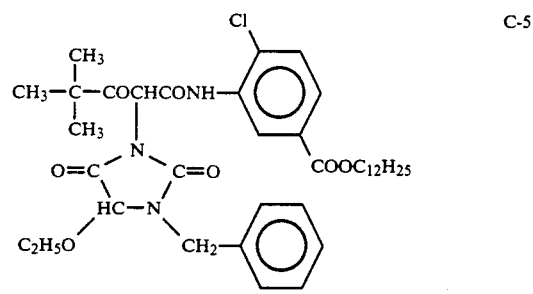
C-5

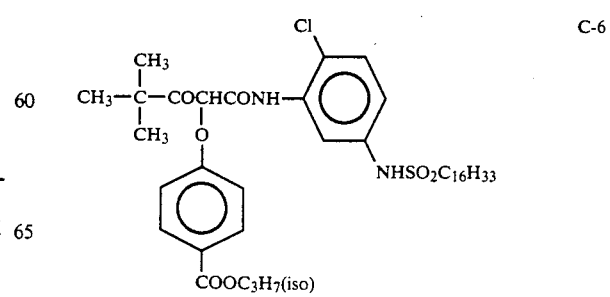
C-6

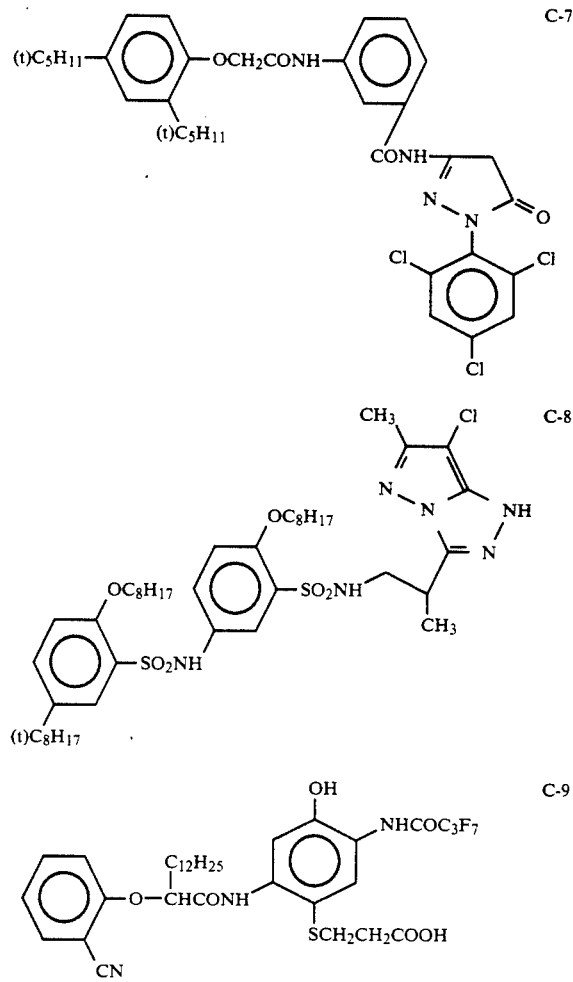
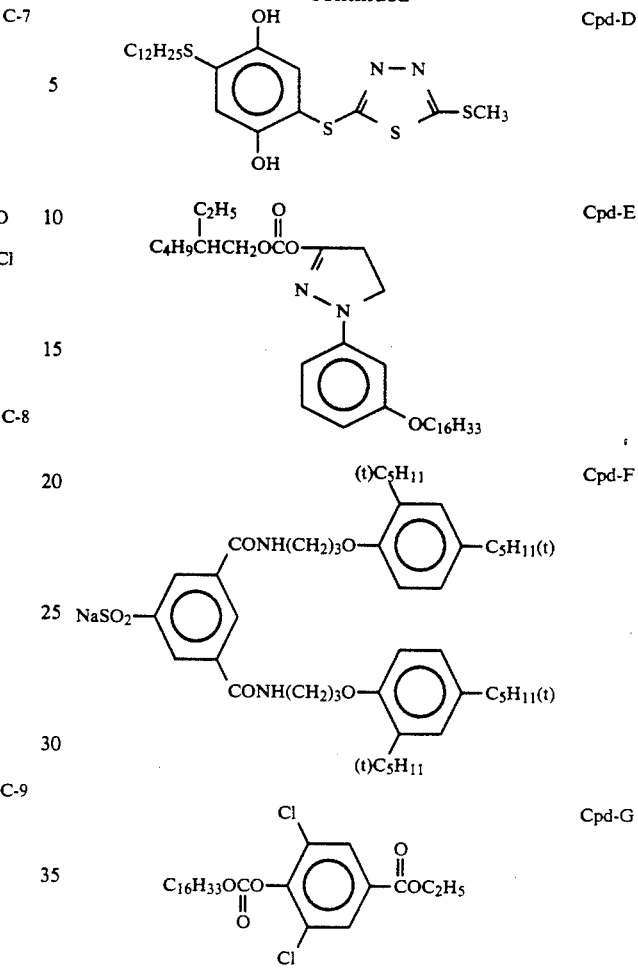
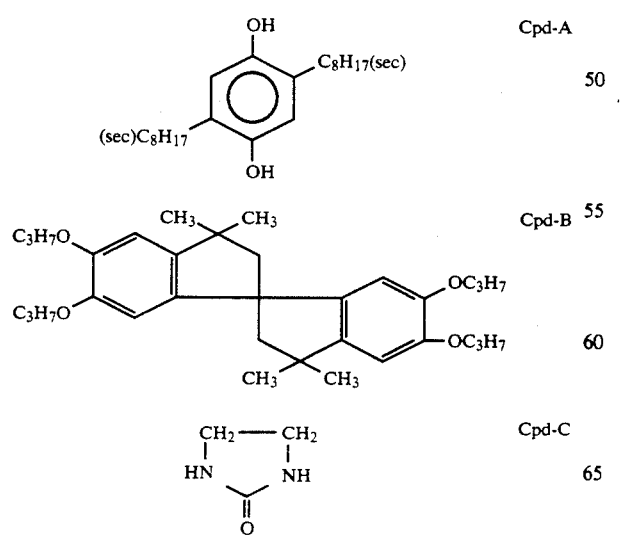

-continued
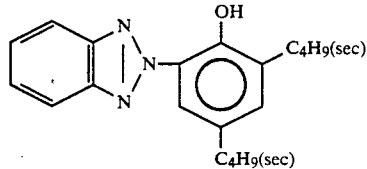
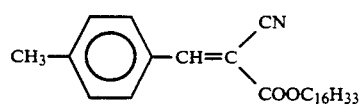
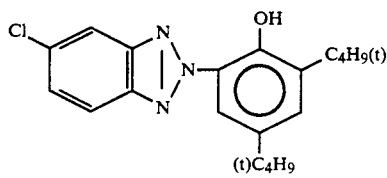
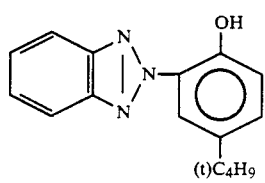
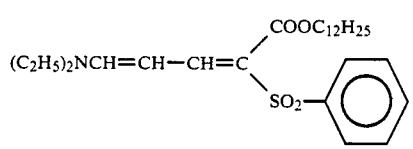
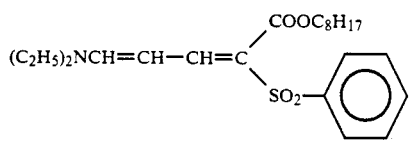
S-1
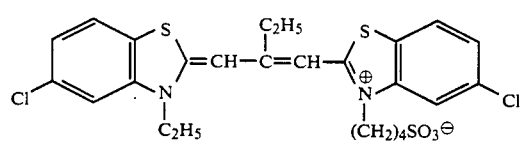
S-2
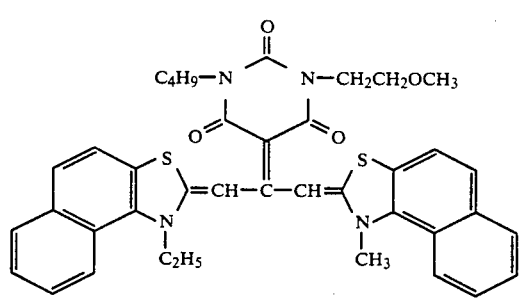
S-3
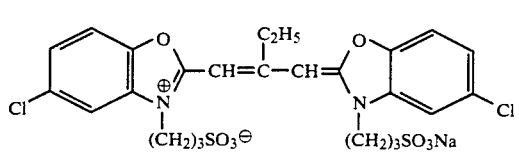
-continued
U-1
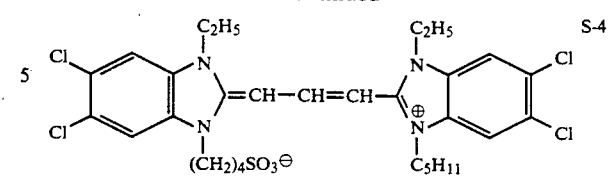
U-2 / S-5
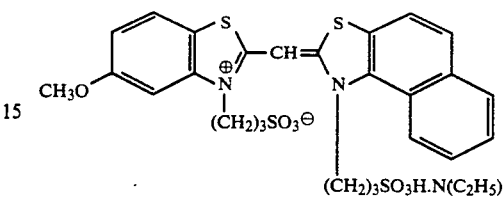
U-3 / S-6
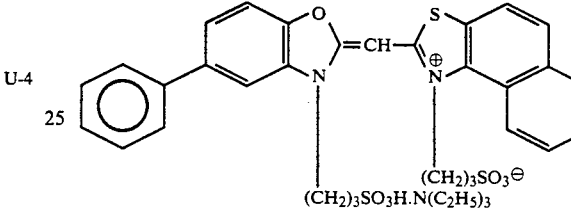
U-4 / S-7
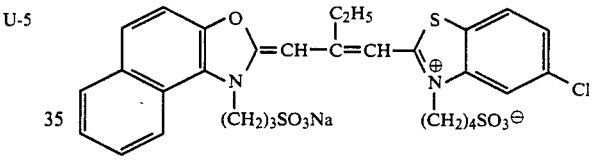
U-5 / S-8
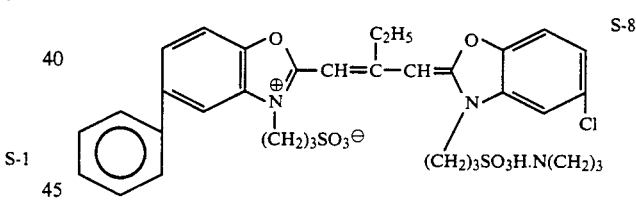
U-6
D-1
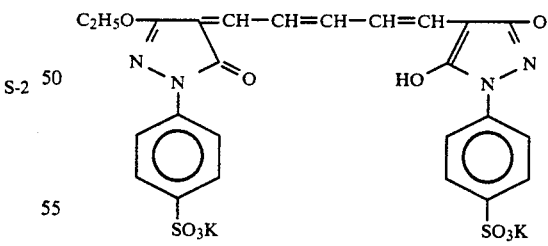
D-2
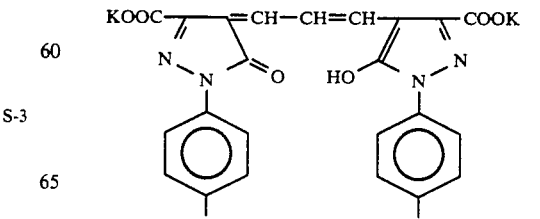

-continued

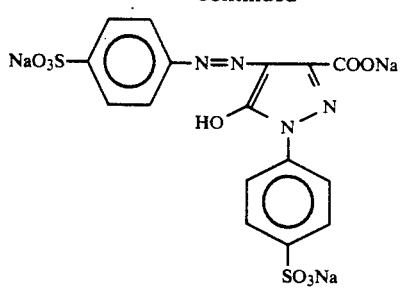

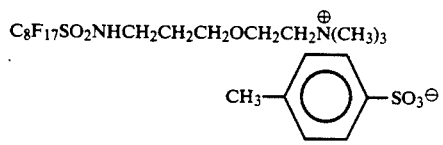

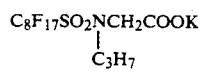

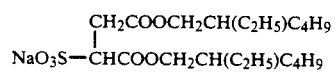

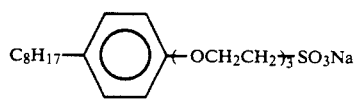

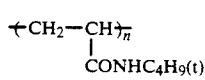

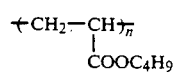

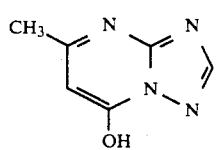

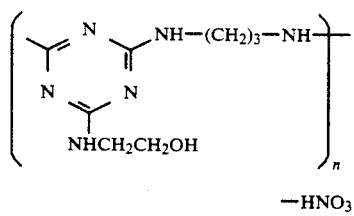

-continued

D-3

F-3

F-4

H-1

F-5

W-1

W-2

W-3

W-4

F-6

P-1

M-1

F-7

F-1

F-8

F-2

In addition, phenol, 1,2-benzisothiazolin-3-one, 2-phenoxyethanol, and phenethyl alcohol were added as antiseptics or antifungal agents.

Evaluation of Highlight Area

Each sample was exposed to white light at such an exposure amount to give a minimum density and developed according to the following schedule.

| Step | Time (min) | Temp. (°C.) | Tank Volume (l) | Rate of Replenishment (l/m²) |
|---|---|---|---|---|
| B/W development | 6 | 38 | 12 | 2.2 |
| 1st Washing | 2 | 38 | 4 | 7.5 |
| Reversing | 2 | 38 | 4 | 1.1 |
| Color development | 6 | 38 | 12 | 2.2 |
| Compensation | 2 | 38 | 4 | 1.1 |
| Bleach | 6 | 38 | 12 | 0.22 |
| Fixing | 4 | 38 | 8 | 1.1 |
| 2nd washing | 4 | 38 | 8 | 7.5 |
| Stabilization | 1 | 25 | 2 | 1.1 |

The processing solutions had the following compositions.

-continued

| | Running Solution | Replenisher |
|---|---|---|
| B/W Developing Solution: | | |
| Pentasodium nitrilo-N,N,N-trimethylenephosphonate | 2.0 g | 2.0 g |
| Sodium sulfite | 30 g | 30 g |
| Potassium hydroquinone monosulfonate | 20 g | 20 g |
| Potassium carbonate | 33 g | 33 g |
| 1-Phenyl-4-methyl-4-hydroxymethyl-3-pyrazolidone | 2.0 g | 2.0 g |
| Potassium bromide | 2.5 g | 1.4 g |
| Potassium thiocyanate | 1.2 g | 1.2 g |
| Potassium iodide | 2.0 mg | — |
| Water to make | 1000 ml | 1000 ml |
| pH (adjusted with HCl or KOH) | 9.60 | 9.60 |
| Reversing Bath: | | |
| Pentasodium nitrilo-N,N,N-trimethylenephosphonate | 3.0 g | (the same |
| Stannous chloride dihydrate | 1.0 g | as running |
| p-Aminophenol | 0.1 g | solution) |
| Sodium hydroxide | 8 g | |
| Glacial acetic acid | 15 ml | |
| Water to make | 1000 ml | |
| pH (adjusted with HCl or NaOH) | 6.00 | |
| Color Developing Solution: | | |
| Pentasodium nitrilo-N,N,N-trimethylenephosphonate | 2.0 g | 2.0 g |
| Sodium sulfite | 7.0 g | 7.0 g |
| Sodium tertiary phosphate dodecahydrate | 36 g | 36 g |
| Potassium bromide | 1.0 g | — |
| Potassium iodide | 90 mg | — |
| Sodium hydroxide | 3.0 g | 3.0 g |
| Citrazinic acid | 1.5 g | 1.5 g |
| N-Ethyl-($\beta$-methanesulfonamido-ethyl)-3-methyl-4-aminoaniline sulfate | 11 g | 11 g |
| 3,6-Dithia-1,8-octanediol | 1.0 g | 1.0 g |
| Water to make | 1000 ml | 1000 ml |
| pH (adjusted with HCl or KOH) | 11.80 | 12.00 |
| Compensating Bath: | | |
| Disodium ethylenediaminetetraacetate dihydrate | 8.0 g | (the same |
| Sodium sulfite | 12 g | as running |
| 1-Thioglycerin | 0.4 ml | solution) |
| Sorbitan ester of formula: | 0.1 g | |

$$\begin{array}{c} CH_2 \text{---} \\ | \\ HCO(C_2H_4)_wH \\ | \\ H(OC_2H_4)_xOCH \qquad O \\ | \\ HC \text{---} \\ | \\ HCO(C_2H_4O)_yH \quad O \\ | \qquad \qquad \qquad \| \\ CH_2O(C_2H_4O)_z\text{---}C\text{---}(CH_2)_{10}CH_3 \end{array}$$

(w + x + y + z = 20)

| | Running Solution | Replenisher |
|---|---|---|
| Water to make | 1000 ml | |
| pH (adjusted with HCl or NaOH) | 6.20 | |
| Bleaching Bath: | | |
| Disodium ethylenediaminetetraacetate dihydrate | 2.0 g | 4.0 g |
| Ammonium (ethylenediaminetetraacetato)iron (III) dihydrate | 120 g | 240 g |
| Potassium bromide | 100 g | 200 g |
| Ammonium nitrate | 10 g | 20 g |
| Water to make | 1000 ml | 1000 ml |
| pH (adjusted with HCl or NaOH) | 5.70 | 5.50 |
| Fixing Bath: | | |
| Ammonium thiosulfate | 8.0 g | (the same |
| Sodium sulfite | 5.0 g | as running |
| Sodium bisulfite | 5.0 g | solution) |
| Water to make | 1000 ml | |
| pH (adjusted with HCl or aqueous ammonia) | 6.60 | |
| Stabilizer: | | |
| Formalin (37%) | 5.0 ml | (the same |
| Polyoxyethylene-p-mononyl phenyl ether (average degree of polymerization: 10) | 0.5 ml | as running solution) |
| Water to make | 1000 ml | |
| pH | not adjusted | |

The L*, a*, and b* values of the processed sample were measured with a color analyzer (Type 670 manufactured by Hitachi, Ltd.). The measured values and the results of visual evaluation of the hue are shown in Table 1.

TABLE 1

| Sample No. | Support | Z-28 | Z-30 | Z-38 | a* | b* | L* | Highlight | Remark |
|---|---|---|---|---|---|---|---|---|---|
| 101 | A | — | — | — | −0.1 | −0.1 | 97.5 | Good | Comparison |
| 102 | B | — | — | — | 1.0 | 7.4 | 93.3 | Bad | " |
| 103 | B | 0.06 | 0.02 | 0.71 | 0.5 | 4.5 | 88.2 | Acceptable | Invention |
| 104 | B | 0.03 | 0.02 | 0.73 | 0.3 | 3.4 | 88.4 | Good | " |
| 105 | B | — | 0.02 | 0.86 | 0.2 | 0.8 | 88.0 | Excellent | " |
| 106 | B | — | 0.03 | 1.40 | 0.1 | −2.1 | 84.5 | Good | " |
| 107 | B | — | 0.04 | 2.19 | −0.2 | −6.9 | 80.1 | Bad | Comparison |
| 108 | B | 0.04 | 0.03 | 1.21 | 0.3 | 0.7 | 85.2 | Good | Invention |
| 109 | B | 0.13 | 0.04 | 1.72 | 0.3 | 0.7 | 81.3 | Acceptable | " |
| 110 | B | 0.27 | 0.06 | 2.55 | 0.2 | 0.7 | 75.4 | Bad | Comparison |
| 111 | B | 0.03 | 0.02 | 0.45 | 4.1 | 4.2 | 88.3 | Acceptable | Invention |
| 112 | B | 0.06 | 0.01 | 1.06 | −3.9 | 4.1 | 88.1 | Acceptable | " |
| 113 | B | — | 0.01 | 1.23 | −4.1 | 0.4 | 87.8 | Acceptable | " |
| 114 | B | 0.10 | 0.03 | 0.17 | 7.1 | 7.2 | 88.2 | Bad | Comparison |
| 115 | B | 0.13 | 0.01 | 1.18 | −6.8 | 7.0 | 88.3 | Bad | " |
| 116 | B | — | 0.01 | 1.50 | −7.0 | 0.2 | 87.6 | Bad | " |

Sample 101 contained no magnetic recording layer and thus the highlight had no yellow tinge.

Sample 102 having a magnetic recording layer and containing no dye in the 2nd layer had a high b* value of 7.4. The highlight of Sample 102 had a yellow tinge and was unacceptable. To the contrary, the highlight area of any of Samples 103 to 106, 108, 109, 111, and 112 whose a*, b* and L* values fell within the respective ranges according to the present invention had a so-called neutral color and an acceptable hue. Among these samples, Samples 104 to 106 and 108 judged "good" or "excellent" were preferred, and Sample 105 judged "excellent" was the most preferred. In Samples 107 and 114 to 116 whose a* and b* values were out of the respective ranges of the present invention, the highlight area had an unfavorable hue. In Sample 110 having a* and b* values within the ranges of the present invention but whose L* value was low, the highlight area was dark and unacceptable.

EXAMPLE 2

Preparation of Supports C and D

Support C having a magnetic recording layer was prepared in the same manner as for support B, except that dyes Z-4 (0.50 mg), Z-5 (0.08 mg), and Z-6 (0.01 mg) were added to the cellulose triacetate dope solution.

Support D was prepared in the same manner as support C, except that the amounts of the dyes added were changed (Z-4=001 mg, Z-5=0.27 mg, Z-6=0.38 mg).

Preparation of Sample 201

Sample 201 was prepared in the same manner as for Sample 105 of Example 1, except that dye Z-30 (0.02 g/m²) was added to the 7th layer instead of the 2nd layer and 0.86 g/m² of dye Z-38 was added to the 2nd layer.

Preparation of Samples 202 and 203

Samples 202 and 203 were prepared in the same manner as for Sample 102, except for replacing support B with support C or support D, respectively.

Each of Sample 105 and Samples 201 to 203 was exposed to white light and processed in the same manner as in Example 1, and the highlight area of the processed sample was evaluated in the same manner as in Example 1. Samples were further evaluated according to the following test methods.

Image Sharpness

A film for use in a Leitz-Camera (Leica) was prepared from each of Samples 105 and 201 to 203 and packed in a general cartridge for a 135 format with its leader out to a length of 7 cm. A 35 mm camera was loaded with the cartridge, and the film was exposed to light and processed in the same manner as in Example 1. The sharpness of the image was visually evaluated.

Leakage of Light

The film cartridge as prepared in the same manner as described above was exposed to sunlight with its leading edge side upward for 5 minutes, then with its side forming a right angle with the leading edge side upward for 5 minutes, and finally with the other side forming a right angle with the leading edge side upward for 5 minutes. The film was pulled out of the cartridge in a dark room and processed in the same manner as in Example 1. The unevenness of density due to leakage of light through the leading edge was visually observed.

The results of these evaluations are shown in Table 2 below.

TABLE 2

| | Sample 105 | Sample 201 | Sample 202 | Sample 203 |
|---|---|---|---|---|
| Highlight Hue: | | | | |
| a* | 0.2 | 0.2 | 0.2 | 0.2 |
| b* | 0.8 | 0.8 | 0.8 | 0.8 |
| L* | 88.7 | 88.6 | 88.6 | 85.5 |
| Evaluation | Excellent | Excellent | Excellent | Good |
| Image Sharpness | Good | Excellent | Poor | Poor |
| Light Leakage | Observed | Observed | Slightly observed | Substantially not observed |

The highlight area of Samples 105 and 201 to 203 showed chromaticity within the range of the present invention and had a satisfactory hue. Sample 203 had a somewhat dark tone. With respect to image sharpness, Sample 201 containing a dye in three layers on its light-sensitive side was the best, Sample 105 containing a dye in two layers was the next best, and Samples 202 and 203 were inferior, though acceptable. With respect to light leakage, Sample 203 was the best of all, Sample 202 was the next best, and Samples 105 and 201, which were equal, were inferior to Sample 202.

EXAMPLE 3

Each of Samples 101, 201, and 202 was cut into the format shown in FIG. 2 and packed in the cartridge shown in FIG. 1.

The film cartridge was loaded into a camera of the type described in WO 90-4056, and the film was exposed to light and processed in the same manner as in Example 1. The sharpness and unevenness in density due to light leakage were evaluated in the same manner as in Example 2. The results obtained are shown in Table 3 below.

TABLE 3

|  | Sample 105 | Sample 201 | Sample 202 |
|---|---|---|---|
| Image Sharpness | Good | Excellent | Poor |
| Light Leakage | Not observed | Not observed | Not observed |

In the film unit according to the present invention in which the film leader is inside the cartridge, none of the samples suffered from leakage of light through the leading edge. With respect to image sharpness, these samples were ranked in the same order as in Example 2. That is, Samples 105 and 201 containing dyes on the light-sensitive side thereof were excellent and, in particular, Sample 201 containing a dye in three layers was the best.

EXAMPLE 4

Preparation of Support E

A 10% gelatin aqueous solution having dispersed therein 8% of Co-doped γ-ferric oxide containing 4% ferrous oxide (specific surface area: 35 m$^2$; longer axis: 0.72; aspect ratio: 7.5) was coated on a 90 μm thick polyethylene terephthalate film to a thickness of 0.2 μm to prepare support E having a magnetic recording layer. Support E had a coercive force of 503 Oe and a square ratio of 0.75.

Preparation of Sample 401

The surface of support E on the side opposite to the magnetic recording layer was subjected to a corona discharge treatment, and the following layers were coated thereon to prepare color reversal light-sensitive material 401. In the compositions shown below, the weight is per m$^2$. The function of additives used is not always limited to that described.

| 1st Layer (Antihalation Layer): | |
|---|---|
| Black colloidal silver | 0.25 g |
| Gelatin | 1.9 g |
| Ultraviolet absorbent U-1 | 0.04 g |
| Ultraviolet absorbent U-2 | 0.1 g |
| Ultraviolet absorbent U-3 | 0.1 g |
| Ultraviolet absorbent U-4 | 0.1 g |
| Ultraviolet absorbent U-6 | 0.1 g |
| Additive P-1 | 0.1 g |
| Additive F-10 | 0.2 g |
| High-boiling organic solvent Oil-1 | 0.1 g |
| 2nd Layer (Intermediate Layer): | |
| Gelatin | 0.40 g |
| Compound Cpd-D | 10 mg |
| Dye Z-29 | 0.02 g |
| High-boiling organic solvent Oil-3 | 40 mg |
| Dye Z-38 | 0.82 g |
| 3rd Layer (Intermediate Layer): | |
| Surface- and inside-fogged silver iodobromide fine grain emulsion (mean grain size: 0.06 μm; coefficient of variation: 18%; AgI: 1 mol %) | 0.05 g-Ag |
| Additive M-1 | 0.05 g |
| Gelatin | 0.4 g |
| 4th Layer (Low Sensitivity Red-Sensitive Emulsion Layer): | |
| Emulsion A | 0.2 g-Ag |
| Emulsion B | 0.3 g-Ag |
| Additive F-14 | 1 mg |
| Gelatin | 0.8 g |
| Compound Cpd-K | 0.05 g |
| Coupler C-1 | 0.15 g |
| Coupler C-2 | 0.05 g |
| Coupler C-9 | 0.05 g |
| Coupler C-10 | 0.10 g |
| Compound Cpd-D | 10 mg |
| Additive F-2 | 0.1 mg |
| High boiling organic solvent Oil-2 | 0.10 g |
| Additive F-12 | 0.5 mg |
| 5th Layer (Middle Sensitivity Red-Sensitive Emulsion Layer): | |
| Emulsion B | 0.2 g-Ag |
| Emulsion C | 0.3 g-Ag |
| Gelatin | 0.8 g |
| Additive F-13 | 0.05 mg |
| Coupler C-1 | 0.2 g |
| Coupler C-2 | 0.05 g |
| Coupler C-3 | 0.2 g |
| Additive F-2 | 0.1 mg |
| High-boiling organic solvent Oil-2 | 0.1 g |
| 6th Layer (High Sensitivity Red-Sensitive Emulsion Layer): | |
| Emulsion D | 0.4 g-Ag |
| Gelatin | 1.1 g |
| Coupler C-3 | 0.7 g |
| Coupler C-1 | 0.3 g |
| Additive P-1 | 0.1 g |
| Additive F-2 | 0.1 g |
| 7th Layer (Intermediate Layer): | |
| Gelatin | 0.6 g |
| Color mixing inhibitor Cpd-L | 0.05 g |
| Additive F-1 | 1.5 mg |
| Additive F-7 | 2.0 mg |
| Additive Cpd-N | 0.02 g |
| Additive M-1 | 0.3 g |
| Color mixing inhibitor Cpd-K | 0.05 g |
| Ultraviolet absorbent U-1 | 0.1 g |
| Ultraviolet absorbent U-6 | 0.1 g |
| Dye D-1 | 0.02 g |
| 8th Layer (Intermediate Layer): | |
| Surface- and inside-fogged silver iodobromide fine grain emulsion (mean grain size: 0.06 μm; coefficient of variation: 16%; AgI: 0.3 mol %) | 0.02 g-Ag |
| Gelatin | 1.0 g |
| Additive P-1 | 0.2 g |
| Color mixing inhibitor Cpd-J | 0.1 g |
| Color mixing inhibitor Cpd-M | 0.05 g |
| Color mixing inhibitor Cpd-A | 0.1 g |
| 9th Layer (Low Sensitivity Green-Sensitive Emulsion Layer): | |
| Inside-fogged silver iodobromide emulsion (mean grain size: 0.1 μm; AgI: 0.1 mol %) | 0.05 g-Ag |
| Emulsion E | 0.3 g-Ag |
| Emulsion F | 0.1 g-Ag |
| Emulsion G | 0.1 g-Ag |
| Gelatin | 0.5 g |
| Coupler C-4 | 0.20 g |
| Coupler C-7 | 0.10 g |
| Coupler C-8 | 0.10 g |
| Coupler C-11 | 0.10 g |
| Compound Cpd-B | 0.03 g |
| Compound Cpd-E | 0.02 g |
| Compound Cpd-F | 0.02 g |
| Compound Cpd-G | 0.02 g |
| Compound Cpd-H | 0.02 g |
| Compound Cpd-D | 10 mg |
| Additive F-5 | 0.1 mg |
| Additive F-3 | 0.2 mg |

-continued

| | |
|---|---|
| Additive F-11 | 0.5 mg |
| High-boiling organic solvent Oil-2 | 0.2 g |
| 10th Layer (Middle Sensitivity Green-Sensitive Emulsion Layer): | |
| Emulsion G | 0.3 g-Ag |
| Emulsion H | 0.1 g-Ag |
| Gelatin | 0.6 g |
| Coupler C-4 | 0.1 g |
| Coupler C-7 | 0.1 g |
| Coupler C-8 | 0.1 g |
| Coupler C-11 | 0.05 g |
| Compound Cpd-B | 0.03 g |
| Compound Cpd-E | 0.02 g |
| Compound Cpd-F | 0.02 g |
| Compound Cpd-G | 0.05 g |
| Compound Cpd-H | 0.05 g |
| Additive F-5 | 0.08 mg |
| High-boiling organic solvent Oil-2 | 0.01 g |
| 11th Layer (High Sensitivity Green-Sensitive Emulsion Layer): | |
| Emulsion I | 0.5 g-Ag |
| Gelatin | 1.1 g |
| Coupler C-4 | 0.4 g |
| Coupler C-7 | 0.2 g |
| Coupler C-8 | 0.2 g |
| Coupler C-12 | 0.1 g |
| Coupler C-9 | 0.05 g |
| Compound Cpd-B | 0.08 g |
| Compound Cpd-E | 0.02 g |
| Compound Cpd-F | 0.02 g |
| Compound Cpd-G | 0.02 g |
| Compound Cpd-H | 0.02 g |
| Additive F-2 | 0.3 mg |
| High-boiling organic solvent Oil-2 | 0.04 g |
| Additive F-13 | 0.05 mg |
| 12th Layer (Intermediate Layer): | |
| Gelatin | 0.8 g |
| Additive F-1 | 2.0 mg |
| Additive F-8 | 2.0 mg |
| Dye D-1 | 0.1 g |
| Dye D-3 | 0.07 g |
| Dye D-8 | 0.03 g |
| Dye D-2 | 0.05 g |
| 13th Layer (Yellow Filter Layer): | |
| Yellow colloidal silver | 0.1 g-Ag |
| Gelatin | 1.3 g |
| Dye D-5 | 0.05 g |
| Color mixing inhibitor Cpd-A | 0.01 g |
| Additive F-4 | 0.3 mg |
| High-boiling organic solvent Oil-1 | 0.01 g |
| Dye-7 | 0.03 g |
| Additive M-2 | 0.01 g |
| 14th Layer (Intermediate Layer): | |
| Gelatin | 0.6 g |
| Dye D-9 | 0.02 g |
| 15th Layer (Low Sensitivity Blue-Sensitive Emulsion Layer): | |
| Emulsion J | 0.4 g-Ag |
| Emulsion K | 0.1 g-Ag |
| Emulsion L | 0.1 g-Ag |
| Gelatin | 0.9 g |
| Coupler C-13 | 0.1 g |
| Coupler C-5 | 0.6 g |
| Additive F-2 | 0.2 mg |
| Additive F-5 | 0.4 mg |
| Additive F-8 | 0.05 mg |
| 16th Layer (Middle Sensitive Blue-Sensitive Emulsion Layer): | |
| Emulsion L | 0.2 g-Ag |
| Emulsion M | 0.4 g-Ag |
| Gelatin | 1.2 g |
| Coupler C-13 | 0.1 g |
| Coupler C-5 | 0.3 g |
| Coupler C-6 | 0.3 g |
| Additive F-2 | 0.04 mg |
| Additive F-8 | 0.04 mg |
| 17th Layer (High Sensitivity Blue Sensitive Emulsion Layer): | |
| Emulsion N | 0.4 g-Ag |
| Gelatin | 1.4 g |
| Coupler C-6 | 0.5 g |
| Coupler C-14 | 0.2 g |
| Additive F-2 | 0.4 mg |
| Additive F-8 | 0.02 mg |
| Additive F-9 | 1 mg |
| 18th Layer (1st Protective Layer): | |
| Gelatin | 0.9 g |
| Ultraviolet absorbent U-1 | 0.04 g |
| Ultraviolet absorbent U-2 | 0.01 g |
| Ultraviolet absorbent U-3 | 0.03 g |
| Ultraviolet absorbent U-4 | 0.03 g |
| Ultraviolet absorbent U-5 | 0.05 g |
| Ultraviolet absorbent U-6 | 0.05 g |
| High boiling organic solvent Oil-1 | 0.02 g |
| Formalin scavenger: | |
| Cpd-C | 0.2 g |
| Cpd-I | 0.4 g |
| Ethyl acrylate latex dispersion | 0.05 g |
| Dye D-3 | 0.05 g |
| Additive Cpd-J | 0.02 g |
| Additive F-1 | 1.0 mg |
| Additive Cpd-N | 0.01 g |
| Additive F-6 | 1.0 mg |
| Additive F-7 | 0.5 mg |
| Additive M-2 | 0.05 g |
| 19th Layer (2nd Protective Layer): | |
| Colloidal silver | 0.1 mg-Ag |
| Silver iodobromide fine grain emulsion (mean grain size: 0.06 μm; AgI: 1 mol %) | 0.1 g-Ag |
| Gelatin | 0.7 g |
| 20th Layer (3rd Protective Layer): | |
| Gelatin | 0.7 g |
| Polymethyl methacrylate (average particle size: 1.5 μm) | 0.1 g |
| Methyl methacrylate-acrylic acid copolymer (4:6) (average particle size: 1.5 μm) | 0.1 g |
| Silicone oil | 0.03 g |
| Surface active agent W-1 | 3.0 mg |
| Surface active agent W-2 | 0.03 g |
| 21st Layer (Backing Layer): | |
| Gelatin | 10 g |
| Ultraviolet absorbent U-1 | 0.05 g |
| Ultraviolet absorbent U-2 | 0.02 g |
| High-boiling organic solvent Oil-1 | 0.01 g |
| 22nd Layer (Backing Protective Layer): | |
| Gelatin | 5 g |
| Polymethyl methacrylate (average particle size: 1.5 μm) | 0.03 g |
| Methyl methacrylate-acrylic acid copolymer (4:6) (average particle size: 1.5 μm) | 0.1 g |
| Surface active agent W-1 | 1 mg |
| Surface active agent W-2 | 10 mg |

All the silver halide emulsion layers further contained additive F-1. All the layers present further contained a gelatin hardening agent H-1, surface active agents W-3 and W-4 as coating aid and surface active agent W-5 as emulsification aid.

In addition, phenol, 1,2-benzisothiazolin-3-one, 2-phenoxyethanol, phenyl isothiocyanate, and phenethyl alcohol were added as antiseptics or antifungal agents.

Chemical formulae or names of the compounds used in Sample 401 are shown below.

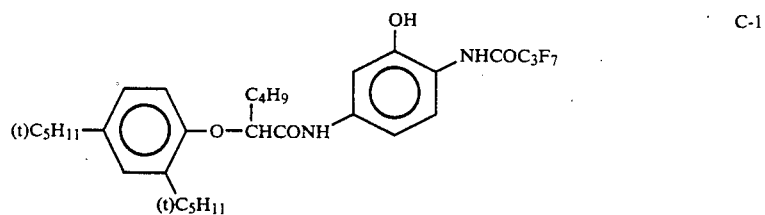 C-1
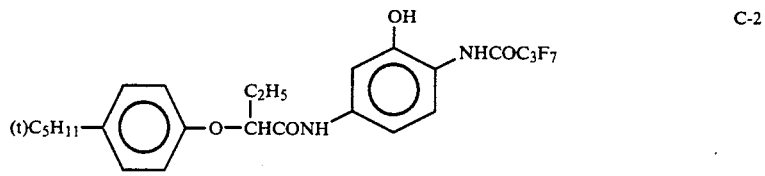 C-2
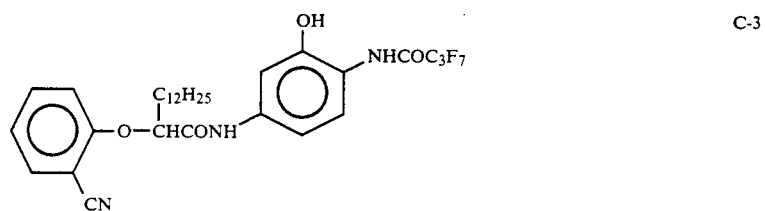 C-3
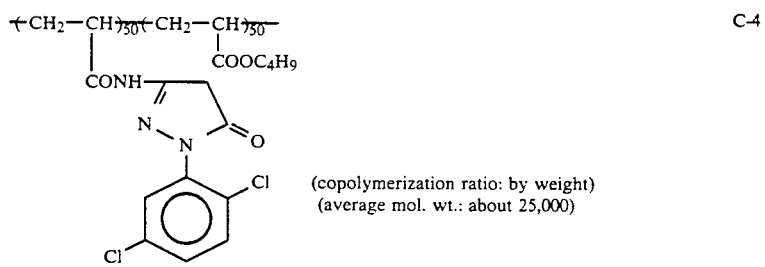 C-4
(copolymerization ratio: by weight)
(average mol. wt.: about 25,000)
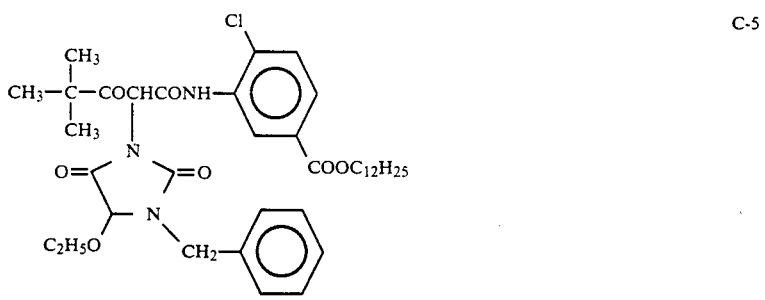 C-5
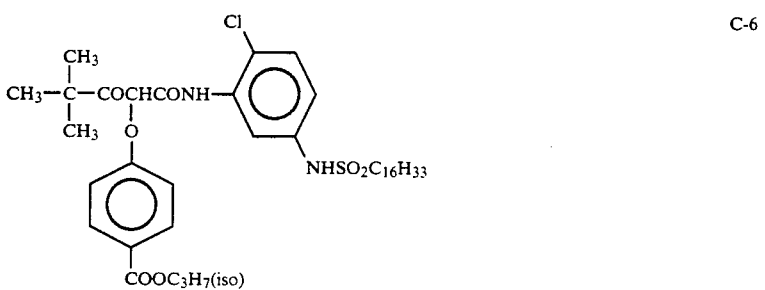 C-6

-continued
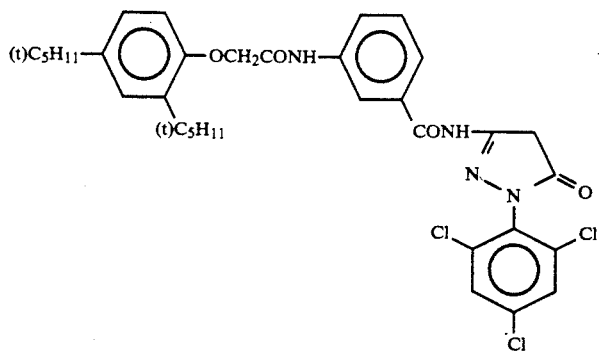
C-7
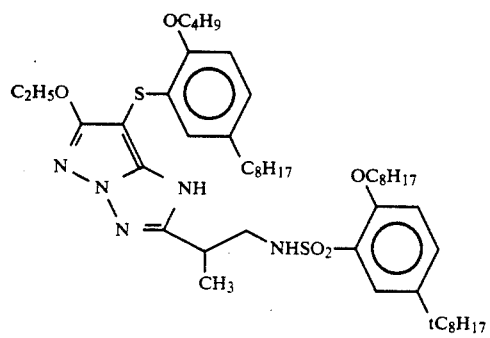
C-8
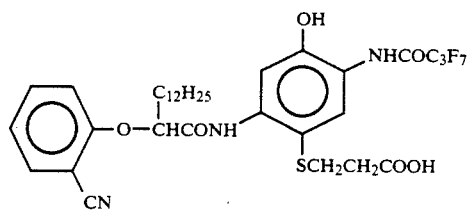
C-9
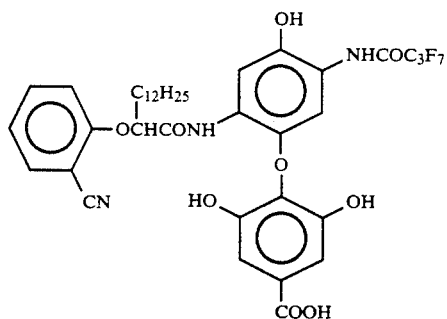
C-10
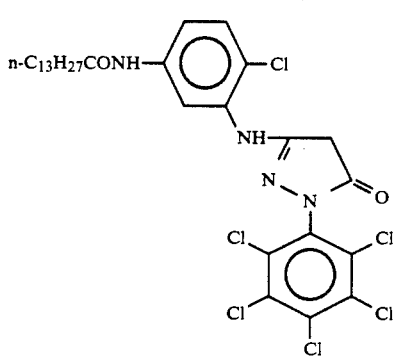
C-11

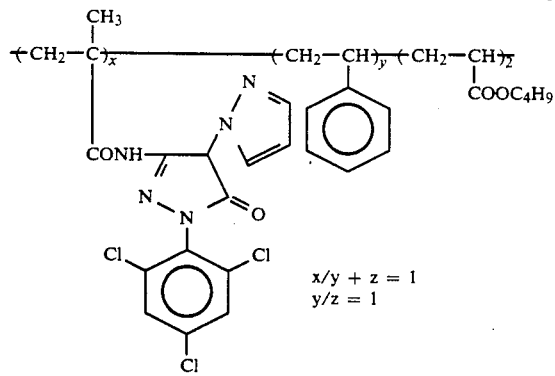 C-12
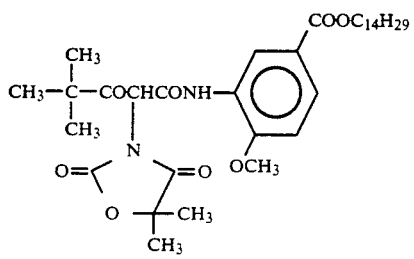 C-13
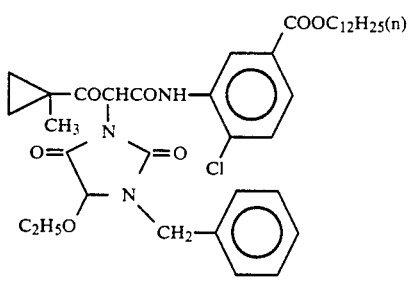 C-14
| | |
|---|---|
| Dibutyl phthalate | Oil-1 |
| Tricresyl phosphate | Oil-2 |
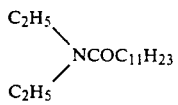 Oil-3
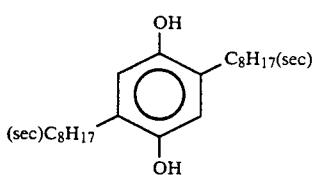 Cpd-A
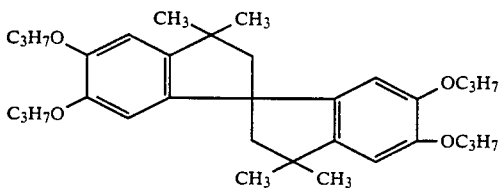 Cpd-B
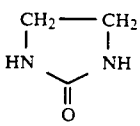 Cpd-C -continued
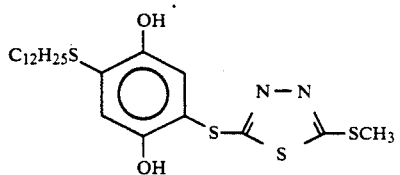 Cpd-D
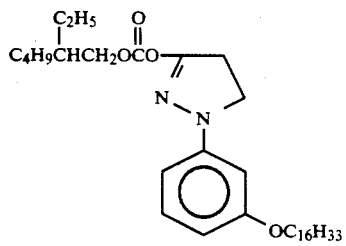 Cpd-E
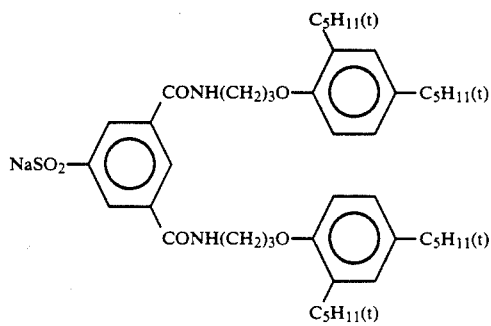 Cpd-F
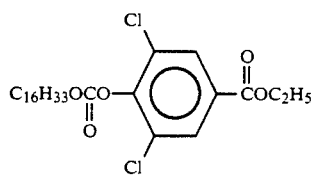 Cpd-G
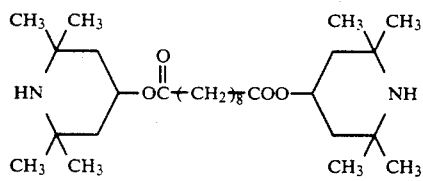 Cpd-H
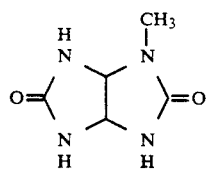 Cpd-I
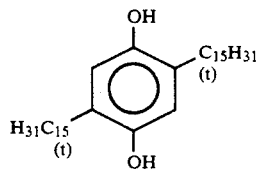 Cpd-J
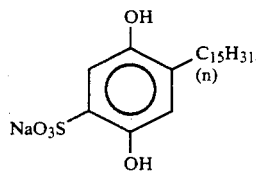 Cpd-K

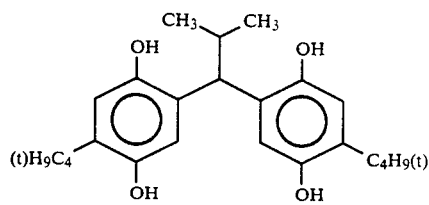 Cpd-L
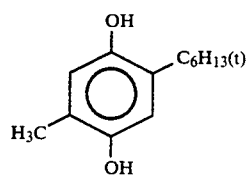 Cpd-M
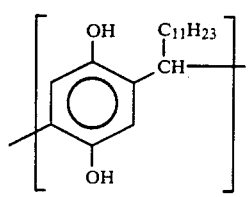 Cpd-N
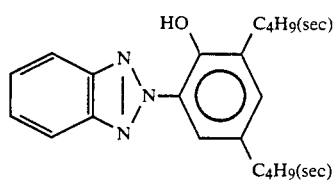 U-1
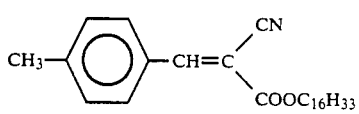 U-2
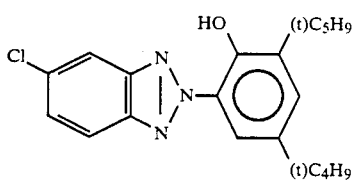 U-3
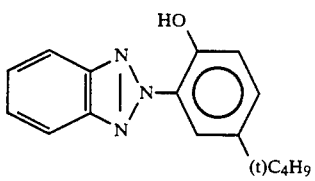 U-4
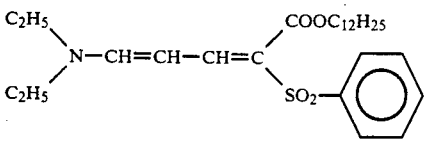 U-5
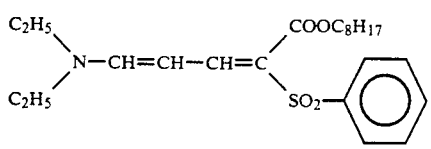 U-6

-continued
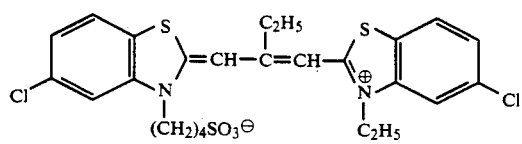 S-1
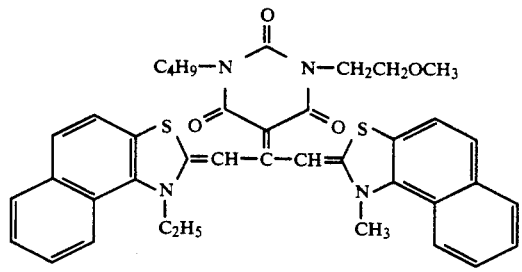 S-2
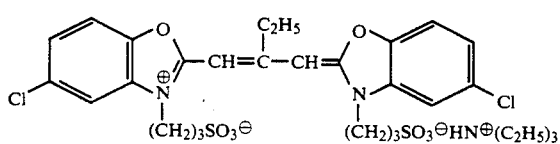 S-3
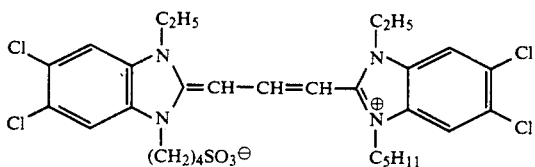 S-4
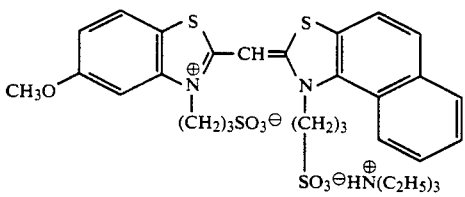 S-5
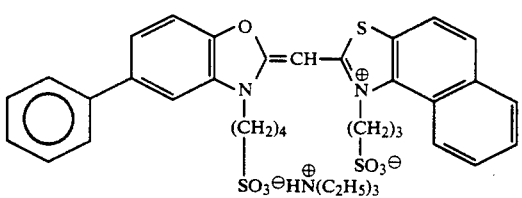 S-6
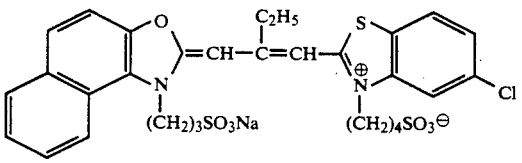 S-7
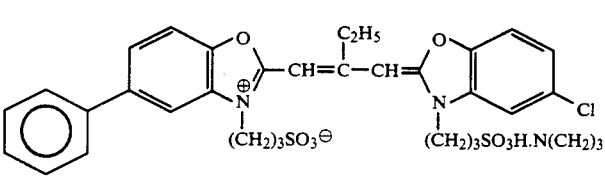 S-8

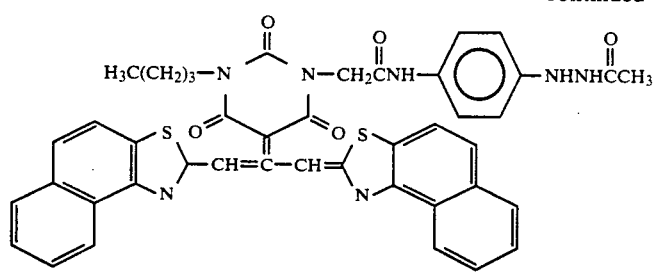
S-9
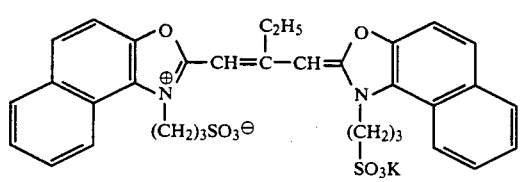
S-10
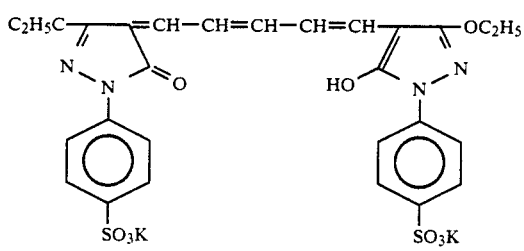
D-1
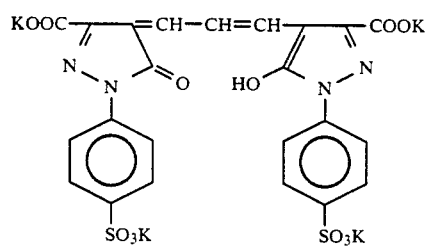
D-2
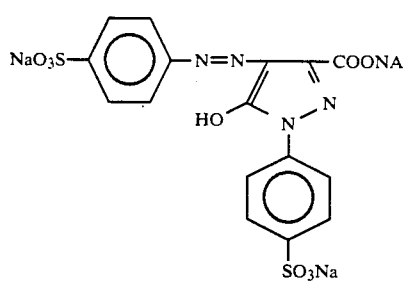
D-3
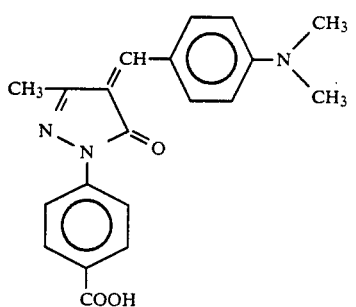
D-5

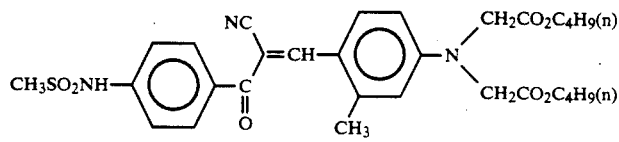 D-7
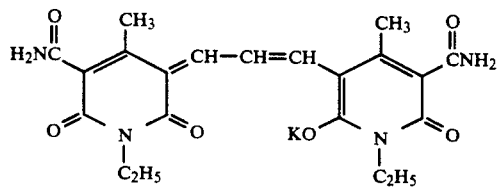 D-8
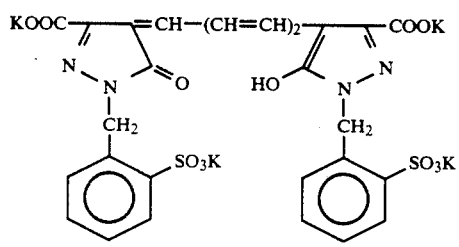 D-9
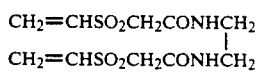 H-1
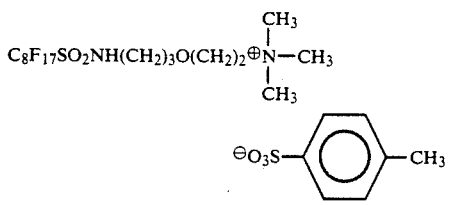 W-1
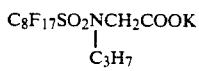 W-2
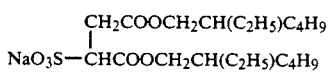 W-3
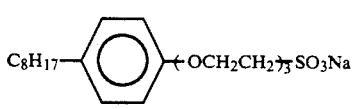 W-4
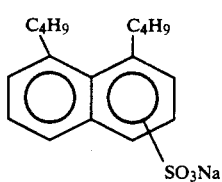 W-5
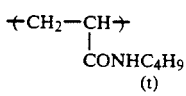 P-1
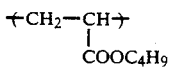 M-1

-continued
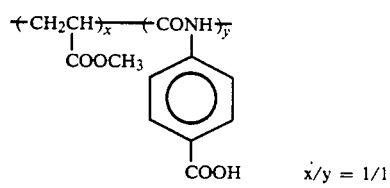 M-2
x/y = 1/1
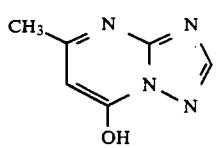 F-1
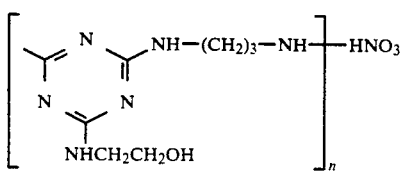 F-2
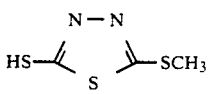 F-3
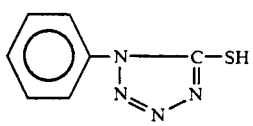 F-4
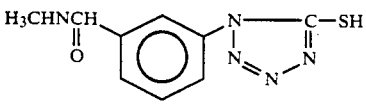 F-5
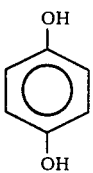 F-6
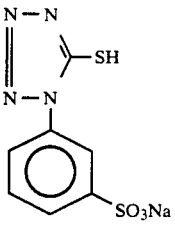 F-7
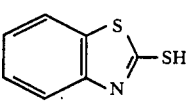 F-8
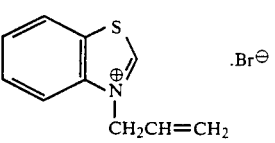 F-9

-continued

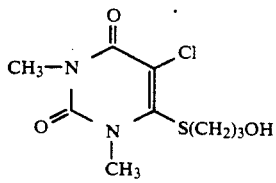
F-10

F-11

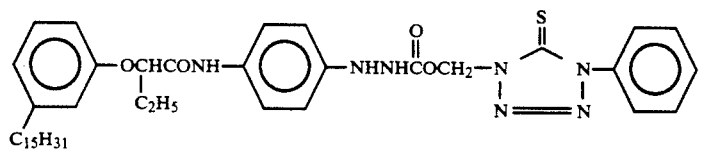
F-12

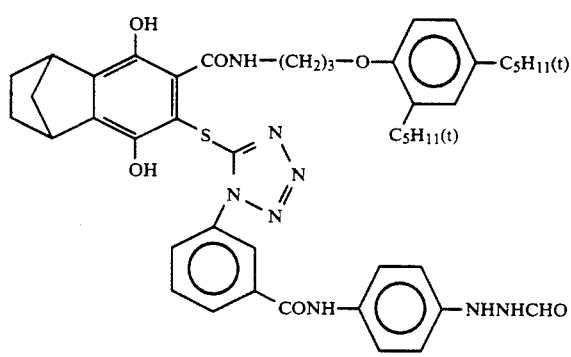
F-13

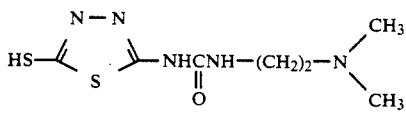
F-14

Emulsions A to N used in Sample 401 are tabulated below.

| Emulsion No. | Grain Structure | Mean Grain Size (μm) | Coefficient of Variation (%) | AgI Content (mol %) | Spectral Sensitization of Emulsions | | |
|---|---|---|---|---|---|---|---|
| | | | | | Sensitizing Dye Added | | |
| | | | | | Kind | Amount (g/mol-AgX) | Time of Addition of Sensitizing Dye |
| A | monodispersed tetra-decahedral grains | 0.35 | 16 | 4.5 | S-9 | 0.002 | immediately after chemical sensitization |
| | | | | | S-1 | 0.025 | immediately after chemical sensitization |
| | | | | | S-2 | 0.25 | immediately after chemical sensitization |
| B | monodispersed internal latent image type cubic grains | 0.45 | 10 | 5.0 | S-1 | 0.01 | immediately after completion of grain formation |
| | | | | | S-2 | 0.25 | immediately after completion of grain formation |
| C | monodispersed tetra-decahedral grains | 0.60 | 18 | 4.0 | S-1 | 0.02 | immediately after chemical sensitization |
| | | | | | S-9 | 0.002 | immediately after chemical sensitization |
| | | | | | S-2 | 0.25 | immediately after chemical sensitization |
| D | polydispersed twins | 1.10 | 25 | 3.0 | S-1 | 0.01 | immediately after chemical sensitization |
| | | | | | S-2 | 0.10 | immediately after chemical sensitization |
| | | | | | S-7 | 0.01 | immediately after |

-continued

| Emulsion No. | Grain Structure | Mean Grain Size (μm) | Coefficient of Variation (%) | AgI Content (mol %) | Sensitizing Dye Added Kind | Amount (g/mol-AgX) | Time of Addition of Sensitizing Dye |
|---|---|---|---|---|---|---|---|
| E | monodispersed cubic grains | 0.30 | 17 | 4.0 | S-3 | 0.5 | chemical sensitization immediately after chemical sensitization |
|  |  |  |  |  | S-10 | 0.05 | immediately after chemical sensitization |
|  |  |  |  |  | S-4 | 0.1 | immediately after chemical sensitization |
| F | monodispersed cubic grains | 0.40 | 16 | 4.0 | S-3 | 0.3 | immediately after completion of grain formation |
|  |  |  |  |  | S-4 | 0.1 | immediately after completion of grain formation |
| G | monodispersed internal latent image type cubic grains | 0.50 | 11 | 4.5 | S-3 | 0.25 | immediately after completion of grain formation |
|  |  |  |  |  | S-4 | 0.08 | immediately after completion of grain formation |
| H | monodispersed tetra-decahedral grains | 0.65 | 9 | 3.5 | S-3 | 0.2 | during grain formation |
|  |  |  |  |  | S-10 | 0.1 | immediately after chemical sensitization |
|  |  |  |  |  | S-4 | 0.06 | during grain formation |
| I | polydispersed tabular grains (average aspect ratio: 5.3) | 1.20 | 28 | 3.0 | S-3 | 0.3 | immediately before start of chemical sensitization |
|  |  |  |  |  | S-4 | 0.07 | immediately before start of chemical sensitization |
|  |  |  |  |  | S-8 | 0.1 | immediately before start of chemical sensitization |
| J | monodispersed tebular grains (average aspect ratio: 3.8) | 0.70 | 18 | 4.5 | S-5 | 0.2 | during grain formation |
|  |  |  |  |  | S-6 | 0.05 | during grain formation |
| K | monodispersed tetra-decahedtral grains | 0.60 | 17 | 4.5 | S-5 | 0.2 | during grain formation |
|  |  |  |  |  | S-6 | 0.05 | during grain formation |
| L | monodispersed octa-hedral grains | 0.80 | 14 | 4.0 | S-5 | 0.22 | immediate after completion of grain formation |
|  |  |  |  |  | S-6 | 0.06 | immediate after completion of grain formation |
| M | monodispersed tebular grains (average aspect ratio: 4.5) | 1.00 | 18 | 4.0 | S-5 | 0.15 | immediately after chemical sensitization |
|  |  |  |  |  | S-6 | 0.04 | immediately after chemical sensitization |
| N | monodispersed tabular grains (average aspect ratio: 7.0) | 1.30 | 18 | 3.5 | S-5 | 0.22 | immediately after completion of grain formation |
|  |  |  |  |  | S-6 | 0.06 | immediately after completion of grain formation |

Sample 401 was packed in a cartridge with its leader inside the cartridge and tested in the same manner as in Example 3. As a result, satisfactory results were obtained similarly to Example 3. In this example, the development processing was in accordance with the following schedule.

| Step | Time | Temp. |
|---|---|---|
| 1st Development | 6 min | 38° C. |
| 1st Washing | 45 sec | 38° C. |
| Reversing | 45 sec | 38° C. |
| Color development | 6 min | 38° C. |
| Bleaching | 2 min | 38° C. |
| Blixing | 4 min | 38° C. |
| 2nd Washing (1) | 1 min | 38° C. |
| 2nd Washing (2) | 1 min | 38° C. |
| Stabilization | 1 min | 25° C. |

The processing solutions used had the following compositions.

| 1st Developing Solution: | |
|---|---|
| Pentasodium nitrilo-N,N,N-trimethylenephosphonate | 2.0 g |
| Sodium sulfite | 30 g |
| Potassium hydroquinone monosulfonate | 20 g |
| Potassium carbonate | 33 g |
| 1-Phenyl-4-methyl-4-hydroxymethyl-3-pyrazolidone | 2.0 g |
| Potassium bromide | 2.5 g |
| Potassium thiocyanate | 1.2 g |
| Potassium iodide | 2.0 mg |
| Water to make | 1000 ml |
| pH (adjusted with HCl or KOH) | 9.60 |
| 1st Washing Water: | |
| Disodium ethylenediaminetetra-methylenephosphonate | 2.0 g |
| Disodium phosphate | 5.0 g |

-continued

| | |
|---|---|
| Water to make | 1000 ml |
| pH (adjusted with HCl or NaOH) | 7.00 |
| Reversing Bath: | |
| Pentasodium nitrilo-N,N,N-tri methylenephosphonate | 3.0 g |
| Stannous chloride dihydrate | 1.0 g |
| p-Aminophenol | 0.1 g |
| Sodium hydroxide | 8 g |
| Glacial acetic acid | 15 ml |
| Water to make | 1000 ml |
| pH (adjusted with HCl or NaOH) | 6.00 |
| Color Developing Solution: | |
| Pentasodium nitrilo-N,N,N-trimethylenephosphonate | 2.0 g |
| Sodium sulfite | 7.0 g |
| Sodium tertiary phosphate dodecahydrate | 36 g |
| Potassium bromide | 1.0 g |
| Potassium iodide | 90 mg |
| Sodium hydroxide | 3.0 g |
| Citrazinic acid | 1.5 g |
| N-Ethyl-N-($\beta$-methanesulfonamidoethyl)-3-methyl-4-aminoaniline sulfate | 11 g |
| 3,6-Dithiaoctane-1,8-diol | 1.0 g |
| Water to make | 1000 ml |
| pH (adjusted with HCl or KOH) | 11.80 |
| Bleaching Bath: | |
| Disodium ethylenediaminetetraacetate dihydrate | 10.0 g |
| Ammonium (ethylenediaminetetraacetato)-Fe (III) dihydrate | 120 g |
| Ammonium bromide | 100 g |
| Ammonium nitrate | 10 g |
| Bleaching accelerator: | 0.005 mol |

$$\begin{array}{c}CH_3\\ \phantom{xx}\diagdown\\ \phantom{xxx}N-CH_2CH_2-S-S-CH_2CH_2N\\ \phantom{xx}\diagup\\ CH_3\end{array}\begin{array}{c}CH_3\\ \diagup\\ \\ \diagdown\\ CH_3\end{array} \cdot 2HCl$$

| | |
|---|---|
| Water to make | 1000 ml |
| pH (adjusted with HCl or aqueous solution) | 6.30 |
| Blixing Bath: | |
| Ammonium (ethylenediaminetetraacetato) Fe (III) dihydrate | 50 g |
| Disodium ethylenediaminetetraacetate dihydrate | 5.0 g |
| Ammonium thiosulfate | 80 g |
| Sodium sulfite | 12.0 g |
| Waer to make | 1000 ml |
| pH (adjusted with HCl or aqueous ammonia) | 6.60 |

2nd Washing Water

Tap water was passed through a mixed bed column of an H-type strongly acidic cation exchange resin, Amberlite IR-120B (product of Rohm & Haas Co.), and an OH-type anion exchange resin, Amberlight IR-400 (product of Rohm & Haas Co.), to reduce calcium and magnesium ions to 3 mg/l or less, respectively, and 20 mg/l of sodium isocyanurate dichloride and 1.5 g/l of sodium sulfate were added thereto. The thus treated water had a pH between 6.5 and 7.5.

| Stabilizer: | |
|---|---|
| Formalin (37%) | 5.0 ml |
| Polyoxyethylene-p-monononyl phenyl ether (average degree of polymerization: 10) | 0.5 ml |
| Water to make | 1000 ml |
| pH | not adjusted |

As described and demonstrated above, the present invention provides a color reversal photographic material having a magnetic recording layer superposed on the image area thereof and still exhibiting satisfactory color reproducibility. In particular, the photographic material of the present invention exhibits excellent color reproducibility and image sharpness without undergoing light leakage when integrated into a light-shut film unit in which the film leader is not out of a cartridge.

While the invention has been described in detail and with reference to specific examples thereof, it will be apparent to one skilled in the art that various changes and modifications can be made therein without departing from the spirit and scope thereof.

What is claimed is:

1. A silver halide color reversal light-sensitive material comprising on a transparent support a red-sensitive silver halide emulsion layer containing a cyan coupler, a green-sensitive silver halide emulsion layer containing a magenta coupler, and a blue-sensitive silver halide emulsion layer containing a yellow coupler, wherein said light-sensitive material contains a non-imagewise, non-diffusible dye which is not decolored during development processing and said light-sensitive material has a magnetic recording layer containing from $4 \times 10^{-3}$ to 3 g/m$^2$ of a ferromagnetic powder, and the minimum density area of said light-sensitive material after development has a chromaticity having an a* value of from $-5$ to 5, a b* value of from $-5$ to 5, and an L* value of not less than 80 as calculated from tristimulus values in CIE 1964 $X_{10}Y_{10}Z_{10}$ Colorimetric System under an illuminant C as specified in JIS Z8720 according to the method of JIS Z8729.

2. A silver halide color reversal light-sensitive material as in claim 1, wherein said a* value is from $-4$ to 4, said b* value is from $-4$ to 4, and said L* value is not less than 85.

3. A silver halide color reversal light-sensitive material as in claim 1, wherein said a* value is from $-3$ to 3, said b* value is from $-3$ to 3, and said L* value is not less than 85.

4. A silver halide color reversal light-sensitive material as in claim 1, wherein said magnetic recording layer is provided on the side of the support opposite the emulsion layer side.

5. A silver halide color reversal light-sensitive material as in claim 1, wherein said ferromagnetic powder is present in an amount of from $4 \times 10^{-3}$ to 3 g per m$^2$ of the transparent support.

6. A silver halide color reversal light-sensitive material as in claim 5, wherein said ferromagnetic powder is present in an amount of from $10^{-2}$ to 1 g per m$^2$ of the transparent support.

7. A silver halide color reversal light-sensitive material as in claim 6, wherein said ferromagnetic powder is present in an amount of from $4 \times 10^{-2}$ to $4 \times 10^{-1}$ g per m$^2$ of the transparent support.

8. A silver halide color reversal light-sensitive material as in claim 1, wherein said magnetic recording layer has a thickness of from 0.1 to 10 μm.

9. A silver halide color reversal light-sensitive material as in claim 8, wherein said magnetic recording layer has a thickness of from 0.2 to 5 μm.

10. A silver halide color reversal light-sensitive material as in claim 9, wherein said magnetic recording layer has a thickness of from 0.5 to 3 μm.

11. A light-shut film unit having a silver halide color reversal light-sensitive material packed in a cartridge, said material having a film leader which is inside of said cartridge, wherein said silver halide color reversal light-sensitive material comprises on a transparent support a red-sensitive silver halide emulsion layer containing a cyan coupler, a green-sensitive silver halide emulsion layer containing a magenta coupler, and a blue-sensitive silver halide emulsion layer containing a yellow coupler, wherein said light-sensitive material has a magnetic recording layer containing from $4 \times 10^{-3}$ to 3 g/m$^2$ of a ferromagnetic powder, and the minimum density area of said light-sensitive material after development has a chromaticity having an a* value of from $-5$ to 5, a b* value of from $-5$ to 5, and an L* value of not less than 80 as calculated from tristimulus values in CIE 1964 $X_{10}Y_{10}Z_{10}$ Colorimetric System under an illuminant C as specified in JIS Z8720 according to the method of JIS Z8729.

12. A silver halide color reversal light-sensitive material as in claim 1, wherein said non-imagewise, non-diffusible dye is selected from the group consisting of dyes represented by formulae (I) to (VI):

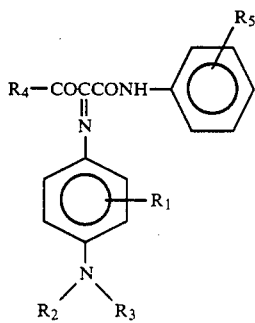

wherein $R_1$ represents one or more substituents, which may be the same or different, selected from the group consisting of a hydrogen atom, a halogen atom, an alkyl group, and an alkoxy group; $R_2$ and $R_3$ each independently represents a hydrogen atom or an alkyl group; $R_4$ represents an alkyl group or an aryl group; and $R_5$ represents one or more substituents, which may be the same or different, selected from the group consisting of a hydrogen atom, an alkyl group, an aryl group, a halogen atom, an alkoxy group, an aryloxy group, an alkoxycarbonyl group, an aryloxycarbonyl group, a carbonamido group, a sulfonamido group, a carbamoyl group, a sulfamoyl group, an alkylsulfonyl group, an arylsulfonyl group, a nitro group, a heterocyclic group, a cyano group, an acyl group, an acyloxy group, an alkylsulfonyloxy group, and an arylsulfonyloxy group;

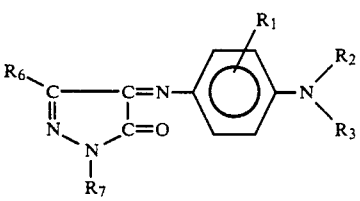

wherein $R_1$, $R_2$, and $R_3$ have the same meaning as in formula (I), $R_6$ and $R_7$ each independently represents a hydrogen atom, a halogen atom, an alkyl group, an aryl group, an alkyoxy group, an aryloxy group, a heterocyclic group, a cyano group, a hydroxyl group, a nitro group, a carboxyl group, an amino group, an acylamino group amido, γ-amido, α-, an alkylamino group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group an alkoxycarbonyl group, a heterocyclic oxy group, an azo group, an acyloxy group, a carbamoyloxy group, a silyloxy group, an aryloxycarbonylamino group, an imido group, a heterocyclic thio group, a sulfinyl group, a phosphonyl group, an aryloxycarbonyl group, an acyl group, an azolyl group, a carboxylic ester group, an alkylamino group, or a ureido group;

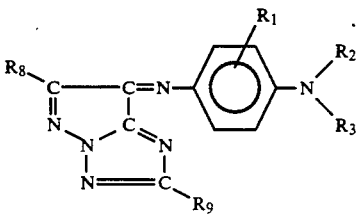

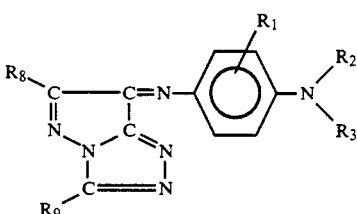

wherein $R_1$, $R_2$, and $R_3$ each have the same meaning as in formula (I), and $R_8$ and $R_9$ each have the same meaning as $R_6$ of formula (II);

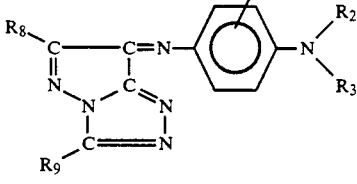

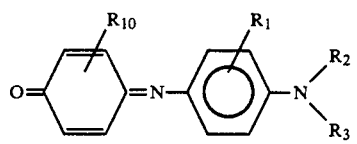

wherein $R_1$, $R_2$, and $R_3$ each have the same meaning as in formula (I), and $R_{10}$ and $R_{11}$ each represents one or more substituents, which may be the same or different, selected from the same groups as $R_5$ in formula (I).

* * * * *